US012752913B2

(12) United States Patent
Nadel et al.

(10) Patent No.: US 12,752,913 B2
(45) Date of Patent: Oct. 6, 2026

(54) SYSTEM FOR PROVIDING BUOYANCY FOR A VEHICLE ON A BODY OF WATER

(71) Applicant: The Boeing Company, Arlington, VA (US)

(72) Inventors: Adam Nadel, Vienna, VA (US); Gilbert Lewis Crouse, Jr., Manassas, VA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/812,571

(22) Filed: Aug. 22, 2024

(65) Prior Publication Data

US 2026/0054829 A1 Feb. 26, 2026

(51) Int. Cl.
*B64C 25/56* (2006.01)

(52) U.S. Cl.
CPC .................................... *B64C 25/56* (2013.01)

(58) Field of Classification Search
CPC ................................ B64C 25/56; B64C 25/54
See application file for complete search history.

(56) References Cited

U.S. PATENT DOCUMENTS 3,004,737 A * 10/1961 Lehberger ............... B64C 25/56 244/105
3,102,705 A * 9/1963 Namsick ................. B64C 25/56 244/105
3,240,449 A 3/1966 Robinson, Jr.
3,275,270 A * 9/1966 Earl ......................... B60V 3/08 180/122
3,507,466 A * 4/1970 La Fleur ................. B64C 25/52 244/105
3,869,103 A * 3/1975 Nelson ..................... B60V 3/08 244/100 R
3,950,804 A * 4/1976 Brumfield ................. B63C 9/06 441/40

* cited by examiner

*Primary Examiner* — Joshua J Michener
*Assistant Examiner* — Cindi M Curry
(74) *Attorney, Agent, or Firm* — Hanley, Flight & Zimmerman, LLC

(57) ABSTRACT

A system for providing buoyancy for a vehicle on a body of water includes a support structure having an upper support end, a lower support end, and an interlocated portion between the upper and lower support ends, a first shell attached directly or indirectly to the support structure and having an upper first shell end and a lower first shell end, and a mechanism configured to move the first shell between a retracted state and a deployed state. In the retracted state, the upper first shell end is disposed proximate the interlocated portion and the lower first shell end is disposed proximate the lower support end, and in the deployed state, the first shell is disposed in one of a first arrangement, a second arrangement, a third arrangement and a fourth arrangement.

19 Claims, 22 Drawing Sheets

SYSTEM FOR PROVIDING BUOYANCY FOR A VEHICLE ON A BODY OF WATER

GOVERNMENT FUNDING

This invention was made with Government support under Agreement. No. HR001123C0013 awarded by the Department of Defense. The Government may have certain rights in the invention.

INTRODUCTION

This disclosure relates generally to systems for providing buoyancy for vehicles (such as seaplanes) that are capable of landing on and taking off from a body of water.

Some flight vehicles, such as seaplanes, may be designed, outfitted or rigged for landing on and taking off from a body of water. Such vehicles typically have wings extending outward from a fuselage, with floats or pontoons attached to and descending downward from the wing tips or elsewhere along the wings. These floats may be permanently attached to the vehicle, or they may be removable and installed as needed, but in either case the floats typically remain deployed not only during landing on and take-off from a body of water, but also during flight as well. However, these floats are large and are often filled with foam or other material, thus adding unwanted weight and aerodynamic drag.

SUMMARY

According to one embodiment, a system for providing buoyancy for a vehicle on a body of water includes: (a) a support structure having an upper support end, a lower support end, and an interlocated portion between the upper and lower support ends; (b) a first shell attached directly or indirectly to the support structure and having an upper first shell end and a lower first shell end; and (c) a mechanism configured to move the first shell between a retracted state and a deployed state. In the retracted state, the upper first shell end is disposed proximate the interlocated portion and the lower first shell end is disposed proximate the lower support end, and in the deployed state, the first shell is disposed in one of: (i) a first arrangement, wherein the upper first shell end is pivotably attached to the interlocated portion and the lower first shell end is disposed away from the support structure; (ii) a second arrangement, wherein the lower first shell end is pivotably attached to the lower support end and the upper first shell end is disposed away from the support structure; (iii) a third arrangement, wherein both the upper and lower first shell ends are disposed away from the support structure; and (iv) a fourth arrangement, wherein the upper and lower first shell ends are pivotably attached to the interlocated portion and to the lower support end, respectively, with the first shell comprising an upper first shell, which includes the upper first shell end and an upper first shell termination opposite the upper first shell end, and a lower first shell, which includes the lower first shell end and a lower first shell termination opposite the lower first shell end, wherein in the retracted state, the upper and lower first shell terminations are disposed proximate each other, and in the deployed state, the upper and lower first shell terminations are disposed away from each other.

In the first arrangement, the mechanism may include one of: (A) a first configuration, which may include (i) a balloon attached to the interlocated portion and disposed in the retracted state between the first shell and the interlocated portion, and (ii) a balloon inflator in inflatable communication with the balloon; (B) a second configuration, which may include (i) a lower membrane having a first lower membrane end attached to the lower support end and a second lower membrane end attached to the lower first shell end, (ii) an enclosed interior enclosed by the first shell, the support structure, and the lower membrane, and (iii) an enclosed interior inflator in inflatable communication with the enclosed interior; and (C) a third configuration, which may include (i) the enclosed interior and (ii) an actuator operably connected with the first shell and the support structure.

In the first configuration, in the retracted state the balloon may have a first balloon volume, and in the deployed state the balloon may be expanded to a second balloon volume by the balloon inflator. In the second configuration, in the retracted state the enclosed interior may have a first enclosed interior volume, and in the deployed state the enclosed interior may be expanded to a second enclosed interior volume by the enclosed interior inflator. And in the third configuration, in the retracted state the first shell may be disposed at a first distance from the support structure, and in the deployed state the first shell may be moved by the actuator to a second distance away from the support structure that is greater than the first distance.

In the deployed state, a running surface may be provided for facilitating one or more of landing the vehicle on the body of water, taxiing of the vehicle on the body of water and take-off of the vehicle from the body of water by: (i) an outer balloon surface of the balloon in the first configuration; and (ii) an outer lower membrane surface of the lower membrane in the second and third configurations.

The first configuration may further include an extender operably connected with the balloon and the support structure and configured for (i) extending the balloon from a retracted position, in which the balloon is disposed proximate the support structure, and an extended position, in which the balloon is disposed away from the support structure, and (ii) retracting the balloon from the extended position to the retracted position.

In the second arrangement, the mechanism may include one of: (a) a primary configuration, which may include an actuator operably connected with the first shell and the support structure; (b) a secondary configuration, which may include (i) an upper membrane having a first upper membrane end attached to the interlocated portion and a second upper membrane end attached the upper first shell end, (ii) an enclosed interior enclosed by the first shell, the support structure, and the upper membrane, and (iii) an enclosed interior inflator in inflatable communication with the enclosed interior; (c) a tertiary configuration, which may include (i) the enclosed interior and (ii) the actuator; and (d) a quaternary configuration, which may include (i) a balloon attached to the interlocated portion and disposed in the retracted state between the first shell and the interlocated portion, and (ii) a balloon inflator in inflatable communication with the balloon.

In the primary configuration, in the retracted state the first shell may be disposed at a first distance from the support structure, and in the deployed state the first shell may be moved by the actuator to a second distance away from the support structure that is greater than the first distance.

In the secondary and tertiary configurations, in the retracted state the enclosed interior may have a first enclosed interior volume, and in the deployed state the enclosed interior may be expanded to a second enclosed interior volume by the enclosed interior inflator.

In the quaternary configuration, in the retracted state RS the balloon may have a first balloon volume, and in the deployed state the balloon may be expanded to a second balloon volume by the balloon inflator.

In the deployed state, a running surface may be provided for facilitating one or more of landing the vehicle on the body of water, taxiing of the vehicle on the body of water and take-off of the vehicle from the body of water by an outer first shell surface of the first shell.

The primary and quaternary configurations may further include a spray skirt having a first spray skirt end attached to the interlocated portion and a second spray skirt end attached to the upper first shell end.

In the third arrangement, the mechanism may include: (i) an upper membrane having a first upper membrane end attached to the interlocated portion and a second upper membrane end attached to the upper first shell end; (ii) a lower membrane having a first lower membrane end attached to the lower support end and a second lower membrane end attached to the lower first shell end; (iii) an enclosed interior enclosed by the first shell, the support structure, the upper membrane and the lower membrane; and (iv) an enclosed interior inflator in inflatable communication with the enclosed interior. In the retracted state, the enclosed interior may have a first enclosed interior volume, and in the deployed state, the enclosed interior may be expanded to a second enclosed interior volume by the enclosed interior inflator.

In the deployed state, a running surface may be provided for facilitating one or more of landing the vehicle on the body of water, taxiing of the vehicle on the body of water and take-off of the vehicle from the body of water by one or both of an outer lower membrane surface of the lower membrane and an outer first shell surface of the first shell.

In the fourth arrangement, the mechanism may include one of: (a) a main configuration, which may include an upper actuator operably connected with the upper first shell and the support structure and a lower actuator operably connected with the lower first shell and the support structure; (b) an auxiliary configuration, which may include (i) a balloon attached to the interlocated portion and disposed in the retracted state between the first shell and the interlocated portion, and (ii) a balloon inflator in inflatable communication with the balloon; (c) an alternative configuration, which may include (i) a middle membrane having a first middle membrane end attached to the upper first shell termination and a second middle membrane end attached the lower first shell termination, (ii) an enclosed interior enclosed by the upper first shell, the lower first shell, the support structure and the middle membrane, and (iii) an enclosed interior inflator in inflatable communication with the enclosed interior; and (d) a supplemental configuration, which may include (i) the enclosed interior and (ii) the upper and lower actuators.

In the deployed state, a running surface may be provided for facilitating one or more of landing the vehicle on the body of water, taxiing of the vehicle on the body of water and take-off of the vehicle from the body of water by an outer lower first shell surface of the lower first shell.

The mechanism may include one or more of: (a) an actuator operably connected with the first shell and the support structure; (b) a balloon and a balloon inflator in inflatable communication with the balloon, wherein the balloon is attached to the interlocated portion and is disposed in the retracted state between the first shell and the interlocated portion; and (c) an enclosed interior and an enclosed interior inflator in inflatable communication with the enclosed interior, wherein the enclosed interior is enclosed by the first shell, the support structure, and one or more of (i) a lower membrane that has a first lower membrane end attached to the lower support end and a second lower membrane end attached to the lower first shell end, (ii) an upper membrane that has a first upper membrane end attached to the interlocated portion and a second upper membrane end attached to the upper first shell end, and (iii) a middle membrane having a first middle membrane end attached to the upper first shell termination and a second middle membrane end attached to the lower first shell termination.

The actuator may be configured for selectably increasing and decreasing a distance between the first shell and the support structure between a first distance in the retracted state and a second distance in the deployed state, wherein the second distance is greater than the first distance. The balloon and the balloon inflator may be configured for selectably increasing and decreasing a balloon volume of the balloon between a first balloon volume in the retracted state and a second balloon volume in the deployed state, wherein the second balloon volume is greater than the first balloon volume. The enclosed interior and the enclosed interior inflator may be configured for selectably increasing and decreasing an enclosed interior volume of the enclosed interior between a first enclosed interior volume in the retracted state and a second enclosed interior volume in the deployed state.

The mechanism may further include one or more of: (a) a tether having a first tether end attached to an outer balloon surface of the balloon and a second tether end attached to an inner first shell surface of the first shell; (b) an elastic member having a first elastic member end attached to the support structure and a second elastic member end attached to at least one of the upper membrane, the lower membrane, the middle membrane and an inner first shell surface of the first shell; and (c) a strap having a first strap end and a second strap end attached to a retractor that is configured for selectably paying out and retracting the strap, wherein the strap is disposed (i) along a lower membrane outer perimeter of the lower membrane with the first strap end attached to the lower first shell end and the retractor disposed at the lower support end, (ii) along an upper membrane outer perimeter of the upper membrane with the first strap end attached to the upper first shell end and the retractor disposed at the interlocated portion, or (iii) along a middle membrane outer perimeter of the middle membrane with the first strap end attached to the upper first shell termination and the retractor disposed at the lower first shell termination or at the lower support end or with the first strap end attached to the lower first shell termination and the retractor disposed at the upper first shell termination or at the interlocated portion.

In the deployed state, the buoyancy may be provided for the vehicle on the body of water by one or more of: (i) the balloon; (ii) the enclosed interior; and (iii) a substantially watertight interior space defined by the lower membrane and the support structure in the first arrangement, by the first shell and the support structure in the second arrangement, and by the lower first shell and the support structure in the fourth arrangement.

The system may further include a second shell attached directly or indirectly to the support structure and having an upper second shell end and a lower second shell end, wherein the support structure may have an inboard side and an outboard side, and wherein one of the first and second shells may be disposed on the inboard side and the other of the first and second shells may be disposed on the outboard side.

According to another embodiment, a system for providing buoyancy for a vehicle on a body of water includes: (a) a support structure having an upper support end, a lower support end, an interlocated portion between the upper and lower support ends, an inboard side and an outboard side, wherein the support structure is configured for attachment to or integration with the vehicle; (b) a first shell attached directly or indirectly to the support structure on one of the inboard and outboard sides and having an upper first shell end and a lower first shell end; (c) a second shell attached directly or indirectly to the support structure on the other of the inboard and outboard sides and having an upper second shell end and a lower second shell end; and (d) a mechanism configured to move the first and second shells between a retracted state and a deployed state. In the retracted state, the upper first and second shell ends are disposed proximate the interlocated portion and the lower first and second shell ends are disposed proximate the lower support end, and in the deployed state, the first and second shells are disposed in one of: (i) a first arrangement, wherein the upper first and second shell ends are pivotably attached to the interlocated portion and the lower first and second shell ends are disposed away from the support structure; (ii) a second arrangement, wherein the lower first and second shell ends are pivotably attached to the lower support end and the upper first and second shell ends are disposed away from the support structure; (iii) a third arrangement, wherein the upper and lower first shell ends and the upper and lower second shell ends are disposed away from the support structure; and (iv) a fourth arrangement, wherein the upper first and second shell ends are pivotably attached to the interlocated portion and the lower first and second shell ends are pivotably attached to the lower support end, with the first shell comprising an upper first shell, which includes the upper first shell end and an upper first shell termination opposite the upper first shell end, and a lower first shell, which includes the lower first shell end and a lower first shell termination opposite the lower first shell end, and with the second shell comprising an upper second shell, which includes the upper second shell end and an upper second shell termination opposite the upper second shell end, and a lower second shell, which includes the lower second shell end and a lower second shell termination opposite the lower second shell end, wherein in the retracted state, the upper and lower first shell terminations are disposed proximate each other and the upper and lower second shell terminations are disposed proximate each other, and in the deployed state, the upper and lower first shell terminations are disposed away from each other and the upper and lower second shell terminations are disposed away from each other.

According to yet another embodiment, a system for providing buoyancy for an aircraft on a body of water includes: (a) a support structure having an upper support end, a lower support end, and an interlocated portion between the upper and lower support ends, wherein the upper support end of the support structure is configured for attachment to or integration with a wing tip of the aircraft; (b) a first shell attached directly or indirectly to the support structure and having an upper first shell end and a lower first shell end; and (c) a mechanism configured to move the first shell between a retracted state and a deployed state. In in the retracted state, the upper first shell end is disposed proximate the interlocated portion and the lower first shell end is disposed proximate the lower support end, and in in the deployed state, the first shell is disposed in one of: (i) a first arrangement, wherein the upper first shell end is pivotably attached to the interlocated portion and the lower first shell end is disposed away from the support structure; (ii) a second arrangement, wherein the lower first shell end is pivotably attached to the lower support end and the upper first shell end is disposed away from the support structure; (iii) a third arrangement, wherein both the upper and lower first shell ends are disposed away from the support structure; and (iv) a fourth arrangement, wherein the upper and lower first shell ends are pivotably attached to the interlocated portion and to the lower support end, respectively, with the first shell comprising an upper first shell, which includes the upper first shell end and an upper first shell termination opposite the upper first shell end, and a lower first shell, which includes the lower first shell end and a lower first shell termination opposite the lower first shell end, wherein in the retracted state, the upper and lower first shell terminations are disposed proximate each other, and in the deployed state, the upper and lower first shell terminations are disposed away from each other.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
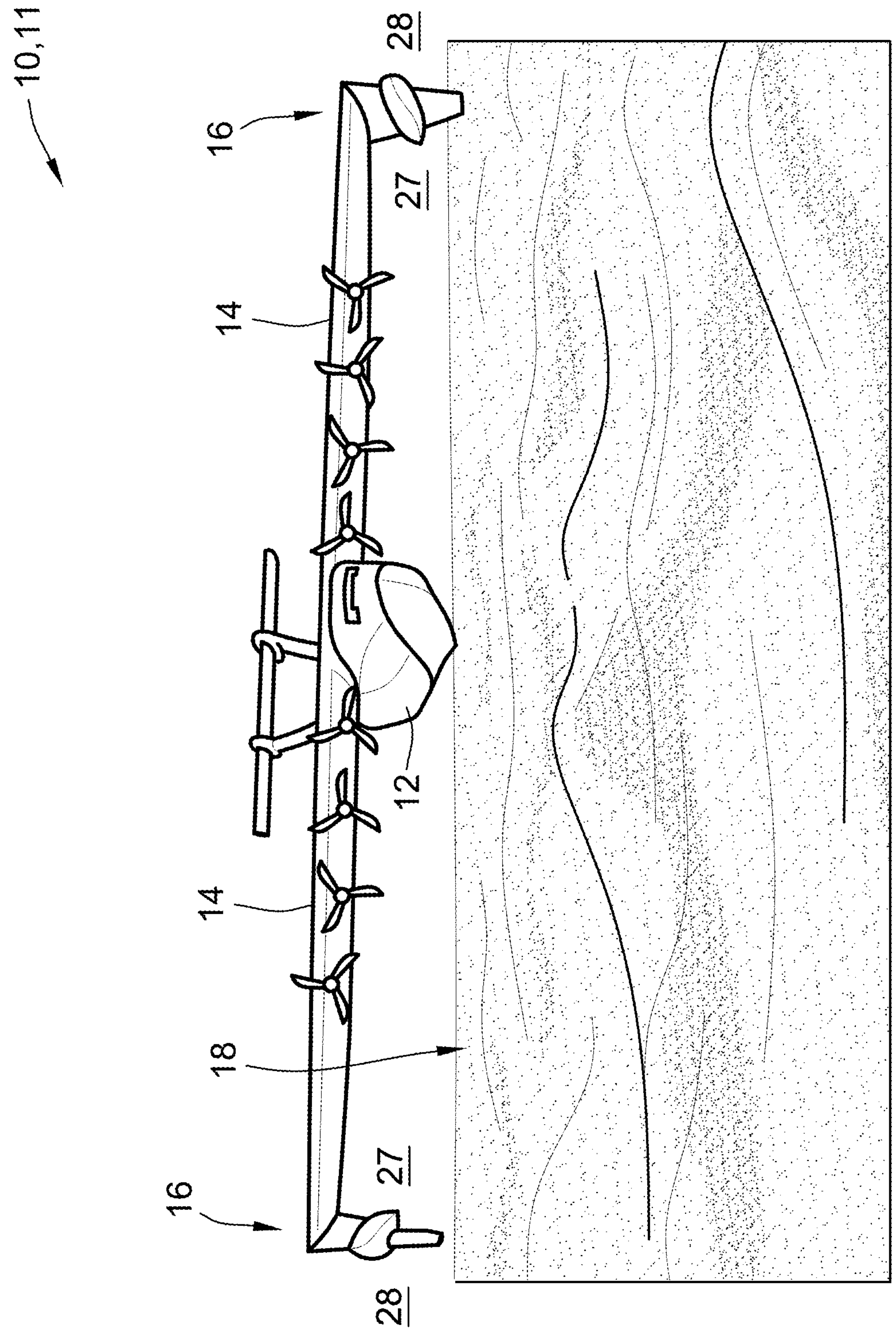
FIG. 1 is a perspective view of a seaplane vehicle on a body of water.

Referring now to the drawings, wherein like numerals indicate like parts in the several views, various embodiments of a system 20 for providing buoyancy for a vehicle 10 on a body of water 18 are shown and described herein.

FIG. 1 shows a perspective view of a vehicle 10, resting on a body of water 18. The vehicle 10 may be an aircraft 11, such as a seaplane, a helicopter or any other form of flight vehicle that is capable of landing on and/or taking off from the body of water 18. The body of water can be any open, still or contained body of water, examples of which include but are not limited to an ocean, sea, lake, river, pond, reservoir, wetland, canal, bog, channel, creek, estuary, gulf, harbor, lagoon, marsh, sound, stream, or tarn. The vehicle 10 may have a fuselage 12 or other main portion, with wings or other structures (e.g., outriggers or stabilizers) 14 which extend outward from the fuselage 12. (Note that as used herein, reference numeral 14 and the term "wing" and its derivatives refer to wings, outriggers, stabilizers and other structures which extend outward from the fuselage 12. Similarly, as used herein, reference numeral 12 and the term "fuselage" refer to the fuselage, main portion or main body of an aircraft 11 or other vehicle 10.) The fuselage 12 has a longitudinal axis which defines opposed forward and aftward directions, with the wings 14 extending laterally outward from the fuselage 12 and terminating in respective wing tips 16. As mentioned above, vehicles 10 such as seaplanes may customarily include floats or other structures descending downward from one or more of the wing tips 16, which are deployed during the entire flight and which add unwanted weight and aerodynamic drag.

In contrast with the abovementioned customary approach, the system 20 of the present disclosure solves the technical problem of unwanted weight and aerodynamic drag by the technical effect of providing a system 20 which is selectably deployable and retractable, thereby providing significant benefits and technical advantages which are not taught or suggested by other known approaches. These benefits and technical advantages include the use of structural elements and features which offer reduced weight and/or drag as compared to previous approaches, as well as providing for selectable retraction and deployment.

Turning now to the drawings, FIGS. 2A through 22 show schematic front views of the system 20 of the present disclosure, according to various combinations of arrangements and configurations. More specifically, the drawings and present disclosure reveal four related but different arrangements, referred to herein as a first arrangement A1, a second arrangement A2, a third arrangement A3 and a fourth arrangement A4, with the first arrangement A1 having three configurations and the second and fourth arrangements A2, A4 each having four respective configurations.

Figure 2A:
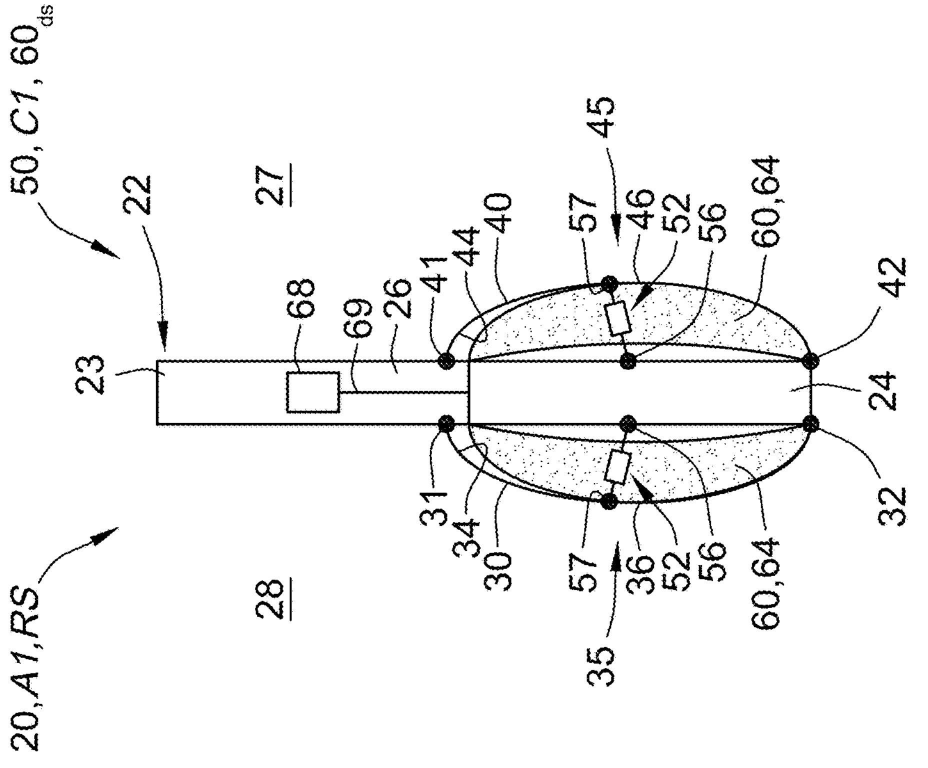
FIGS. 2A-B are schematic front views of a system for providing buoyancy for a vehicle, according to a first configuration of a first arrangement, in retracted and deployed states, respectively.
Figure 2B:
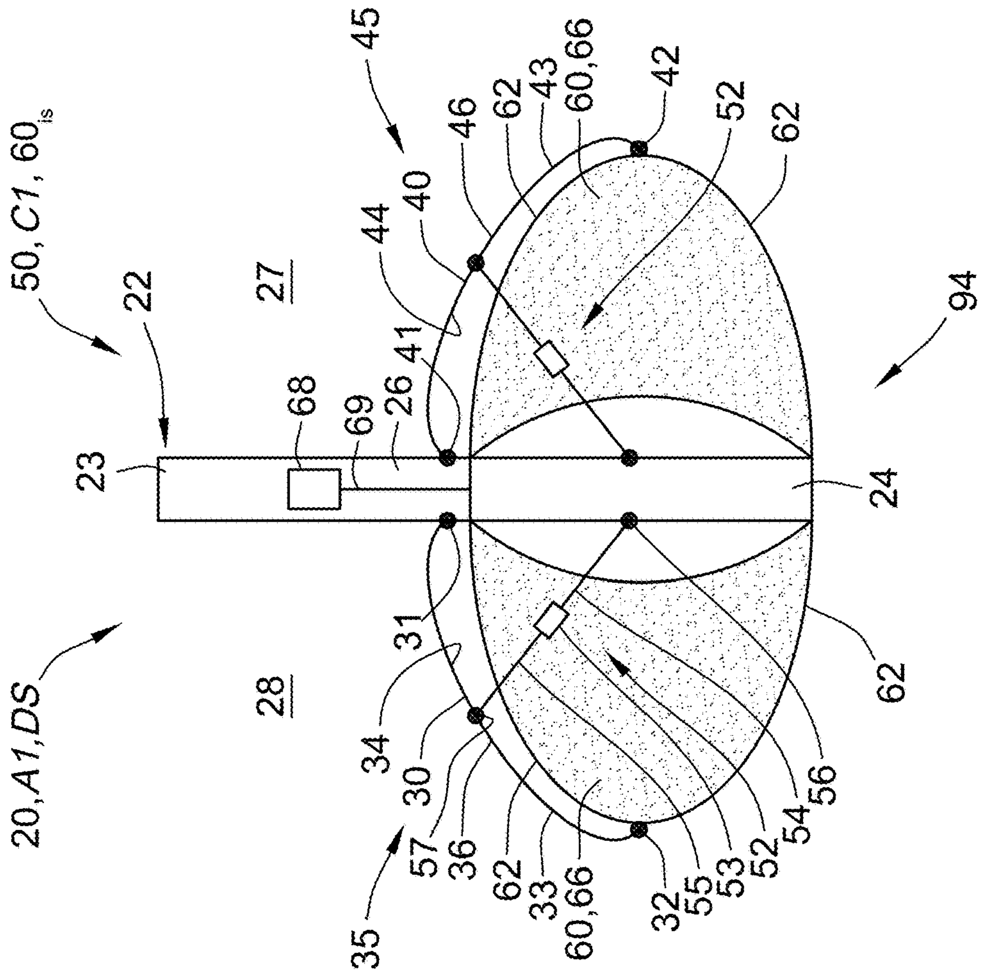
Figure 3B:
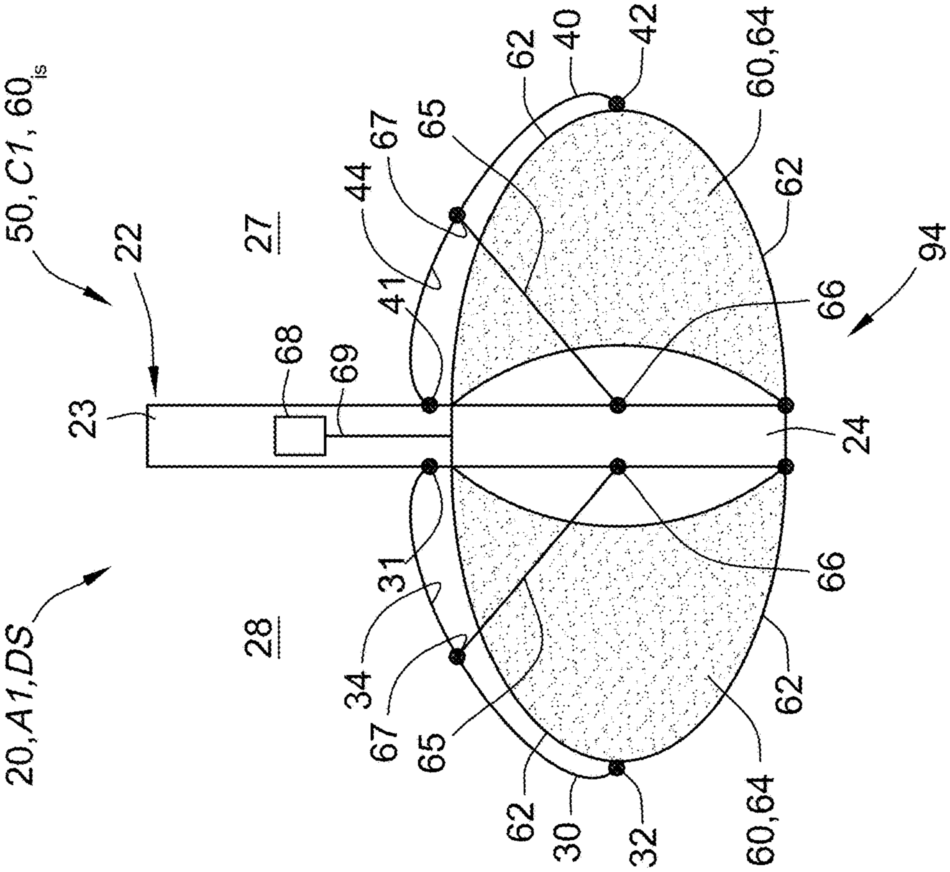
FIGS. 3A-B are schematic front views of the system shown in FIG. 2B but utilizing alternative elements.
Figure 3A:
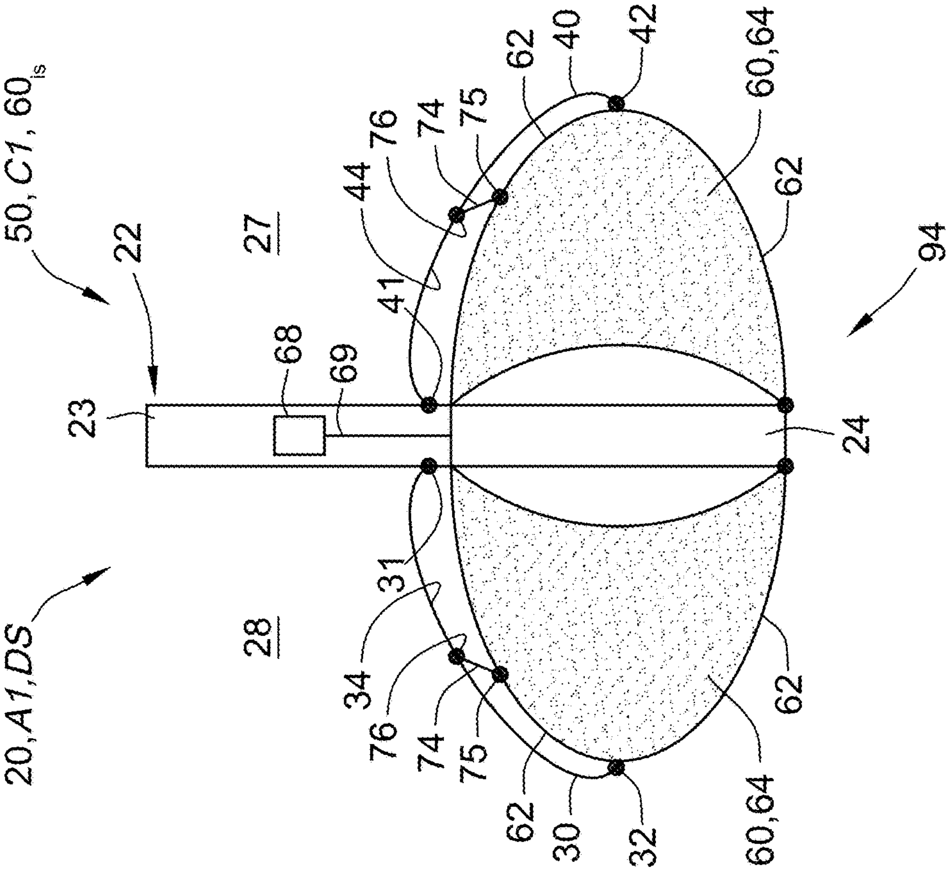
Figure 4B:
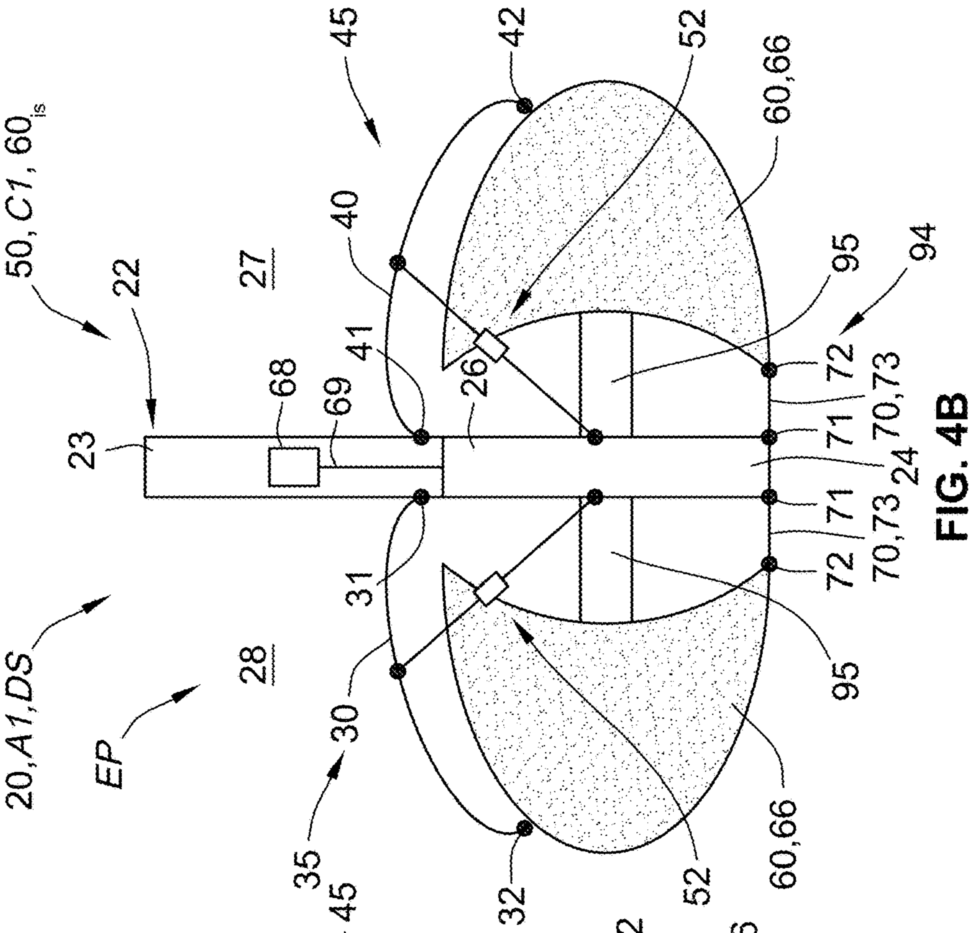
FIGS. 4A-B are schematic front views of the system shown in FIG. 2B but with an extender added, in retracted and extended positions, respectively.
Figure 4A:
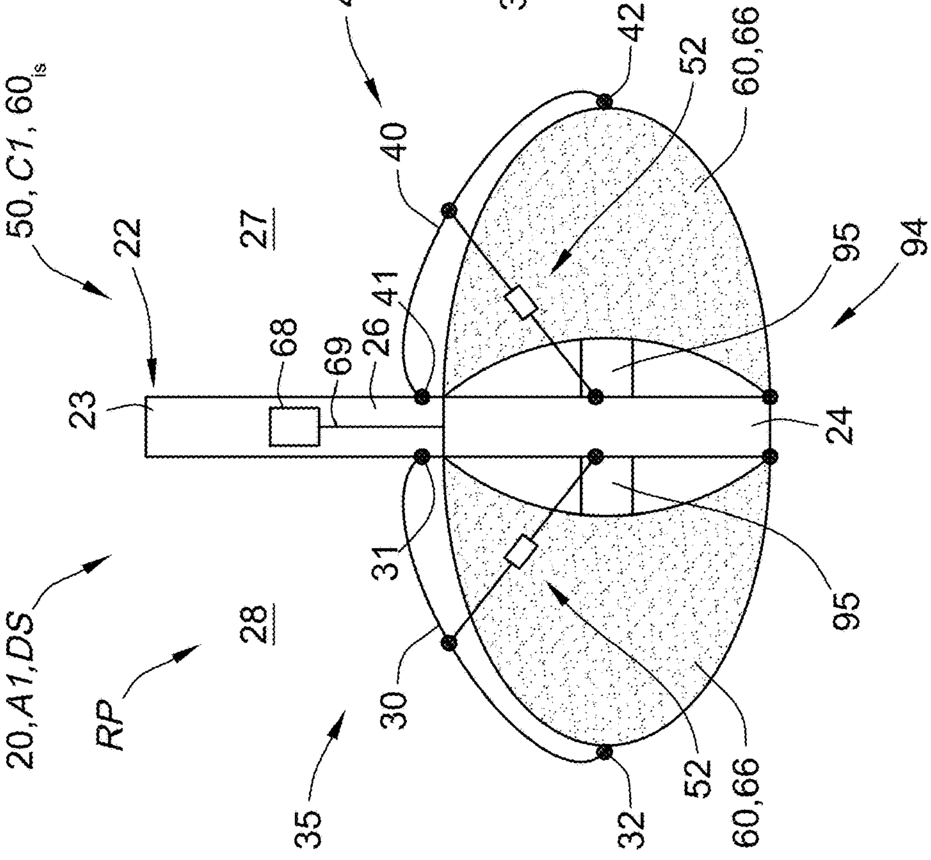
Figure 5B:
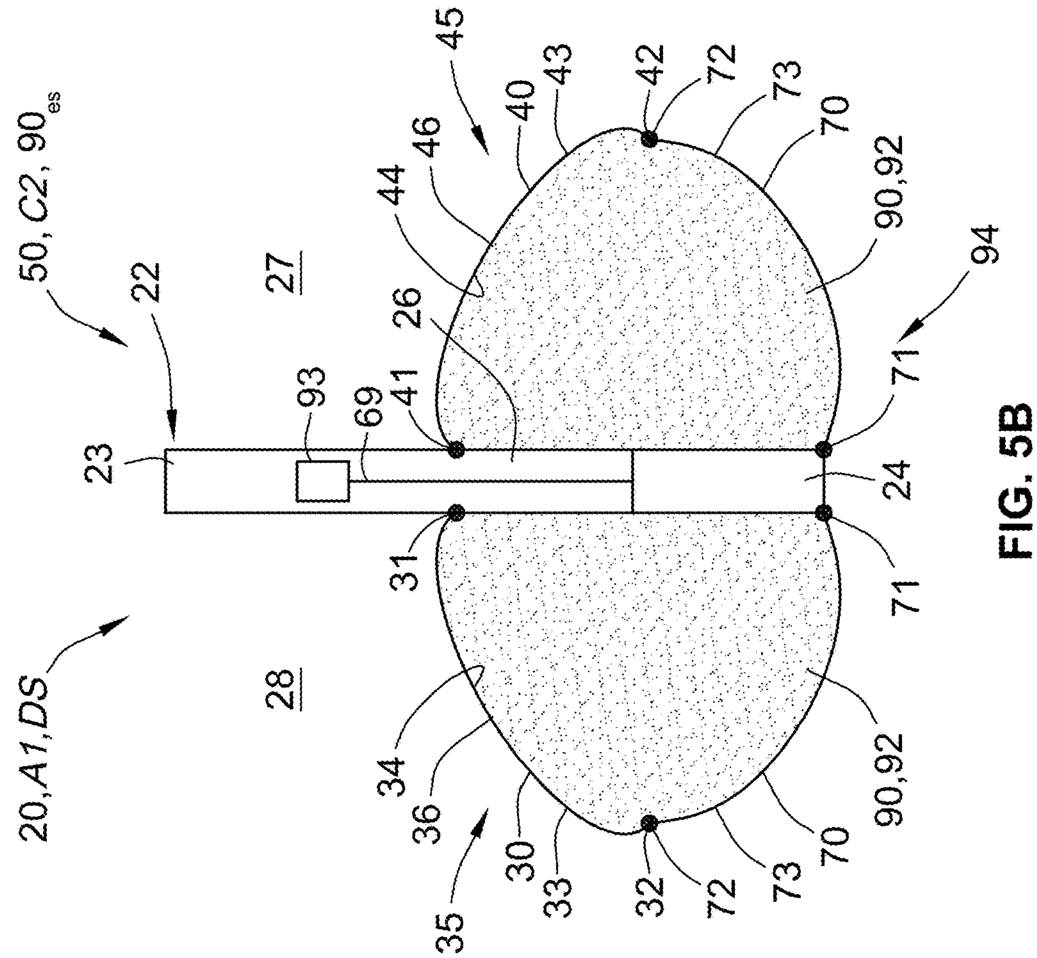
FIGS. 5A-B are schematic front views of a system for providing buoyancy for a vehicle, according to a second configuration of the first arrangement, in retracted and deployed states, respectively.
Figure 5A:
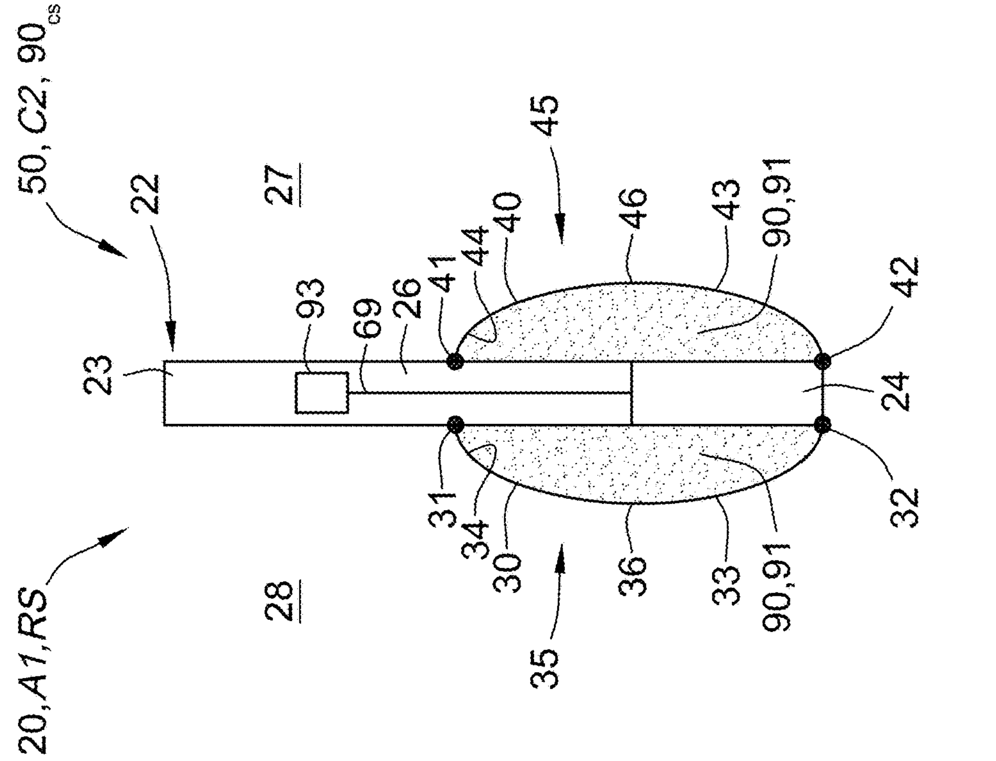
Figure 6B:
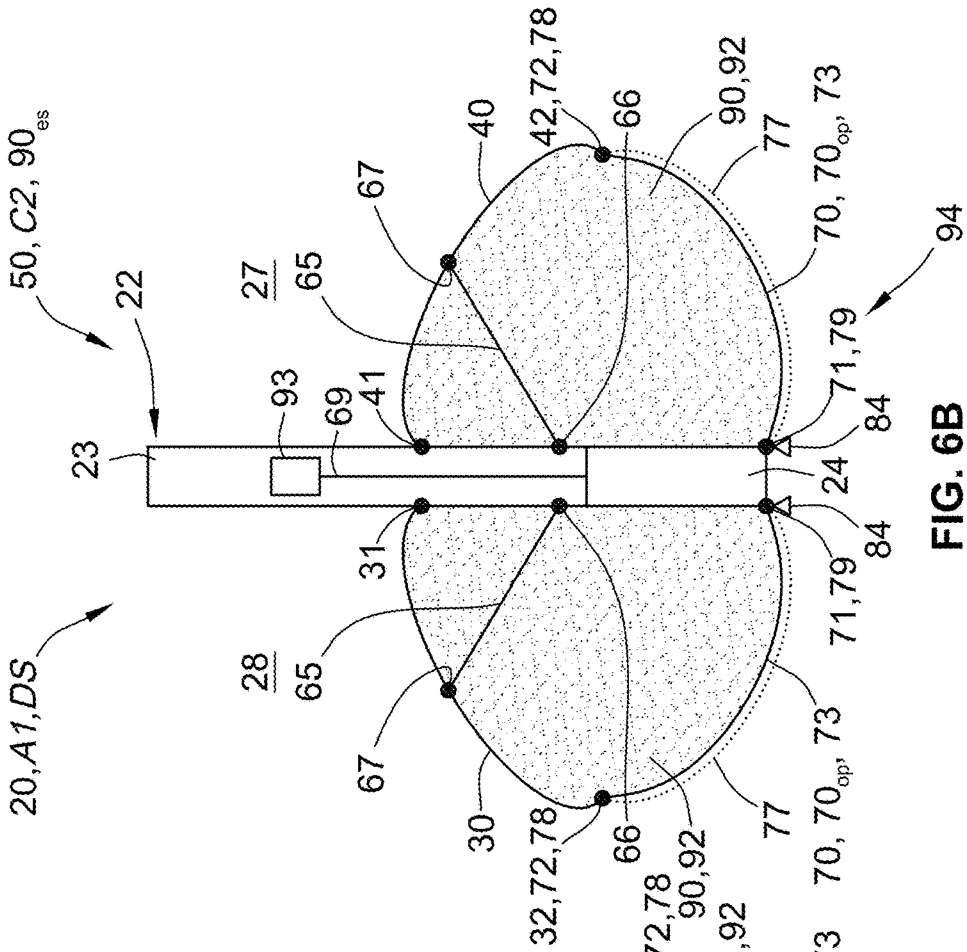
FIGS. 6A-B are schematic front views of the system shown in FIG. 5B but utilizing alternative elements.
Figure 6A:
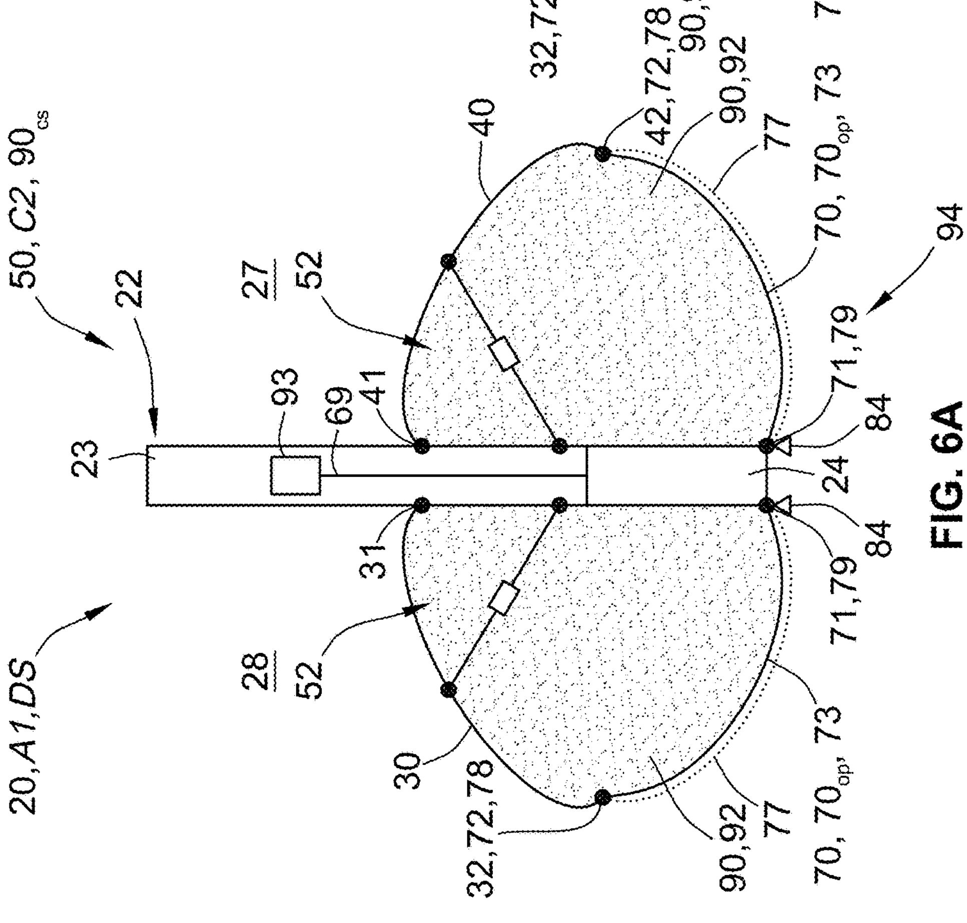
Figures 7A, 7B:
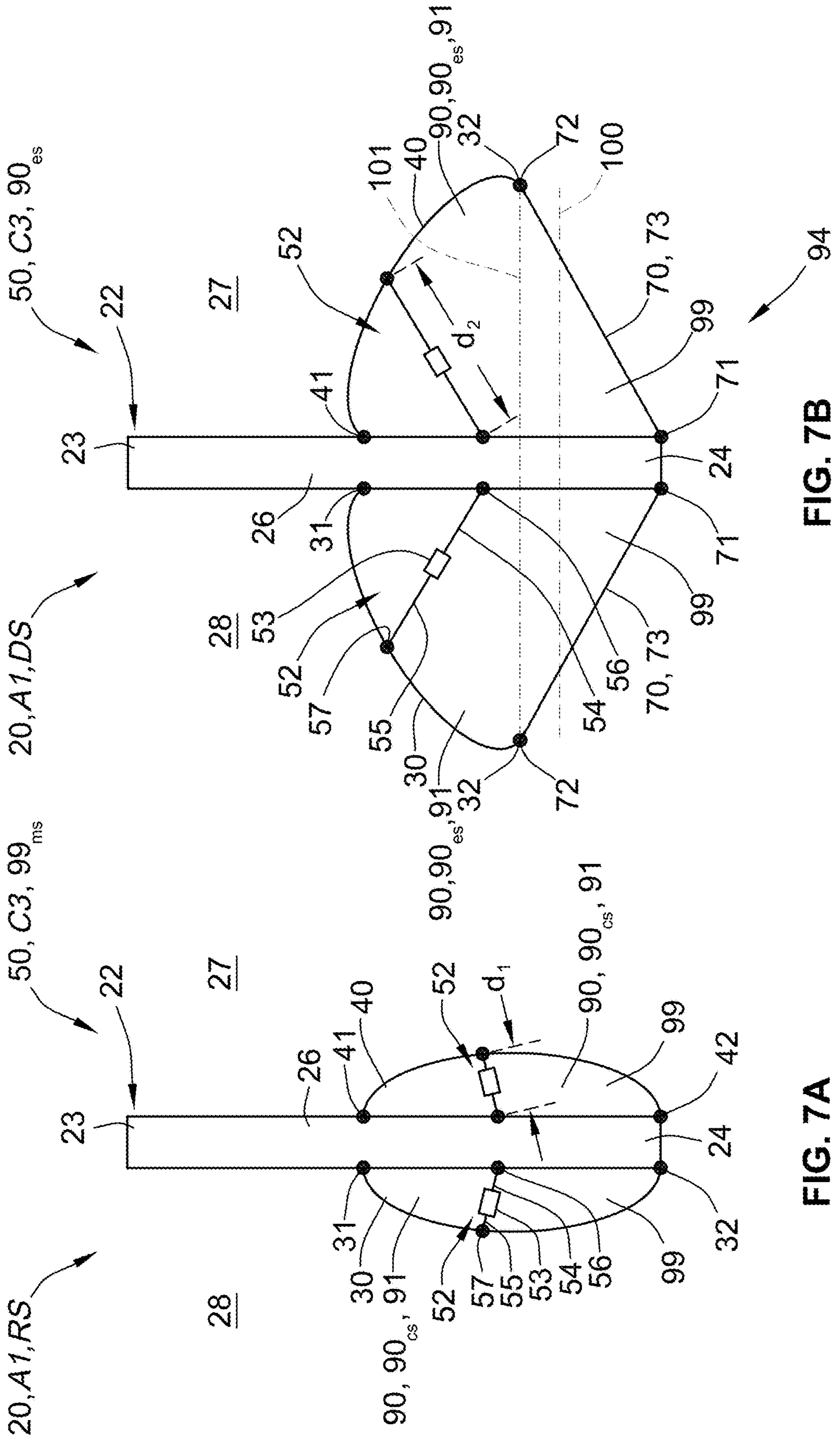
FIGS. 7A-B are schematic front views of a system for providing buoyancy for a vehicle, according to a third configuration of the first arrangement, in retracted and deployed states, respectively.

For example, FIGS. 2A-B show a first configuration C1 of the first arrangement A1, with FIG. 2A showing this combination in a retracted state RS and FIG. 2B showing the combination in a deployed state DS. FIGS. 3A-B show the system 20 illustrated in FIG. 2B but utilizing alternative elements. FIGS. 4A-B show the same combination that is illustrated in FIG. 2B, but with an extender 95 added, and showing respective retracted and extended positions RP, EP. FIGS. 5A-B show a second configuration C2 of the first arrangement A1 in respective retracted and deployed states RS, DS, and FIGS. 6A-B show the system 20 illustrated in FIG. 5B but utilizing alternative elements. FIGS. 7A-B show a third configuration C3 of the first arrangement A1 in respective retracted and deployed states RS, DS.

Figure 8B:
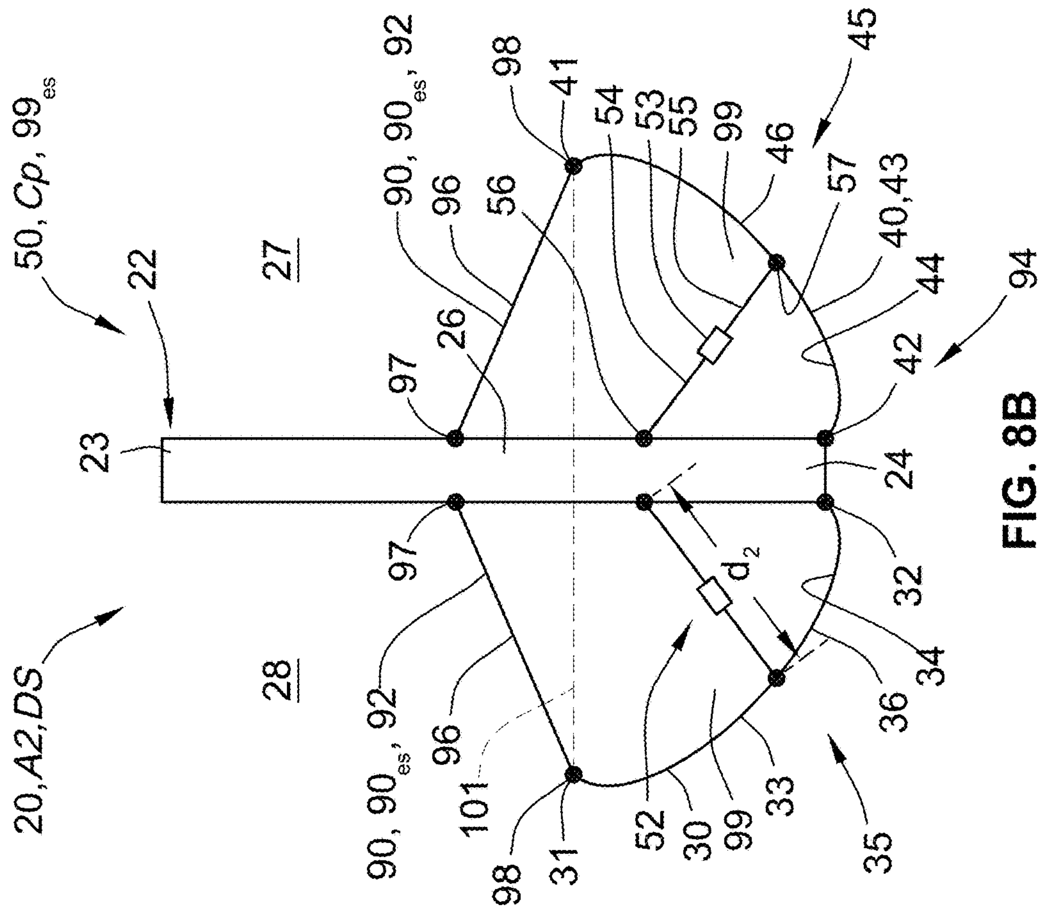
FIGS. 8A-B are schematic front views of a system for providing buoyancy for a vehicle, according to a primary configuration of a second arrangement, in retracted and deployed states, respectively.
Figure 8A:
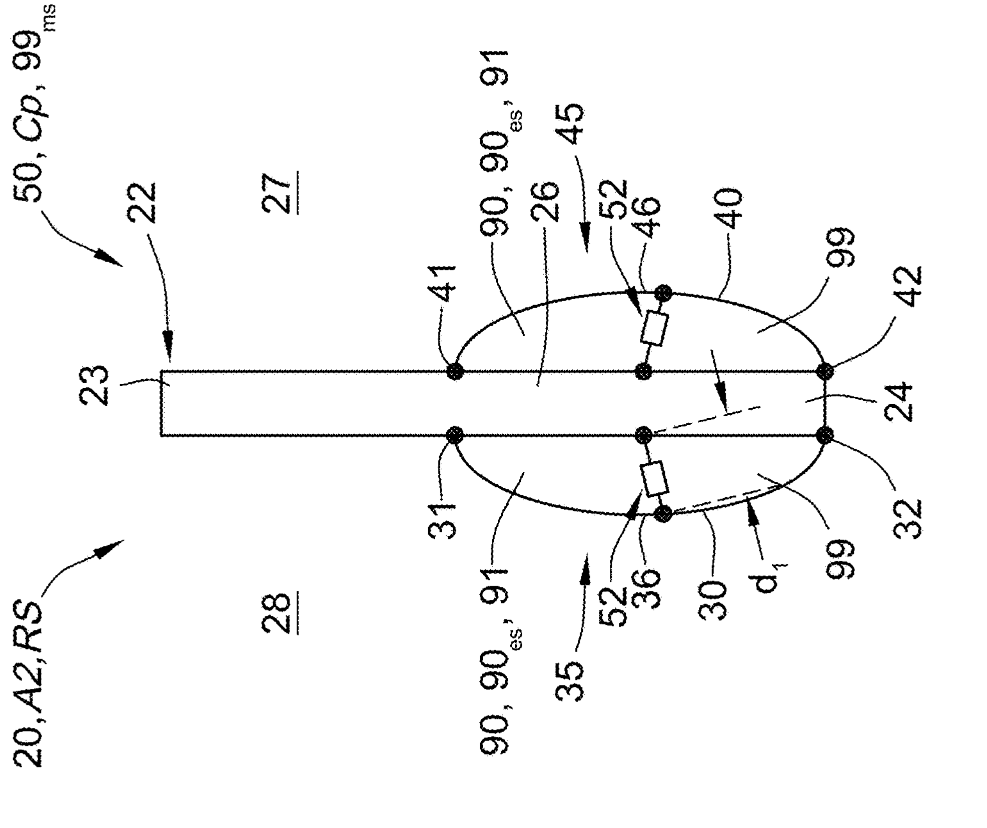
Figure 9A:
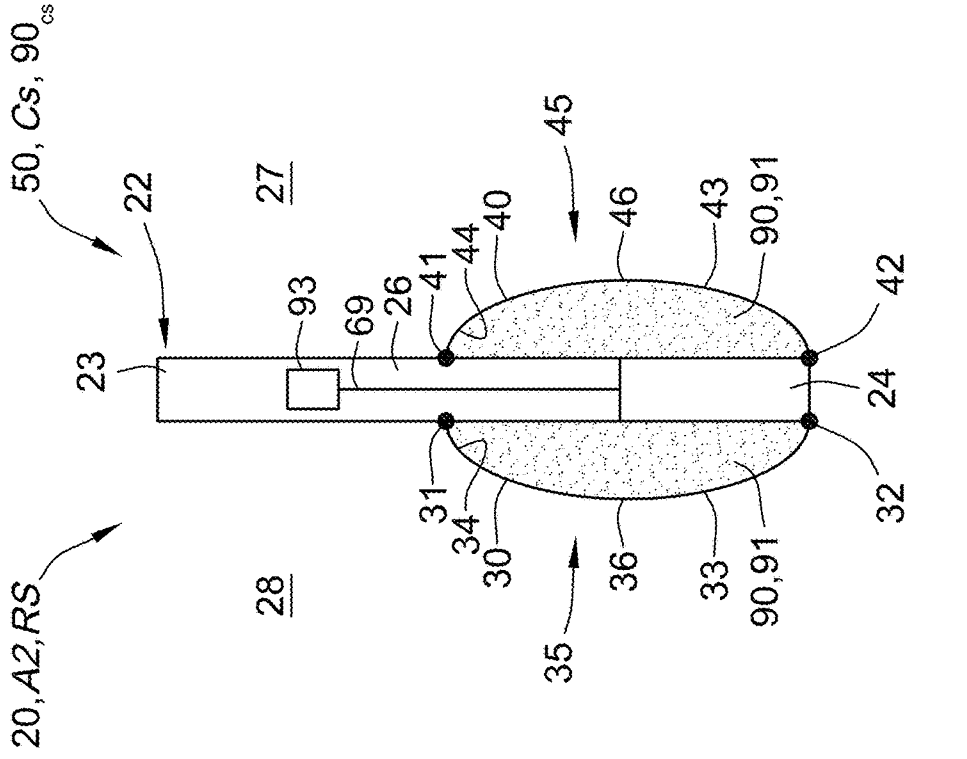
FIGS. 9A-B are schematic front views of a system for providing buoyancy for a vehicle, according to a secondary configuration of the second arrangement, in retracted and deployed states, respectively.
Figure 9B:
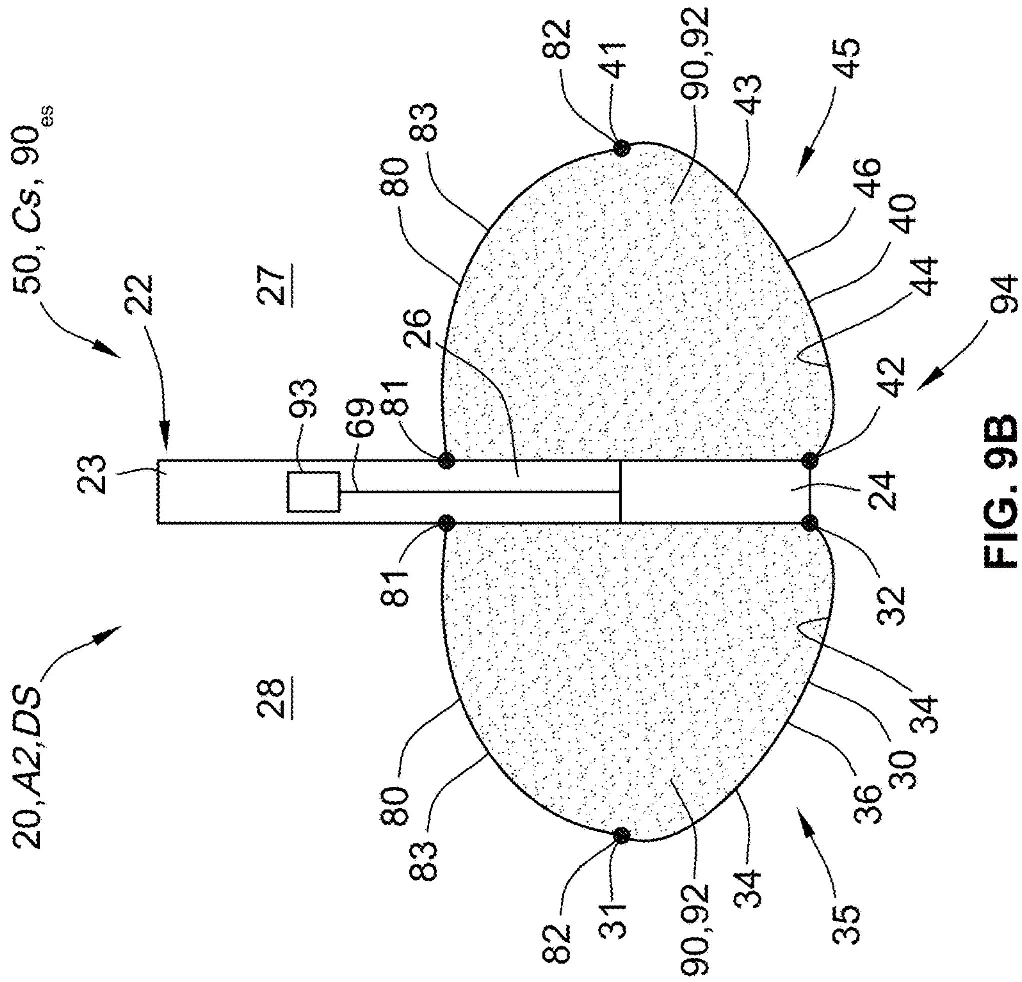
Figure 10B:
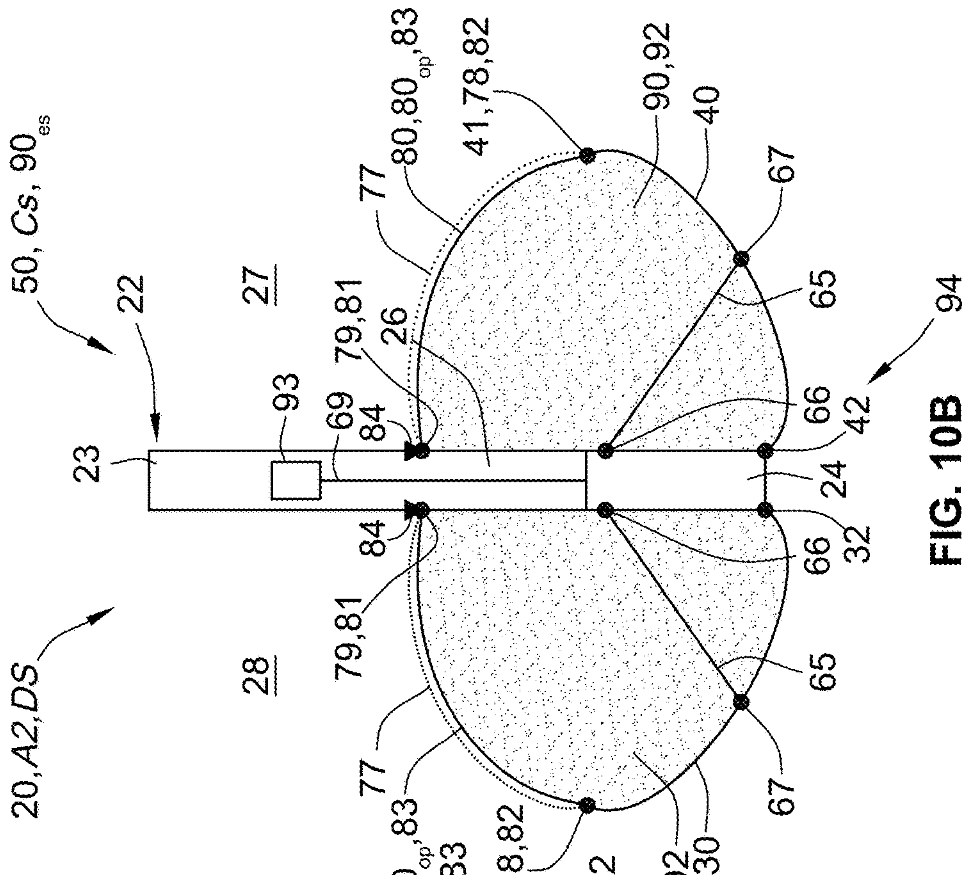
FIGS. 10A-B are schematic front views of the system shown in FIG. 9B but utilizing alternative elements.
Figure 10A:
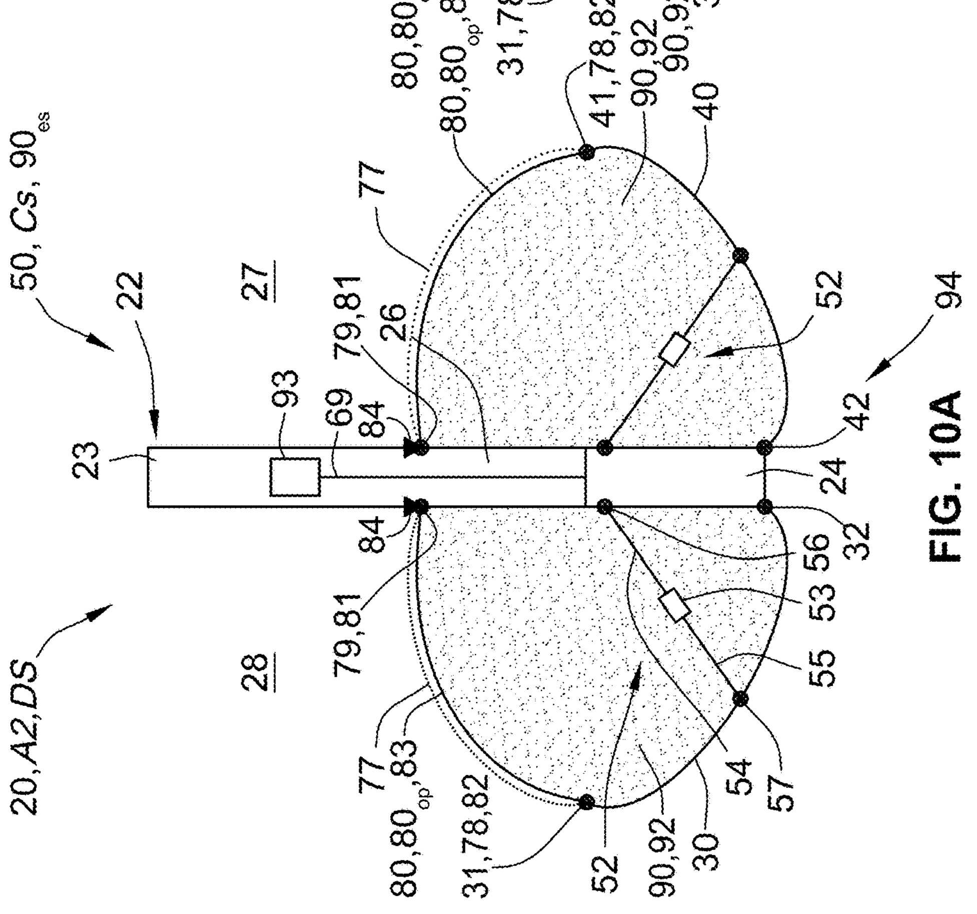
Figure 11B:
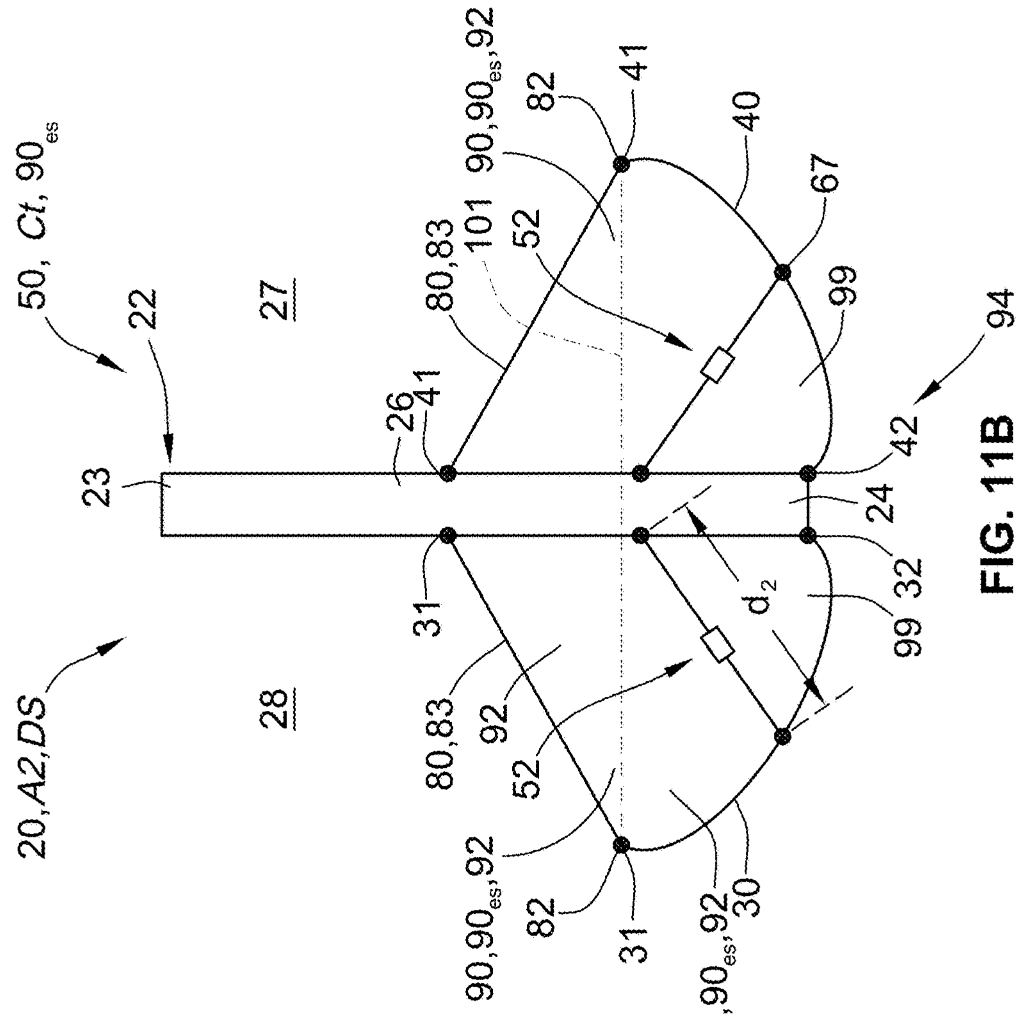
FIGS. 11A-B are schematic front views of a system for providing buoyancy for a vehicle, according to a tertiary configuration of the second arrangement, in retracted and deployed states, respectively.
Figure 11A:
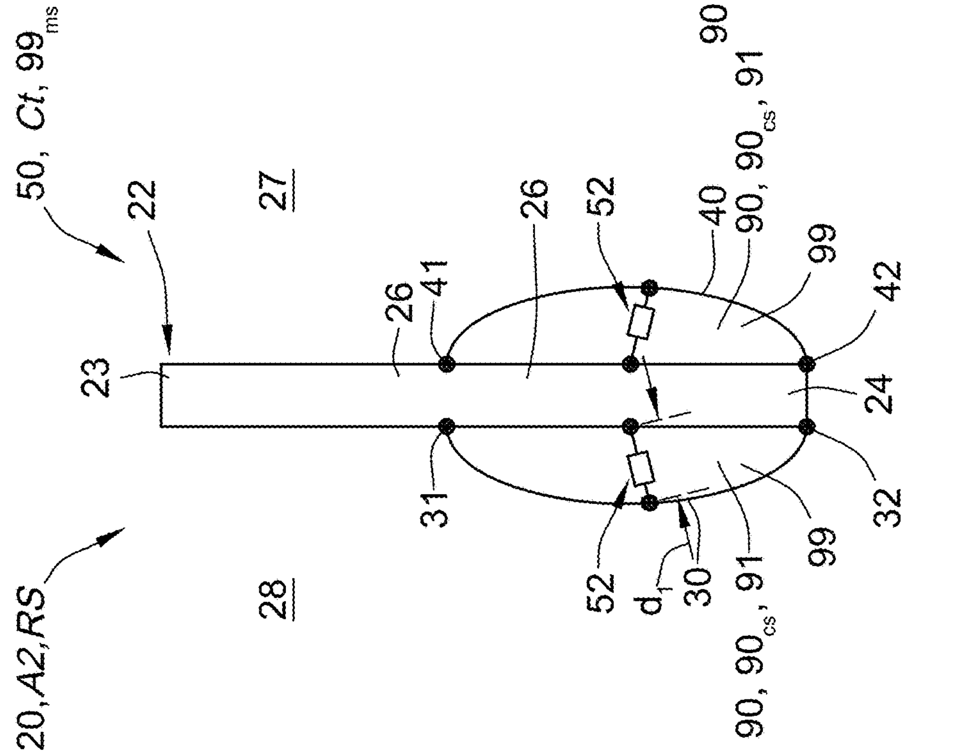
Figure 12B:
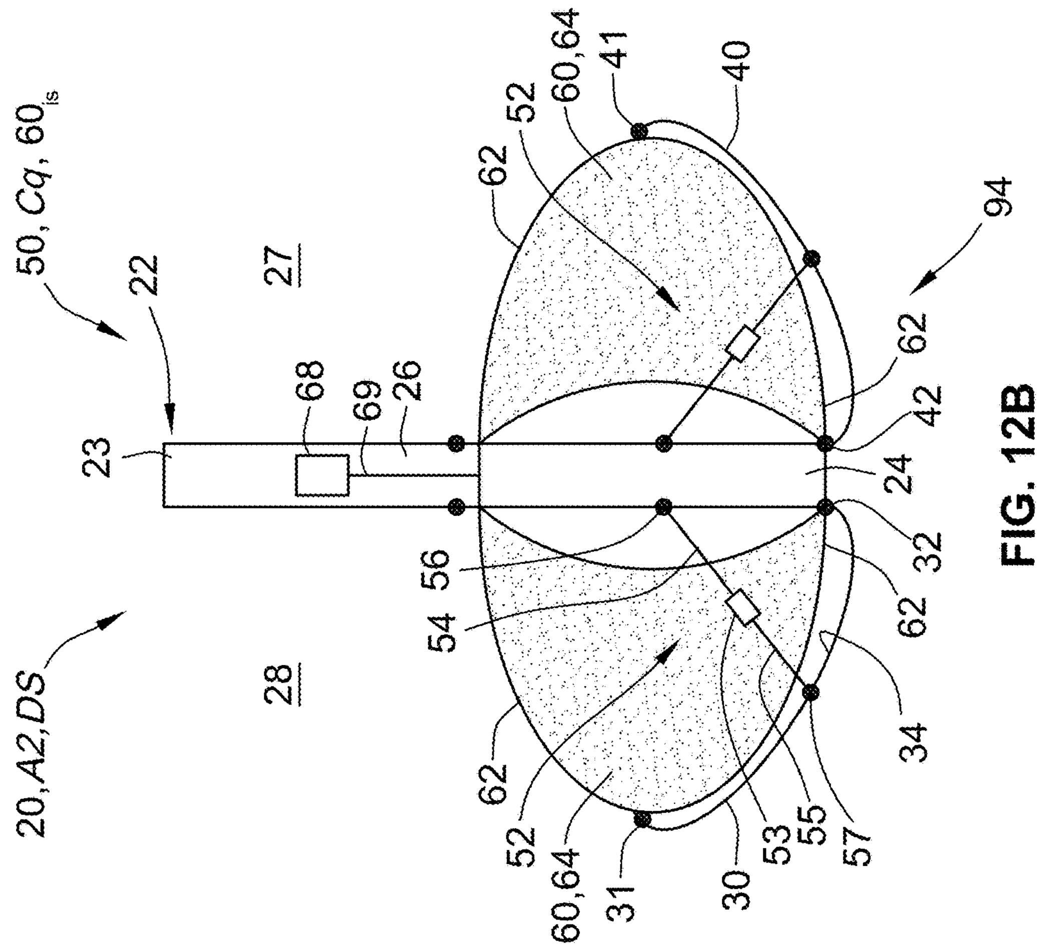
FIGS. 12A-B are schematic front views of a system for providing buoyancy for a vehicle, according to a quaternary configuration of the second arrangement, in retracted and deployed states, respectively.
Figure 12A:
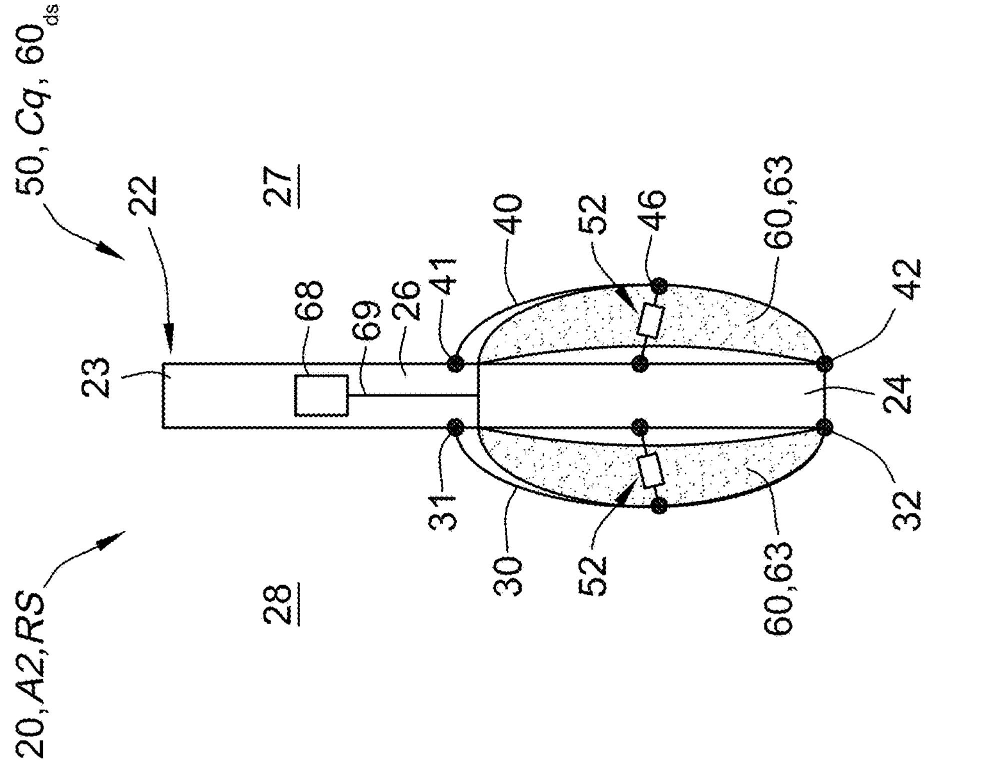
Figure 13B:
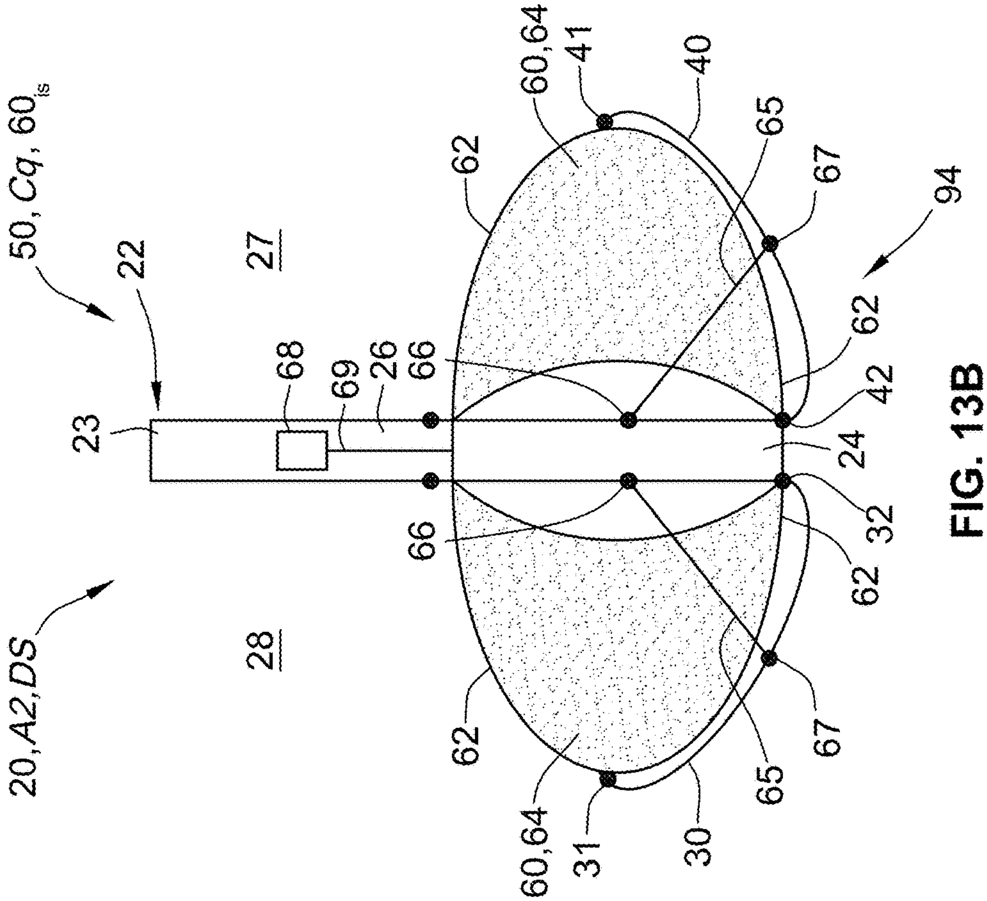
FIGS. 13A-B are schematic front views of the system shown in FIG. 12B but utilizing alternative elements.
Figure 13A:
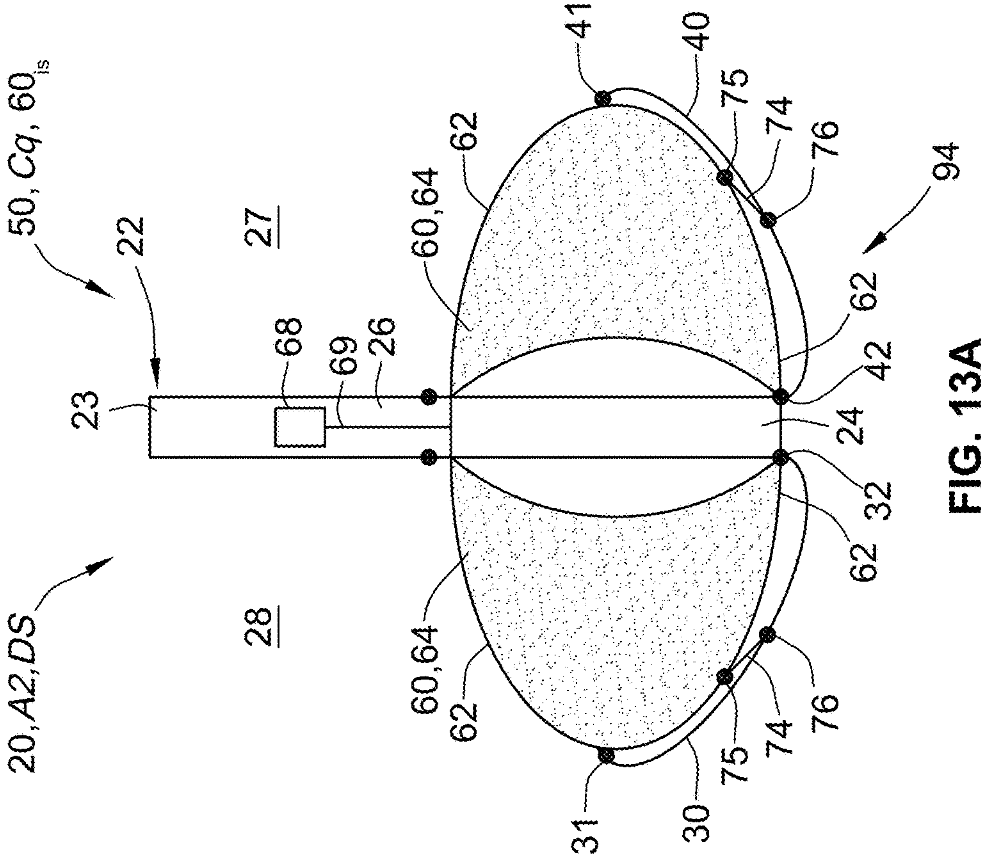

FIGS. 8A-B show a primary configuration Cp of the second arrangement A2 in respective retracted and deployed states RS, DS. FIGS. 9A-B show a secondary configuration Cs of the second arrangement A2 in respective retracted and deployed states RS, DS, and FIGS. 10A-B show the system 20 illustrated in FIG. 9B but utilizing alternative elements. FIGS. 11A-B show a tertiary configuration Ct of the second arrangement A2 in respective retracted and deployed states RS, DS. FIGS. 12A-B show a quaternary configuration Cq of the second arrangement A2 in respective retracted and deployed states RS, DS, and FIGS. 13A-B show the system 20 illustrated in FIG. 12B but utilizing alternative elements.

Figure 14B:
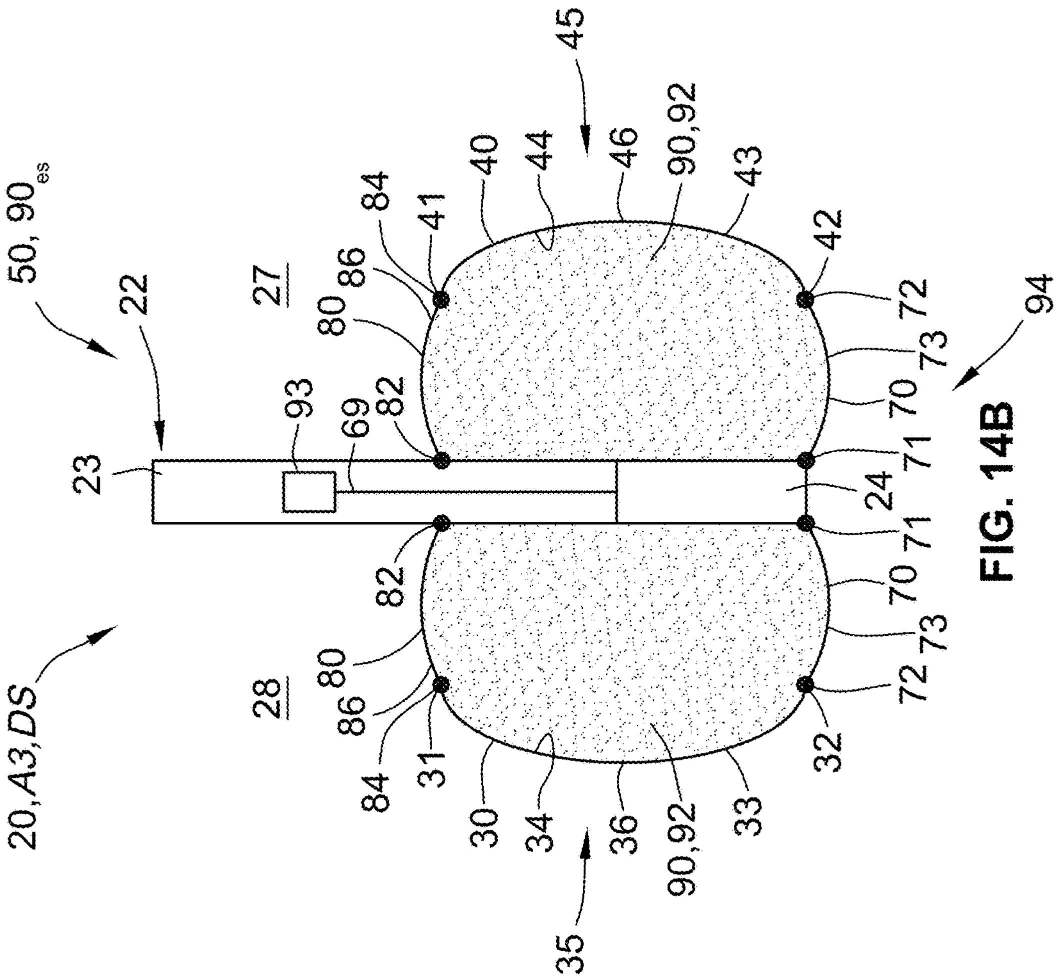
FIGS. 14A-B are schematic front views of a system for providing buoyancy for a vehicle, according to third arrangement, in retracted and deployed states, respectively.
Figure 14A:
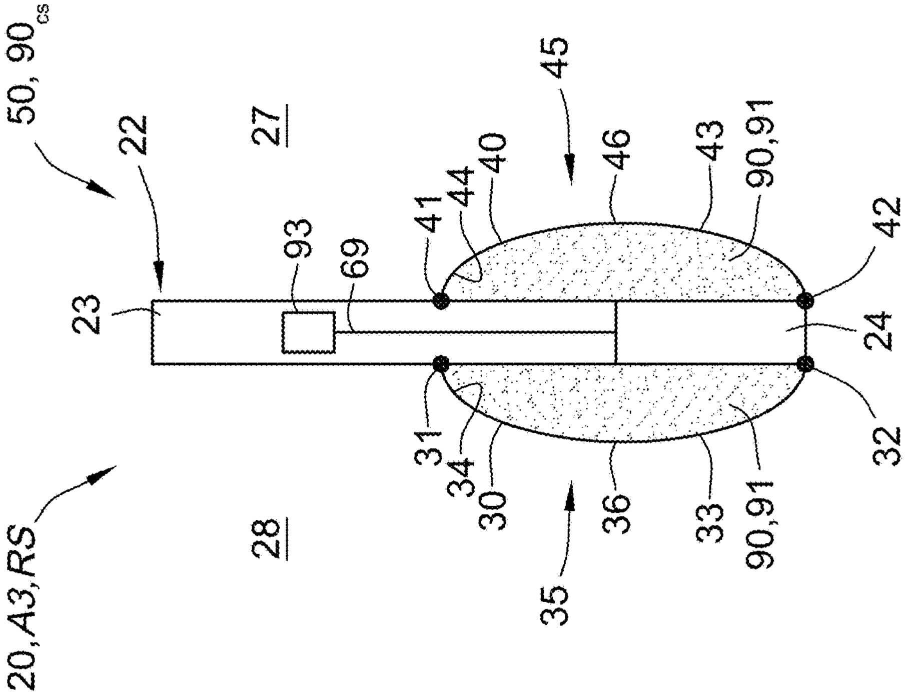
Figure 15B:
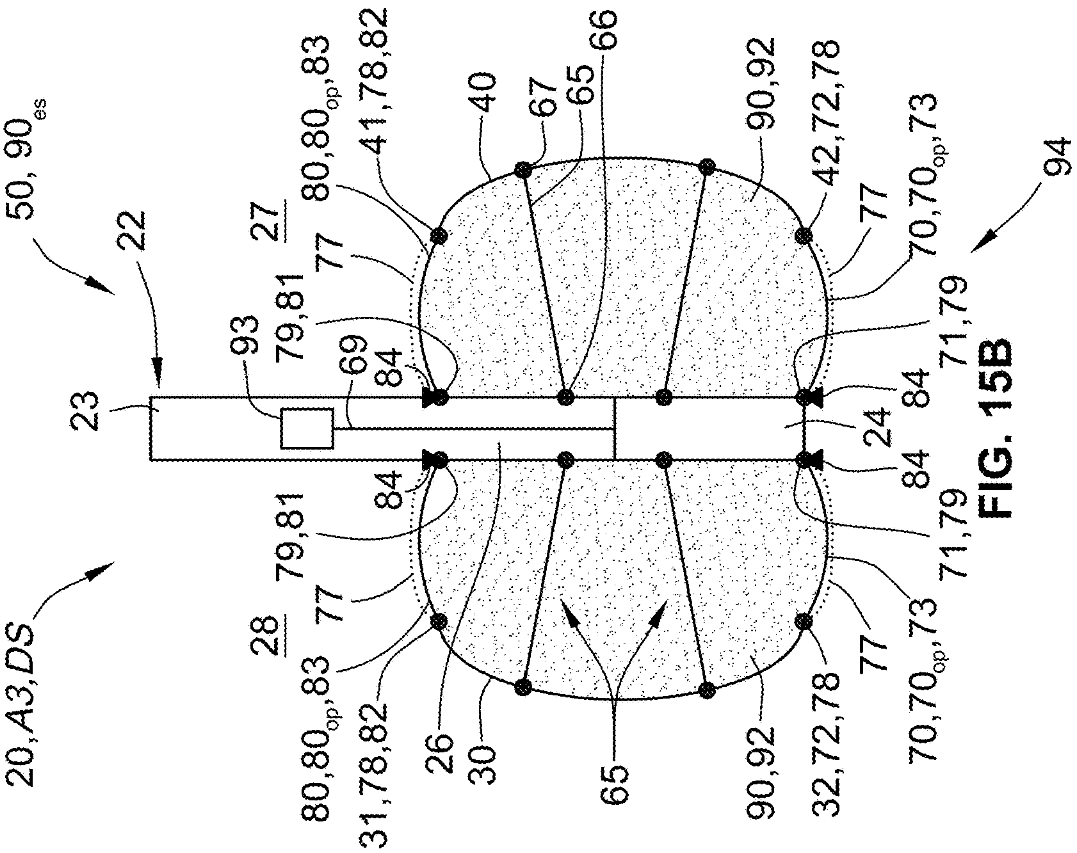
FIGS. 15A-B are schematic front views of the system shown in FIG. 14B but utilizing alternative elements.
Figure 15A:
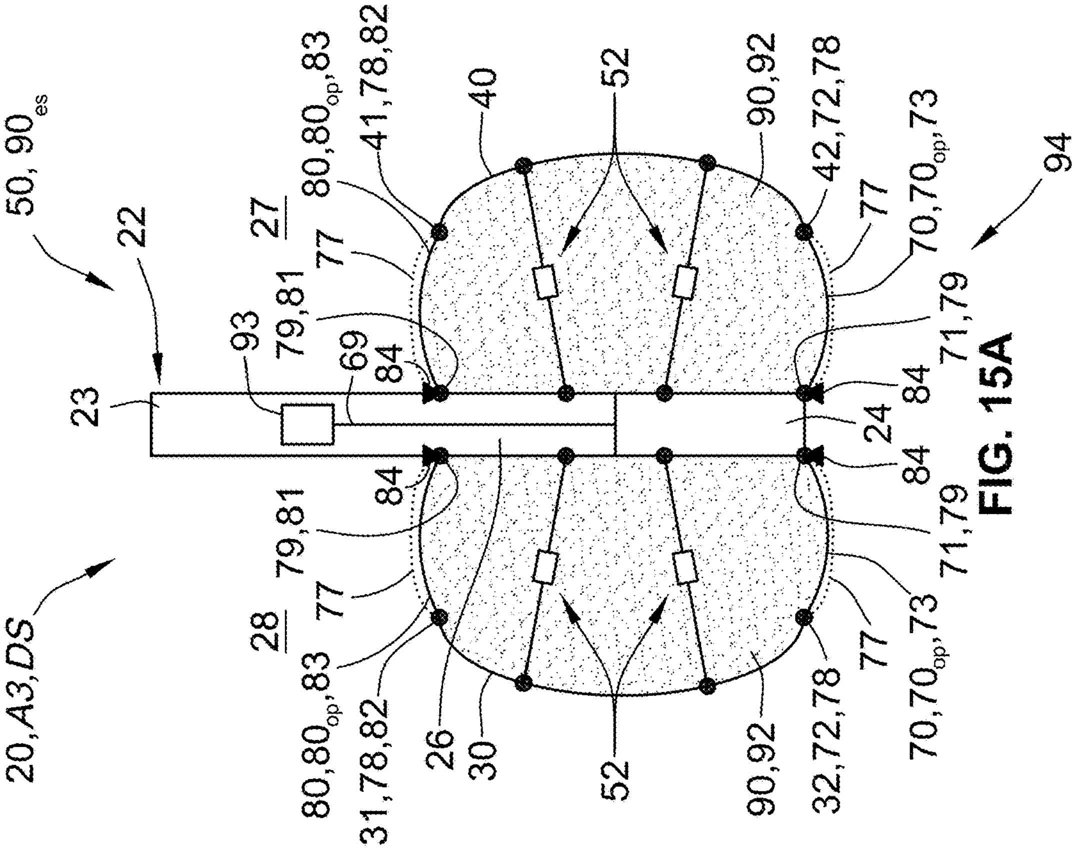

FIGS. 14A-B show the third arrangement A3 in respective retracted and deployed states RS, DS, and FIGS. 15A-B show the system 20 illustrated in FIG. 14B but utilizing alternative elements.

Figure 16B:
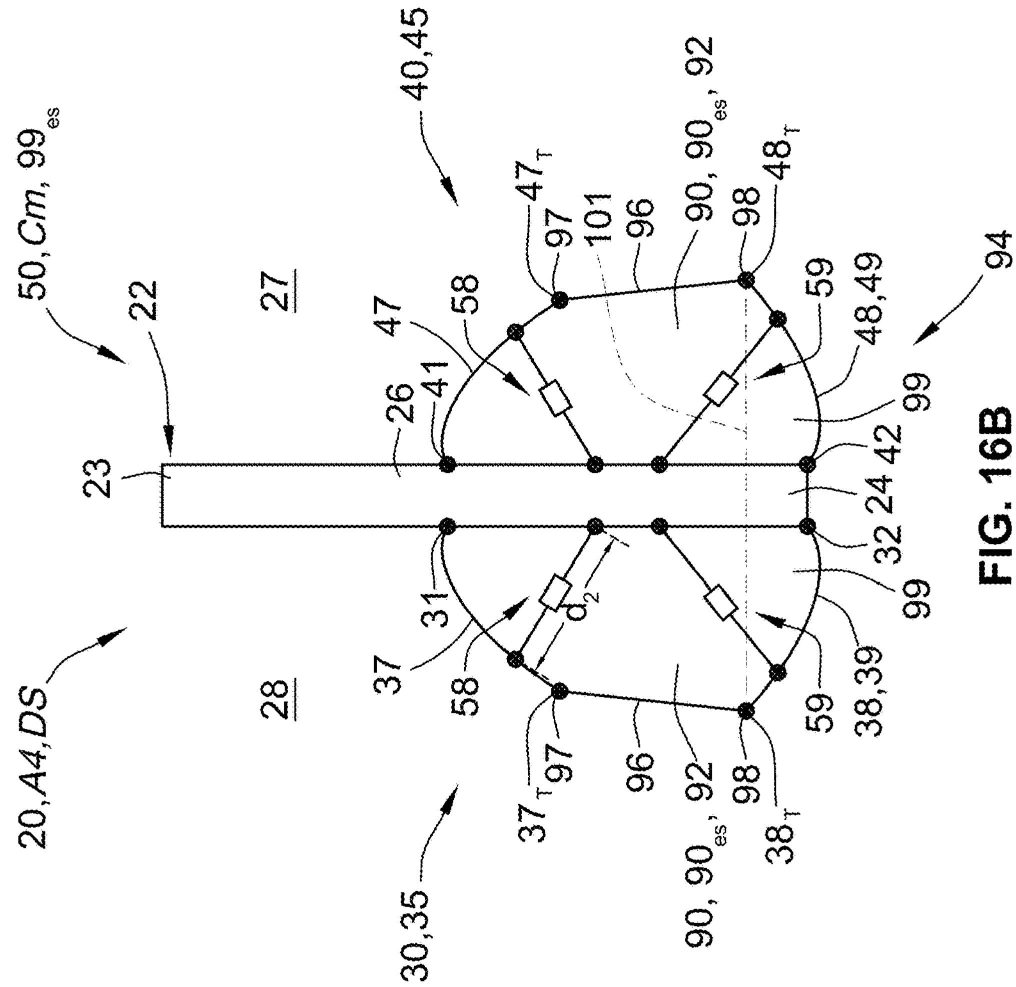
FIGS. 16A-B are schematic front views of a system for providing buoyancy for a vehicle, according to a main configuration of a fourth arrangement, in retracted and deployed states, respectively.
Figure 16A:
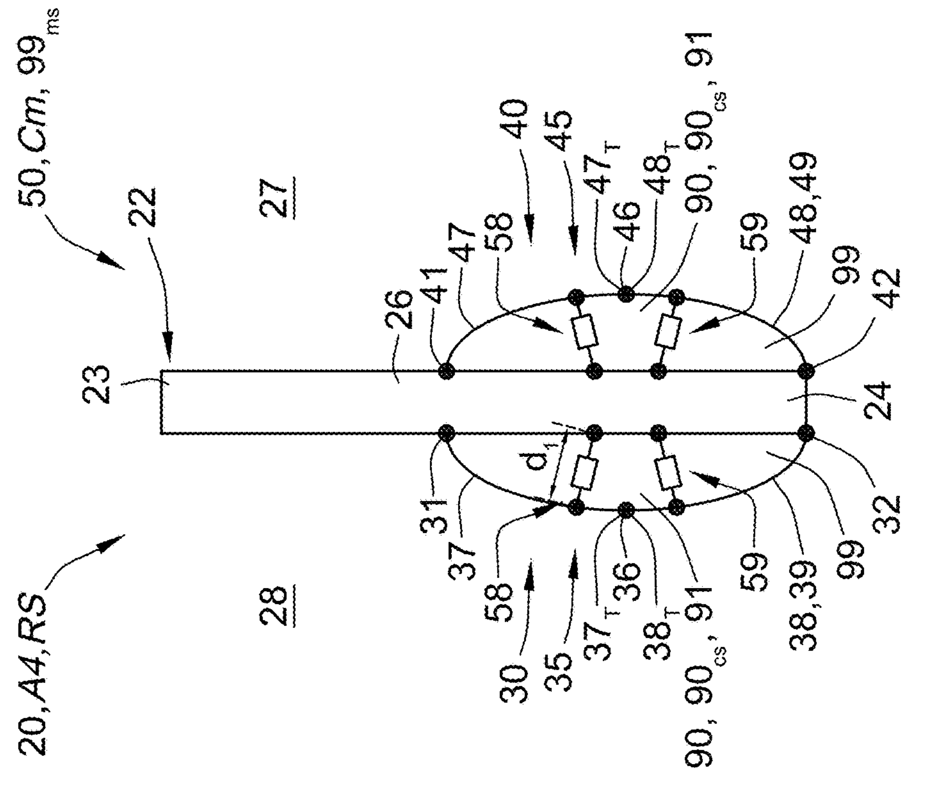
Figure 17A:
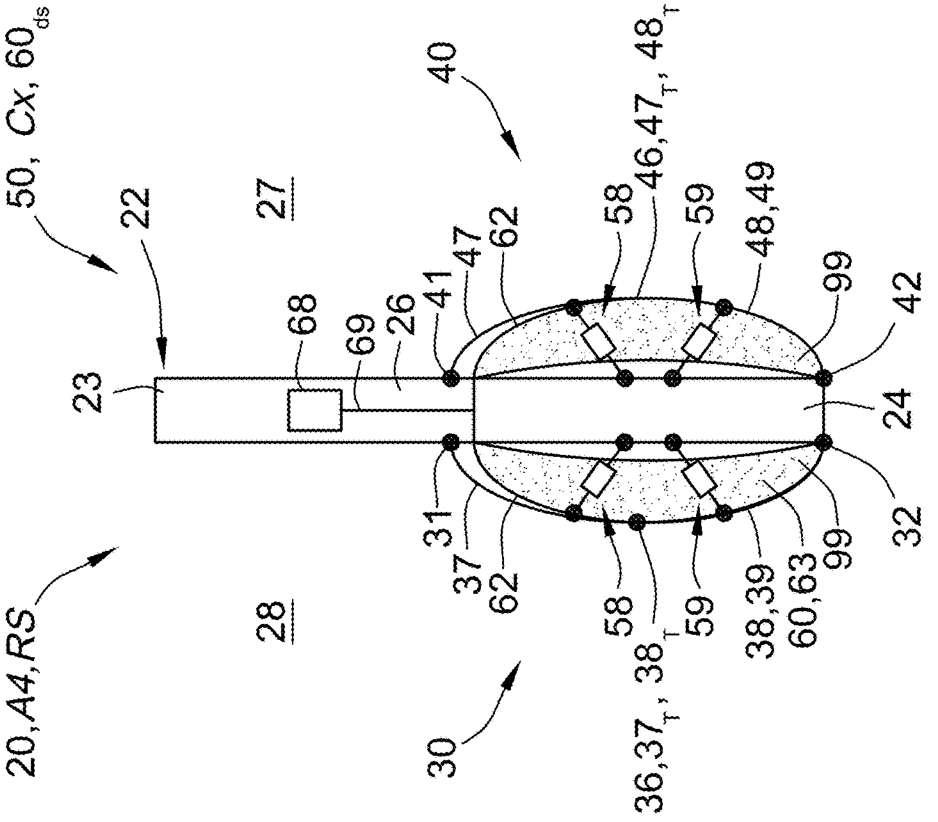
FIGS. 17A-B are schematic front views of a system for providing buoyancy for a vehicle, according to an auxiliary configuration of a fourth arrangement, in retracted and deployed states, respectively.
Figure 17B:
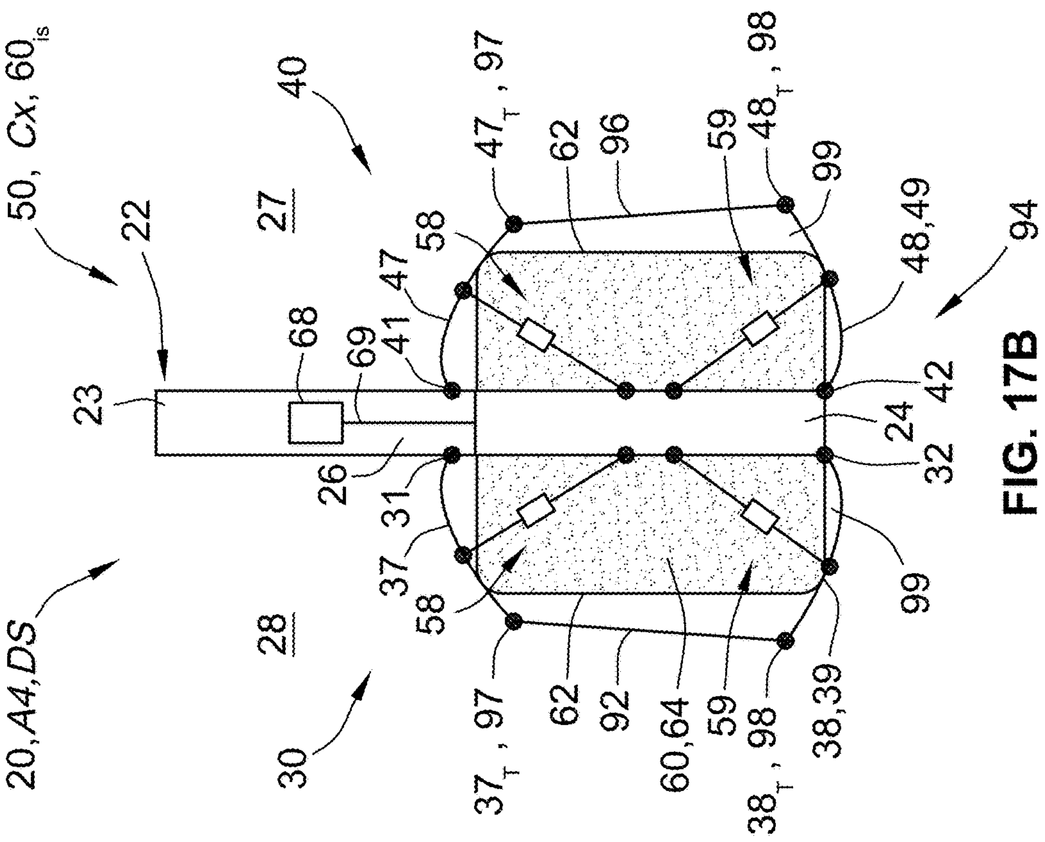
Figure 18B:
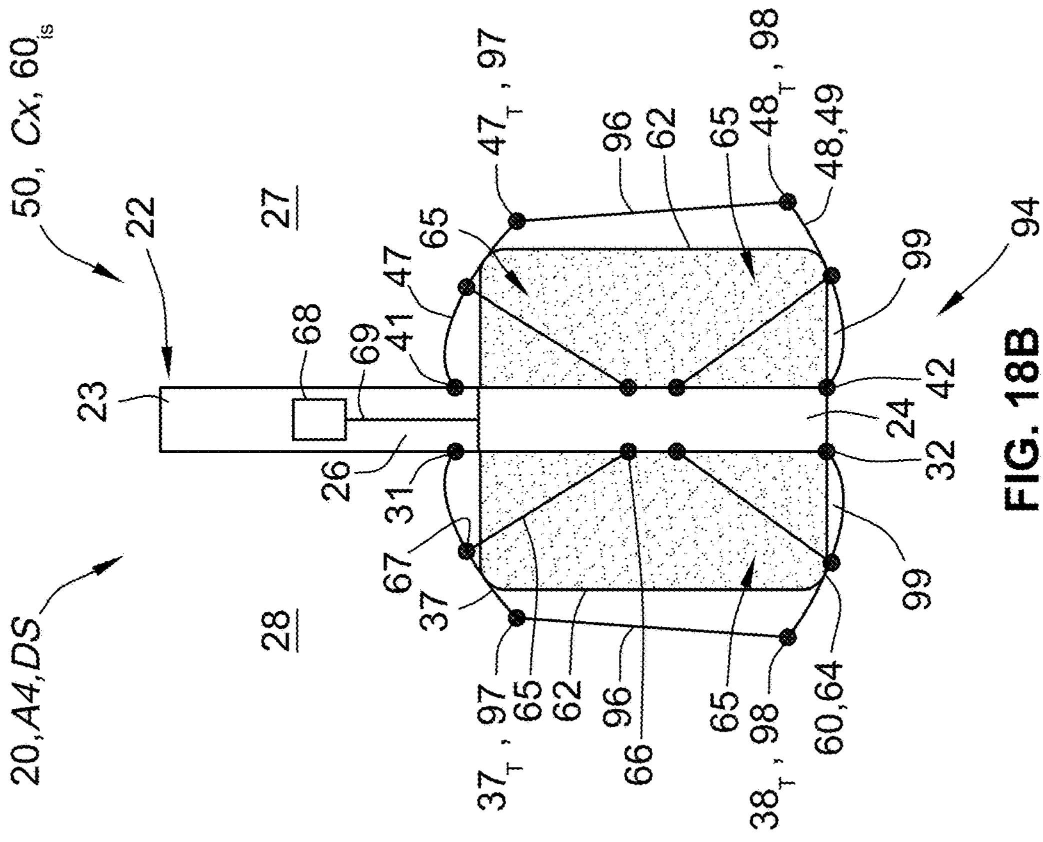
FIGS. 18A-B are schematic front views of the system shown in FIG. 17B but utilizing alternative elements.
Figure 18A:
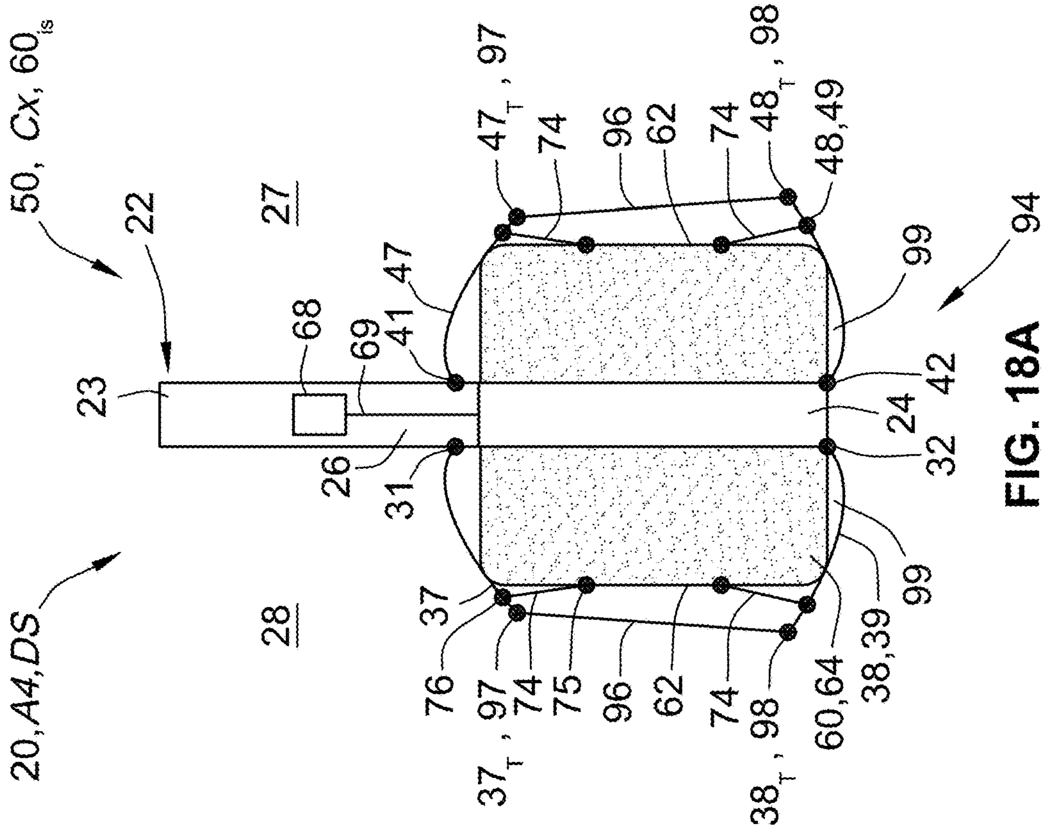
Figure 19B:
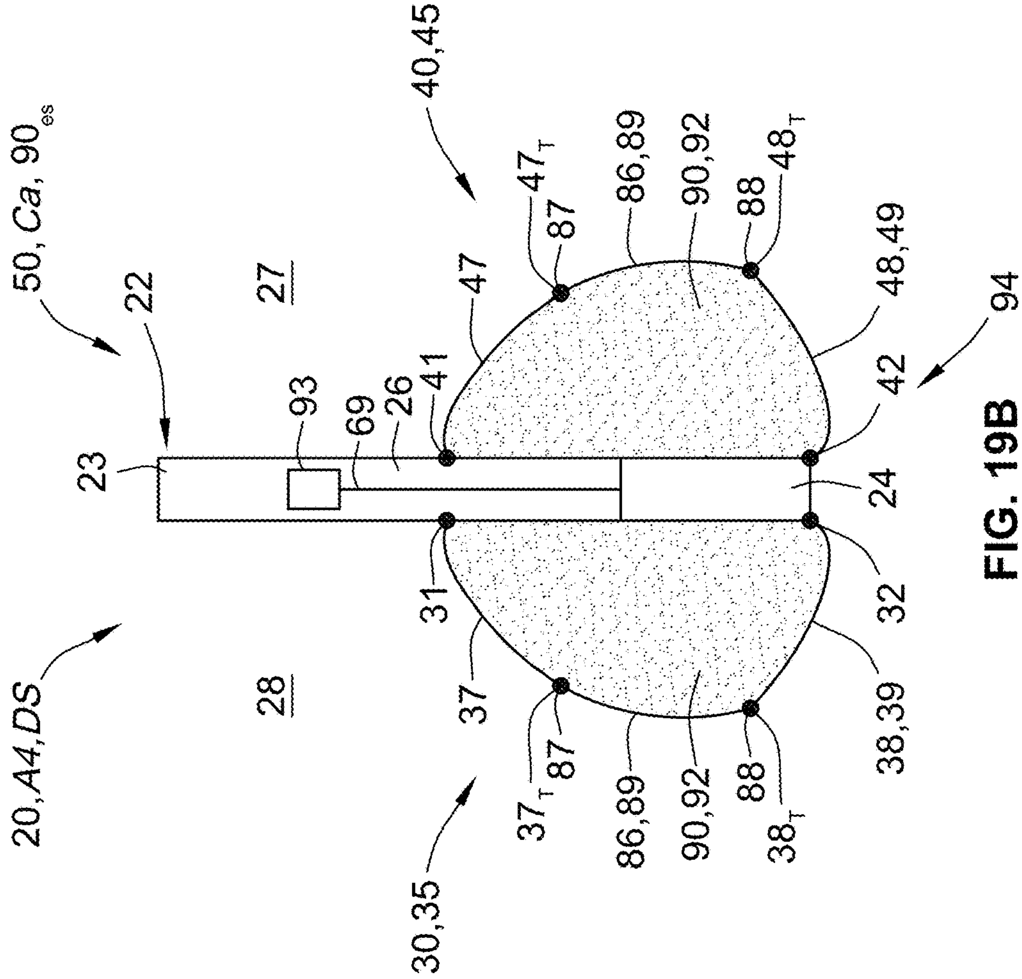
FIGS. 19A-B are schematic front views of a system for providing buoyancy for a vehicle, according to an alternative configuration of the fourth arrangement, in retracted and deployed states, respectively.
Figure 19A:
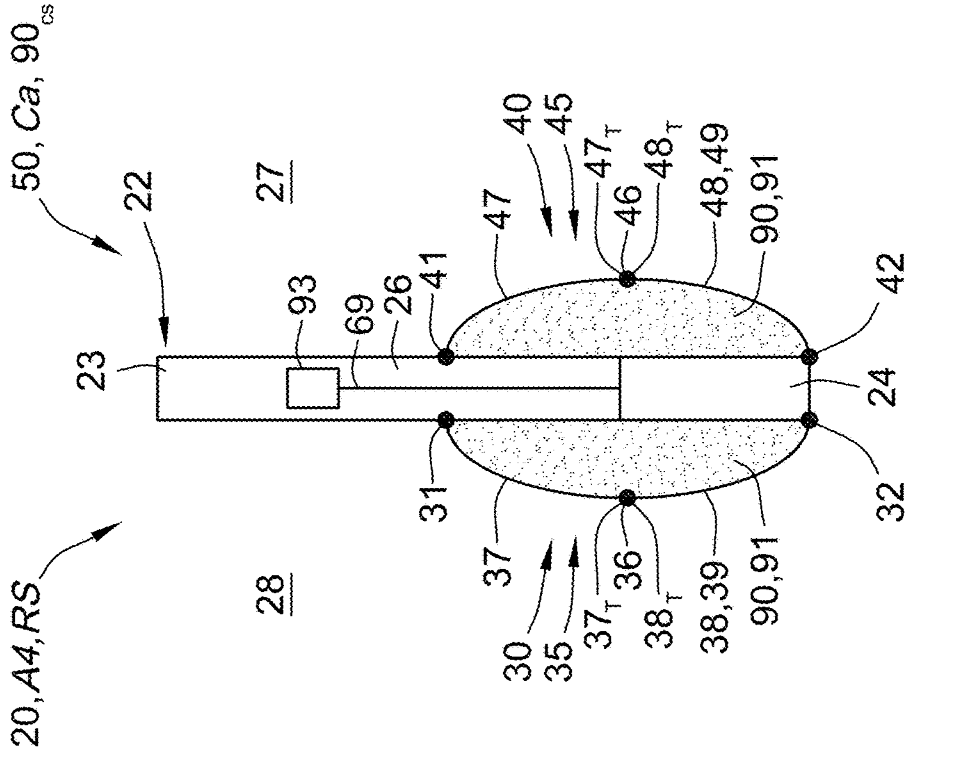
Figure 20B:
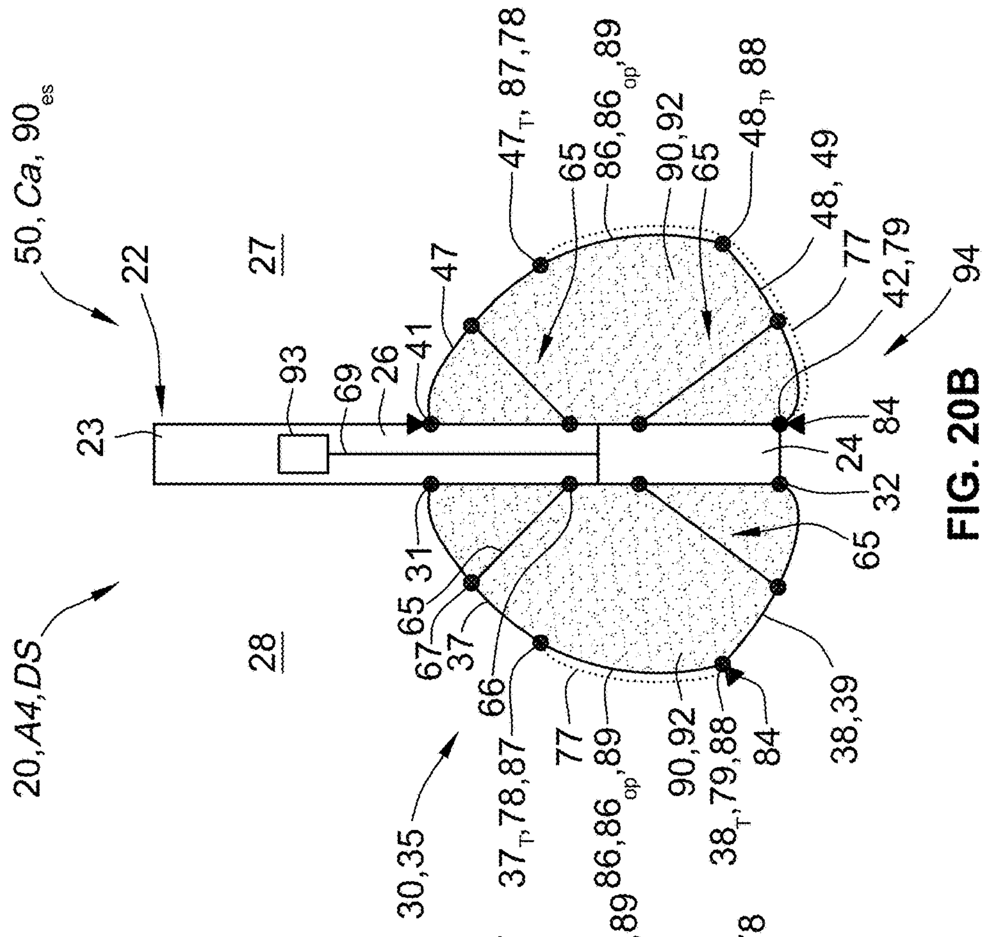
FIGS. 20A-B are schematic front views of the system shown in FIG. 19B but utilizing alternative elements.
Figure 20A:
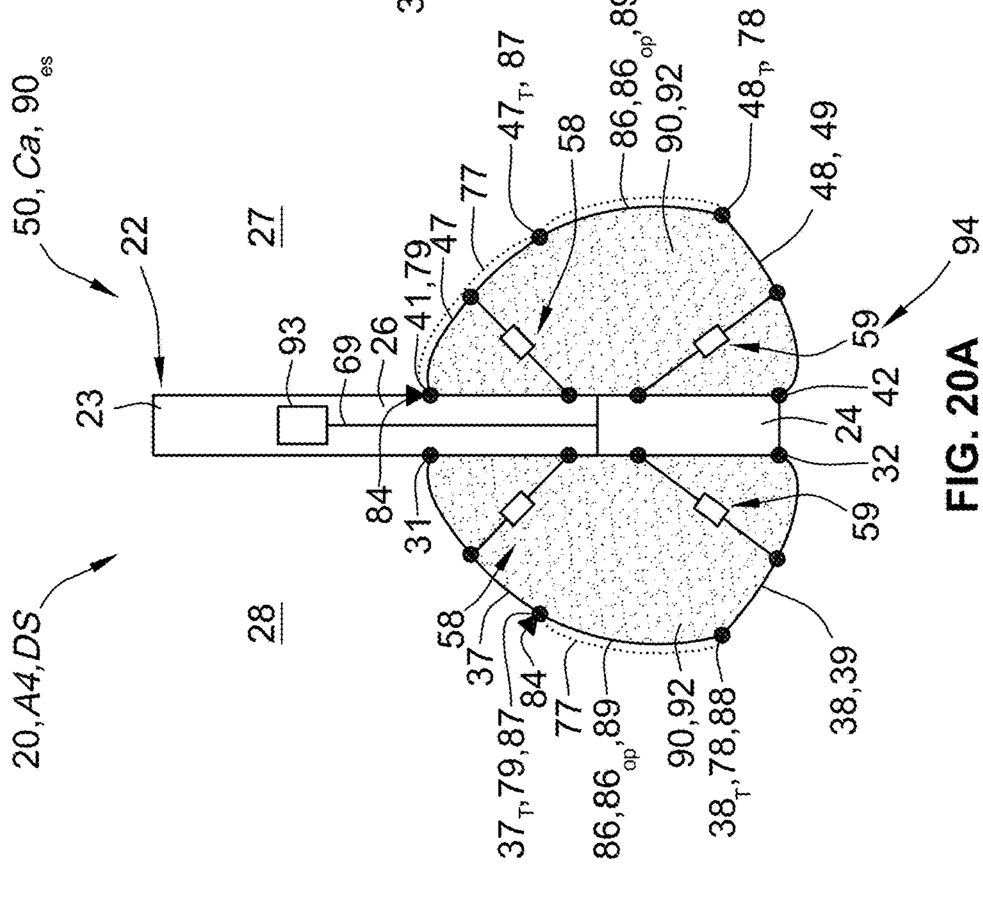
Figure 21B:
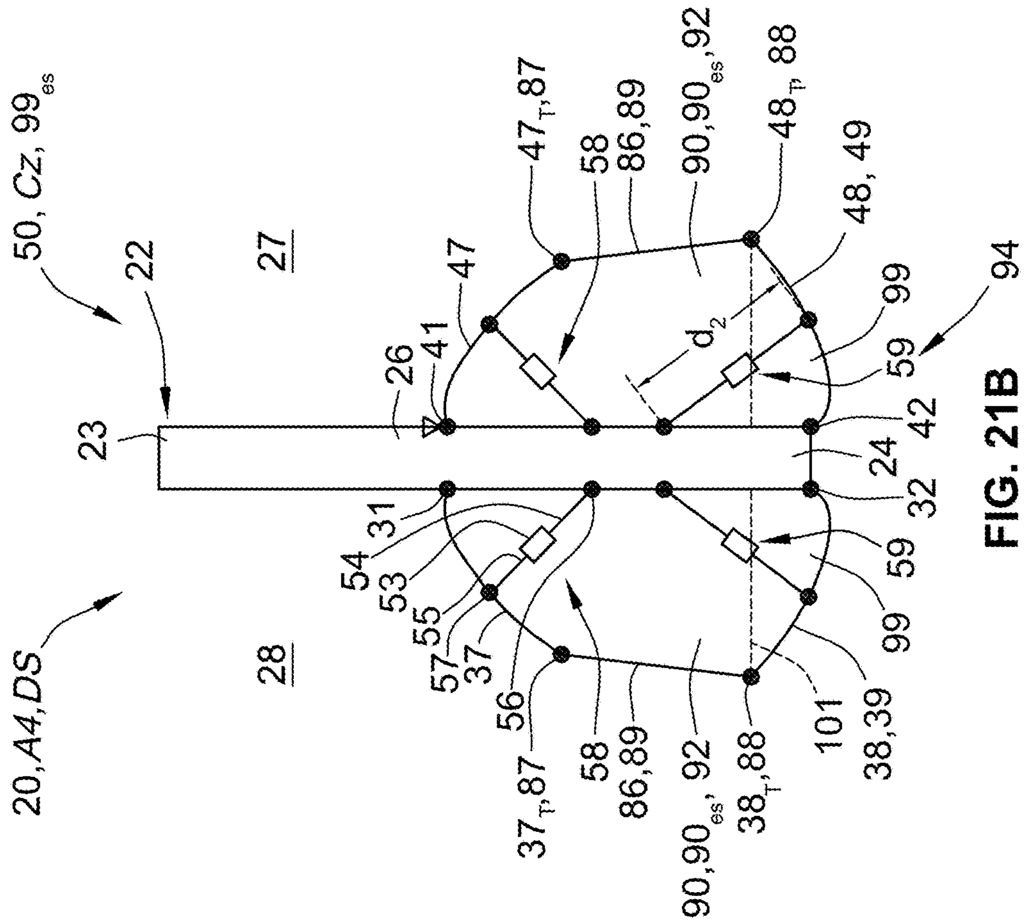
FIGS. 21A-B are schematic front views of a system for providing buoyancy for a vehicle, according to a supplemental configuration of the fourth arrangement, in retracted and deployed states, respectively.
Figure 21A:
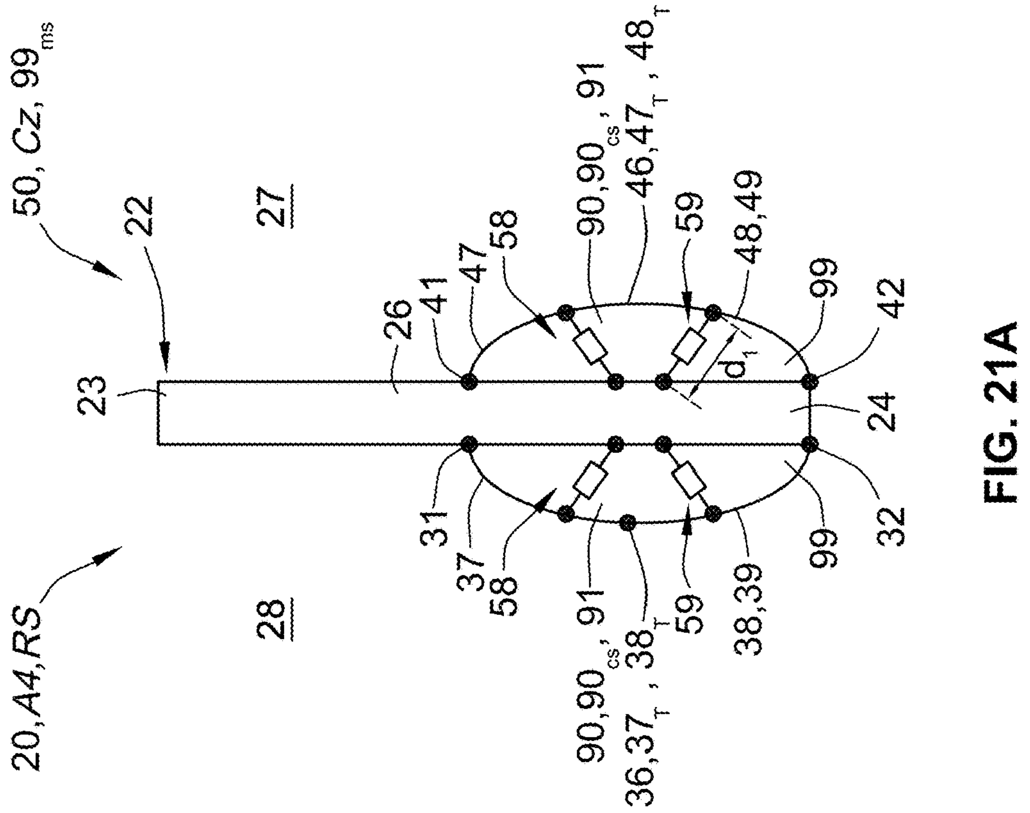
Figure 22:
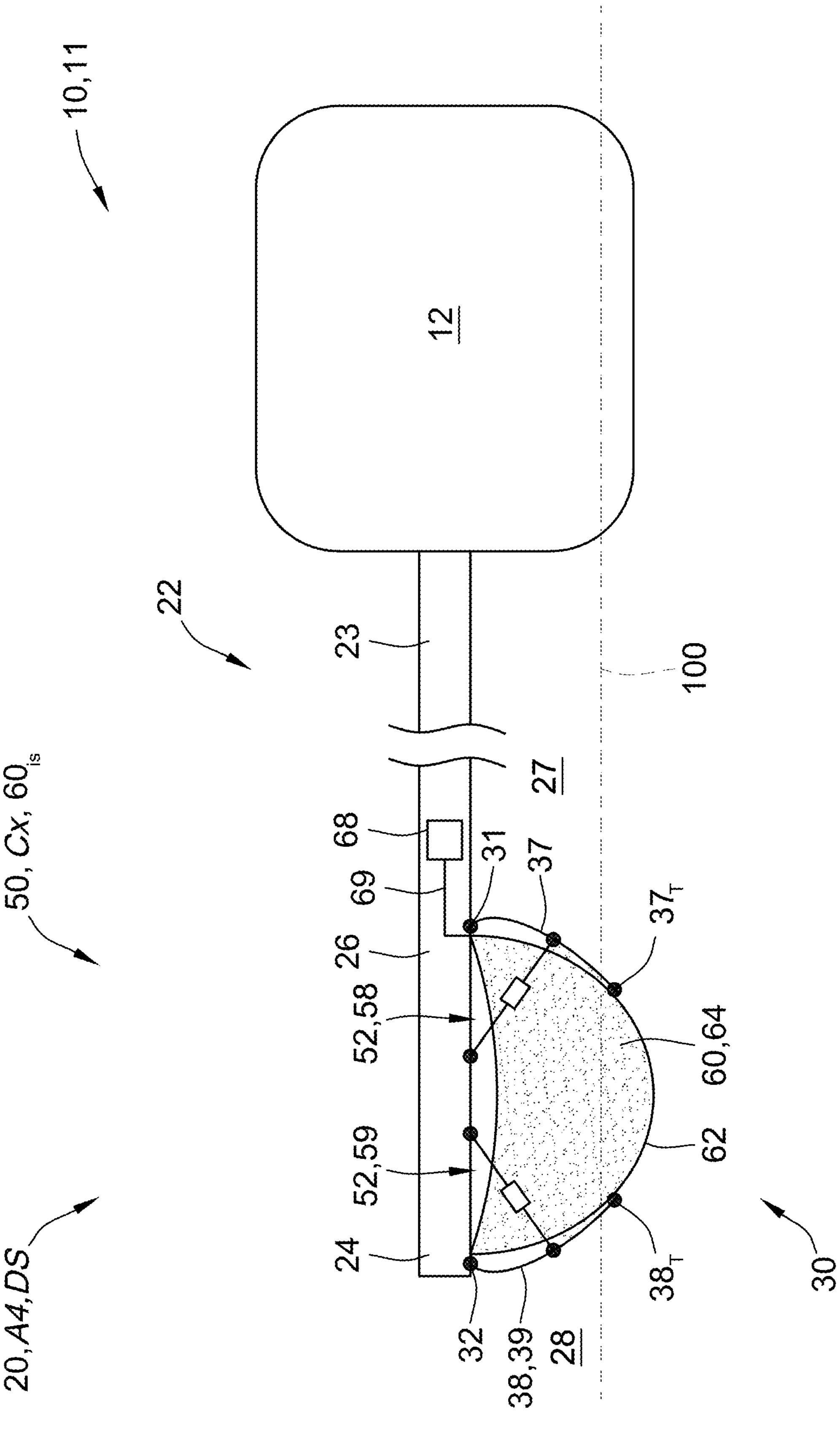
FIG. 22 is a schematic front view of the system shown in FIG. 17B oriented in a generally horizontal orientation and attached to a vehicle, without a spray skirt.

FIGS. 16A-B show a main configuration Cm of the fourth arrangement A4 in respective retracted and deployed states RS, DS. FIGS. 17A-B show an auxiliary configuration Cx of the fourth arrangement A4 in respective retracted and deployed states RS, DS, and FIGS. 18A-B show the system 20 illustrated in FIG. 17B but utilizing alternative elements. FIGS. 19A-B show an alternative configuration Ca of the fourth arrangement A4 in respective retracted and deployed states RS, DS, and FIGS. 20A-B show the system 20 illustrated in FIG. 19B but utilizing alternative elements. FIGS. 21A-B show a supplemental configuration Cz of the fourth arrangement A4 in respective retracted and deployed states RS, DS. Finally, FIG. 22 shows the system 20 illustrated in FIG. 17B, but oriented in a generally horizontal orientation and attached to a vehicle 10, and without a spray skirt 96.

These various combinations of arrangements and configurations may be summarized as shown in the table below.

TABLE 1

| Arrangements and Configurations of the System 20 | | | |
|---|---|---|---|
| Arrangements | Configurations | FIGS. | Mechanism 50 for moving first shell 30 |
| First arrangement A1 (pivot at top) | First configuration C1 | 2A-3B | Balloon 60 + inflator 68 |
| | | 4A-B | Same as above, with extender 95 added |
| | Second configuration C2 | 5A-6B | Enclosed interior 90 + inflator 93 |
| | Third configuration C3 | 7A-B | Enclosed interior 90 + actuator 52 |
| Second arrangement A2 (pivot at bottom) | Primary configuration Cp | 8A-B | Actuator 52 |
| | Secondary configuration Cs | 9A-10B | Enclosed interior 90 + inflator 93 |
| | Tertiary configuration Ct | 11A-B | Enclosed interior 90 + actuator 52 |
| | Quaternary configuration Cq | 12A-13B | Balloon 60 + inflator 68 |
| Third arrangement A3 (no pivots) | — | 14A-15B | Enclosed interior 90 + inflator 93 |
| Fourth arrangement A4 (pivots at top and bottom) | Main configuration Cm | 16A-B | Upper and lower actuators 58, 59 |
| | Auxiliary configuration Cx | 17A-18B, 22 | Balloon 60 + inflator 68 |
| | Alternative configuration Ca | 19A-20B | Enclosed interior 90 + inflator 93 |
| | Supplemental configuration Cz | 21A-B | Enclosed interior 90 + upper and lower actuators 58, 59 |

Note that while TABLE 1 mentions a first shell 30, it should be appreciated that TABLE 1 may also apply to an optional second shell 40 as well. Additionally, while selected components are listed as relating to a mechanism 50 for moving the first shell 30, it should be appreciated that the mechanism 50 may also include additional components, and the mechanism 50 may also be used to move the optional second shell 40 as well. Moreover, TABLE 1 is provided as a quick reference tool, and should not be used to limit the scope of any arrangement or configuration of the mechanism 50 or of the overall system 20 itself.

In each of the various arrangements and configurations, the system 20 includes a support structure 22, a first shell 30 attached directly or indirectly to the support structure 22, and a mechanism 50 configured to move the first shell 30 between a retracted state RS and a deployed state DS.

The support structure 22 has an upper support end 23, a lower support end 24 and a interlocated portion 26 between the upper and lower support ends 23, 24. Each of the upper and lower support ends 23, 24 may include the respective tip or extreme end of the support structure 22 and/or any portion(s) of the support structure 22 near or toward such respective tip or extreme end, and the interlocated portion 26 may include the middle or center of the support structure 22 and/or any portion(s) of the support structure 22 between the upper and lower support ends 23, 24. The support structure 22 may be configured for attachment to or integration with a vehicle 10, such as a seaplane 11 or other aircraft. For example, one support structure 22 may be attached to the starboard-side wing tip 16 of a seaplane/aircraft 11, and another support structure 22 may be attached to the port-side wing tip 16 of the seaplane/aircraft 11, with each of the support structures 22 being mounted in a generally vertical orientation and descending generally downward from the wing tip 16. When a support structure 22 is attached or integrated with a wing tip 16 in this manner, the support structure 22 has an inboard side 27 (i.e., between the wing tip 16 and the fuselage 12) and an outboard side 28 (i.e., laterally outward from the wing tip 16). Other orientations of the support structure 22 are possible as well, including generally horizontal and generally diagonal orientations. Additionally, note that while the support structure 22 is illustrated schematically in the drawings as a straight and elongate element, the support structure 22 is not limited to such form or shape; for example, the support structure 22 may be implemented in the form of a comparatively short and stubby shape with various non-straight contours or overall shape.

The first shell 30 has an upper first shell end 31 and a lower first shell end 32. The upper first shell end 31 may be attached directly or indirectly with the support structure 22 at the interlocated portions 26, and/or the lower first shell end 32 may be attached directly or indirectly with the support structure 22 at the lower support end 24, depending on the particular arrangement and configuration of the system 20. The system 20 may optionally include a second shell 40 as well, with one of the first and second shells 30, 40 being disposed on the inboard side 27 and the other of the first and second shells 30, 40 being disposed on the outboard side 28. Like the first shell 30, the second shell 40 may have an upper second shell end 41 and a lower second shell end 42. In some implementations, the first and second shells 30, 40 may be generally rigid. As described in further detail below, the upper first and second shell ends 31, 41 may be attached directly or indirectly to opposing sides 27, 28 of the interlocated portion 26, and/or the lower first and second shell ends 32, 42 may be attached directly or indirectly to opposing sides 27, 28 of the lower support end 24, depending on the particular arrangement and configuration of the system 20.

The mechanism 50 is configured to move the first shell 30 and optional second shell 40 between a retracted state RS and a deployed state DS. In the retracted state RS as shown in FIGS. 2A, 5A, 7A, 8A, 9A, 11A, 12A, 14A, 16A, 17A, 19A and 21A, the upper first and second shell ends 31, 41 are disposed proximate the interlocated portion 26, and the lower first and second shell ends 32, 42 are disposed proximate the lower support end 24. And in the deployed state DS as shown in FIGS. 2B, 3A-B, 4A-B, 5B, 6A-B, 7B, 8B, 9B, 10A-B, 11B, 12B, 13A-B, 14B, 15A-B, 16B, 17B, 18A-B, 19B, 20A-B, 21B and 22, the upper first and second shell ends 31, 41 are moved away from the interlocated portion 26, and/or the lower first and second shell ends 32, 42 are moved away from the lower support end 24, depending on the particular arrangement and configuration of the system 20.

The mechanism 50 may assume various forms and may include various components, and the first and second shells 30, 40 may be directly or indirectly attached to the support structure 22 in various ways, depending on the particular arrangement and configuration of the system 20, as now described in detail below.

In a first arrangement A1, as shown in FIGS. 2A-7B, the upper first and second shell ends 31, 41 are pivotably attached to the interlocated portion 26, with the lower first and second shell ends 32, 42 being unattached to or detachable from the support structure 22. Thus, in this first arrangement A1, in the retracted state RS the lower first and second shell ends 32, 42 may be disposed proximate or against the lower support end 24, and in the deployed state DS the lower first and second shell ends 32, 42 may be moved away from the support structure 22 by the mechanism 50.

In a second arrangement A2, as shown in FIGS. 8A-13B, the lower first and second shell ends 32, 42 are pivotably attached to the lower support end 24, with the upper first and second shell ends 31, 41 being unattached to or detachable from the support structure 22. Thus, in this second arrangement A2, in the retracted state RS the upper first and second shell ends 31, 41 may be disposed proximate or against the interlocated portion 26, and in the deployed state DS the upper first and second shell ends 31, 41 may be moved away from the support structure 22 by the mechanism 50.

In a third arrangement A3, as shown in FIGS. 14A-15B, neither the upper first and second shell ends 31, 41 nor the lower first and second shell ends 32, 42 are pivotably attached to the support structure 22; however, the upper first and second shell ends 31, 41 are indirectly attached to the interlocated portion 26, and the lower first and second shell ends 32, 42 are indirectly attached to the lower support end 24, as explained in further detail below. In this third arrangement A3, in the retracted state RS the upper first and second shell ends 31, 41 may be disposed proximate or against the interlocated portion 26 and the lower first and second shell ends 32, 42 may be disposed proximate or against the lower support end 24, and in the deployed state DS both the upper first and second shell ends 31, 41 and the lower first and second shell ends 32, 42 may be moved away from the support structure 22 by the mechanism 50.

In a fourth arrangement A4, as shown in FIGS. 16A-22, the upper first and second shell ends 31, 41 are pivotably attached to the interlocated portion 26, and the lower first and second shell ends 32, 42 are pivotably attached to the lower support end 24, with the first shell 30 being split, divided, bifurcated or otherwise separated into an upper first shell 37 and a lower first shell 38, and the second shell 40 being split, divided, bifurcated or otherwise separated into an upper second shell 47 and a lower second shell 48. Here, the upper first shell 37 includes the upper first shell end 31 and an upper first shell termination $\mathbf{37}_T$ opposite the upper first shell end 31, and the lower first shell 38 includes the lower first shell end 32 and a lower first shell termination $\mathbf{38}_T$ opposite the lower first shell end 32. Similarly, the upper second shell 47 includes the upper second shell end 41 and an upper second shell termination $\mathbf{47}_T$ opposite the upper second shell end 41, and the lower second shell 38 includes the lower second shell end 42 and a lower second shell termination $\mathbf{48}_T$ opposite the lower second shell end 42. In this fourth arrangement A4, in the retracted state RS, the upper and lower first shell terminations $\mathbf{37}_T$, $\mathbf{38}_T$ may be disposed proximate or against each other and the upper and lower second shell terminations $\mathbf{47}_T$, $\mathbf{48}_T$ may be disposed proximate or against each other; and in the deployed state DS, the upper and lower first shell terminations $\mathbf{37}_T$, $\mathbf{38}_T$ may be moved away from each other by the mechanism 50, and the upper and lower second shell terminations $\mathbf{47}_T$, $\mathbf{48}_T$ may also be moved away from each other by the mechanism 50. Note that while the upper and lower first shells 37, 38 are illustrated as being generally the same size as each other, and the upper and lower second shells 47, 48 are illustrated as being generally the same size as each other, with the first and second shells 30, 40 being generally the same size as each other, in some implementations some or all of the foregoing may be altered. For example, the upper first and second shells 37, 47 may be smaller in size that the lower first and second shells 38, 48; further, the overall shape and size of the first shell 30 (i.e., of the upper and lower first shells 37, 38 taken together) may be different from the overall shape and size of the second shell 30 (i.e., of the upper and lower second shells 47, 48 taken together).

The first shell 30 may have a generally C-shaped first cross-section 35 and a first vertex 36 between the upper and lower first shell ends 31, 32; similarly, the second shell 40 may also have a generally C-shaped second cross-section 45 and a second vertex 46 between the upper and lower second shell ends 41, 42. The generally C-shaped first cross-section 35 and the generally C-shaped second cross-section 45 may be substantially identical mirror images of each other, or they may be significantly different from each other. In the retracted state RS, while the upper and lower first shell ends 31, 32 and the upper and lower second shell ends 41, 42 are disposed proximate or against the support structure 22, the first and second vertices 36, 46 may be disposed a predetermined distance outward and away from the support structure 22, due to the curved profiles of the generally C-shaped first and second cross-sections 35, 45. In the deployed state DS, the first and second vertices 36, 46 may be disposed outward and away from the support structure 22 by a distance that is greater than the predetermined distance.

As mentioned above and as shown in TABLE 1, the system 20 may be presented in various arrangements—namely, a first arrangement A1, a second arrangement A2, a third arrangement A3 or a fourth arrangement A4—with some of these arrangements being presented in various configurations. These combinations of arrangements and configurations are now described in further detail below, with particular attention to the various forms which the mechanism 50 may assume and as to how the first and second shells 30, 40 may be directly or indirectly attached to the support structure 22.

In the first arrangement A1, the mechanism 50 may be presented in either a first configuration C1, a second configuration C2 or a third configuration C3.

In the first configuration C1, as shown in FIGS. 2A-4B, the mechanism 50 may include a balloon 60 attached to the interlocated portion 26, and a balloon inflator 68 in inflatable communication with the balloon 60. In the retracted state RS, the balloon 60 may be disposed between the first shell 30 and the interlocated portion 26. If an optional second shell 40 is utilized along with the first shell 30, then the mechanism 50 may further include a second balloon 60 attached to the interlocated portion 26 and disposed between the second shell 40 and the interlocated portion 26. As a further alternative, if an optional second shell 40 is utilized, a single balloon 60 may be provided for both shells 30, 40 together, rather than providing a separate balloon 60 for each of the shells 30, 40.

The balloon 60 may be made of any suitable material that is flexible and/or stretchable, may be formed into a thin sheet or layer, and is substantially impermeable to air and/or water; for example, such suitable materials may include rubber, elastomers, tightly-knit fabrics, drop stitched fabrics, coated (e.g., waterproofed) fabrics, etc. Optionally, the balloon 60 may take the form of a bladder, envelope or other flexible and/or expandable enclosure, including (but not limited to) a conventional balloon. Additionally, the balloon 60 may assume various suitable shapes. As described in more detail below, in some embodiments, the balloon 60 may be shaped, sized, designed for expansion, and attached or anchored (e.g., to the support structure 22) in fluid communication with a balloon inflator 68 (and optional conduit(s) 69) such that the balloon 60 expands outward (i.e., away from the support structure 22) as it is inflated by the balloon inflator 68 from a deflated state $\mathbf{60}_{ds}$ to an inflated state $\mathbf{60}_{is}$, and such that an outer balloon surface 62 of the balloon 60 makes contact with and presses outward on an inner first shell surface 34 of the first shell 30. As noted above, if an optional second shell 40 is included in the system 20, and if a single balloon 60 is utilized, then the outer balloon surface 62 of the single balloon 60 may also make contact with and press outward on an inner second shell surface 44 of the second shell; alternatively, if one balloon (i.e., a first balloon) 60 is utilized with the first shell 30 and another balloon (i.e., a second balloon) 60 is utilized with the second shell 40, then an outer balloon surface 62 of the second balloon 60 may make contact with and press outward on the inner second shell surface 44 of the second shell 40 when the second balloon 60 is inflated from a deflated stated $\mathbf{60}_{ds}$ to an inflated state $\mathbf{60}_{is}$.

In the first configuration C1, the mechanism 50 may optionally include one or more actuators 52 for assisting the one or more balloons 60 with opening and closing the first shell 30 and the optional second shell 40. (Note that as used herein, "opening" the first and second shells 30, 40 may be viewed as moving some portion of each shell 30, 40 outward and away from the support structure 22 from the retracted state RS to the deployed state DS, while "closing" the shells 30, 40 may be viewed as moving that portion of each shell 30, 40 inward and toward the support structure 22 from deployed state DS to the retracted state RS.) Each actuator 52 has a respective first actuator end 56 operably connected with the support structure 22 and a respective second actuator end 57 operably connected with the first or second shell 30, 40. Each actuator 52 may include an actuator drive unit 53, a first actuator rod 54 operably connected with the actuator drive unit 53, and optionally a second actuator rod 55 also operably connected with the actuator drive unit 53. For example, the first actuator rod 54 may have a first actuator end 56 connected (e.g., pivotably, rotationally, etc.) with the support structure 22 (e.g., at the interlocated portion 26), and the second actuator rod 55 may have a second actuator end 57 connected (e.g., pivotably, rotationally, etc.) with the inner first or second shell surface 34, 44 of the first or second shell 30, 40. The actuator drive unit 53, the first actuator rod 54 and the optional second actuator rod 55 may be configured and arranged in a variety of different ways; for example, one or both of the first and second actuator rods 54, 55 may selectably telescope or translate outward from and inward toward the actuator drive unit 53. The actuator drive unit 53 may move the first and second actuator rods 54, 55 using various electrical, mechanical, pneumatic and/or hydraulic methods, such as using electric motors, gears, racks, screw drives, pneumatic lines, hydraulic lines and/or the like.

When both a first shell 30 and a second shell 40 are utilized, the mechanism 50 may include a single balloon inflator 68 which is in inflatable communication with both of the balloons 60 via suitable conduits 69; alternatively, the mechanism 50 may include two balloon inflators 68, with one balloon inflator 68 being in inflatable communication with the first balloon 60 and the other balloon inflator 68 being in inflatable communication with the second balloon 60.

Regardless of whether one or two balloon inflators 68 are used, each balloon inflator 68 may be configured so as to be capable of at least inflating its associated balloon(s) 60, and, optionally, also deflating its associated balloon(s) 60 as well. Thus, the balloon inflator(s) 68 may be used to inflate the balloon(s) 60 so as to expand the volume(s) of the balloon(s) 60 from the deflated state $\mathbf{60}_{ds}$ to the inflated state $\mathbf{60}_{is}$, thereby causing the outer balloon surfaces 62 of the balloons 60 to make contact with and push upon the inner first and second shell surfaces 34, 44 of the first and second shells 30, 40, which in turn moves the first and second shells 30, 40 (and the overall system 20) from the retracted state RS (as shown in FIG. 2A) to the deployed state DS (as shown in FIG. 2B). When it is desired to move the first and second shells 30, 40 (and the overall system 20) from the deployed state DS back to the retracted state RS, the balloon inflator(s) 68 may be used to deflate the balloon(s) 60, thus allowing or causing the first and second shells 30, 40 to collapse back into the retracted state RS. Optionally, the abovementioned one or more actuators 52 may also be used to assist the deflating balloon(s) 60 in moving the first and second shells 30, 40 back into the retracted state RS.

As illustrated in FIG. 3A, the mechanism 50 may optionally include a tether 74 associated with each balloon 60. The tether 74 may have a first tether end 75 attached to an outer balloon surface 62 of the balloon 60 and a second tether end 76 attached to an inner first/second shell surface 34, 44 of the first/second shell 30, 40. The tether 74 may be made of a flexible and substantially non-stretchable material (e.g., like a rope), or it may be made of a flexible and stretchable material (e.g., like a bungee), or it may be made of a substantially rigid material (e.g., like a rod). When the balloon 60 is deflated from the inflated state $\mathbf{60}_{is}$ to the deflated state $\mathbf{60}_{ds}$, the tether 74 may act to move the first/second shell 30, 40 inward as the balloon 60 deflates and shrinks in size. Additionally or alternatively, and as shown in FIG. 3B, the mechanism 50 may optionally include an elastic member 65 associated with each balloon 60. The elastic member 65 may have a first elastic member end 66 attached to the support structure 22 and a second elastic member end 67 attached to an inner first or second shell surface 34, 44 of the first or second shell 30, 40. When the balloon 60 is inflated from the deflated state $\mathbf{60}_{ds}$ to the inflated state $\mathbf{60}_{is}$, the clastic member 65 may be stretched and placed in tension. Then, when the balloon 60 is deflated from the inflated state $\mathbf{60}_{is}$ to the deflated state $\mathbf{60}_{ds}$, the tension in the elastic member 65 may act to move the first/second shell 30, 40 inward as the balloon 60 deflates and shrinks in size. Optionally, one or both of a tether 74 and an elastic member 65 may be utilized instead of an actuator 52, or in addition to an actuator 52.

With the system 20 being suitably attached to or made integral with a vehicle 10 (such as a seaplane 11), the system 20 may be placed in the retracted state RS during most operating conditions of the vehicle 10, including any in-flight conditions. In this retracted state RS, the system 20 presents a minimalized profile so as, in turn, to reduce air resistance that would otherwise occur if, like known systems, there is no retracted state. However, when the vehicle 10 is preparing to land on a body of water 18, the system 20 may be placed in the deployed state DS to assist in landing and to provide added buoyancy to the vehicle 10. The system 20 may remain in the deployed state DS while the vehicle 10 is resting on or taxiing across the body of water 18, as well as during take-off of the vehicle 10 from the body of water 18. Then, once the vehicle 10 has lifted off the body of water 18, the system 20 may be placed back in the retracted state RS to once again reduce air resistance that otherwise would occur. This capability of the system 20 to be selectably presented in either the retracted state RS or the deployed state DS may be taken advantage of in any of the arrangements and configurations presented herein.

As illustrated in FIGS. 4A-B, the first configuration C1 may further include an extender 95 operably connected with the balloon 60 and the support structure 22. When the system 20 utilizes a second shell 40 in addition to a first shell 30, each of the two shells 30, 40 may interface with its own respective extender 95 (for a total of two extenders 95), or both shells 30, 40 may interface with a single extender 95 which is configured for extending both shells 30, 40. Each extender 95 is configured for selectably moving the balloon(s) 60 back-and-forth between a retracted position RP (shown in FIG. 4A) and an extended position EP (shown in FIG. 4B). For example, an extender 95 may move (i.e., extend and retract) its associated balloon(s) 69 laterally (e.g., generally horizontally) between the retracted and extended positions RP, EP. As shown in the drawings, in the retracted position RP the balloons 60 may be disposed proximate the support structure 22, and in the extended position EP the balloons 60 may be disposed away from (e.g., laterally outward from) the support structure 22.

In the second configuration C2, as shown in FIGS. 5A-6B, the mechanism 50 may include a lower membrane 70, an enclosed interior 90 defined and enclosed by the first shell 30, the support structure 22 and the lower membrane 70, and an enclosed interior inflator 93 in inflatable communication with the enclosed interior 90. The lower membrane 70 has a first lower membrane end 71 attached to the lower support end 24, and a second lower membrane end 72 attached to the lower first shell end 32. The lower membrane 70 may be made of a flexible and stretchable material. Whereas the first configuration C1 utilizes a balloon 60 which may be expandable and substantially airtight, the enclosed interior 90 in this second configuration C2 may likewise be expandable and substantially airtight (or at least substantially watertight). (Similarly, in other arrangements and configurations below which utilize a balloon 60 or an enclosed interior 90, the balloon 60 may be expandable and substantially airtight, and the enclosed interior 90 may be expandable and substantially airtight/watertight.)

When both a first shell 30 and a second shell 40 are utilized in the second configuration C2, a second lower membrane 70 may be provided (having a first lower membrane end 71 attached to the lower support end 24 and a second lower membrane end 72 attached to the lower second shell end 42). Here, the mechanism 50 may include a respective enclosed interior 90 for each of the two shells 30, 40 (for a total of two enclosed interiors 90), or a single enclosed interior 90 may be provided for both shells 30, 40 together. Likewise, a single enclosed interior inflator 93 may be provided which is in inflatable communication with both of the enclosed interiors 90 via suitable conduits 69; alternatively, the mechanism 50 may include two enclosed interior inflators 93, with each enclosed interior inflator 93 being in inflatable communication with a respective one of the enclosed interiors 90 via suitable conduits 69.

Regardless of whether one or two enclosed interior inflators 93 are used in the second configuration C2, each enclosed interior inflator 93 may be configured for inflating and deflating its associated enclosed interior(s) 90. Thus, the enclosed interior inflator(s) 93 may be used to inflate the enclosed interior(s) 90 so as to expand the volume(s) of the enclosed interior(s) 90 from a contracted state $90_{cs}$ to an expanded state $90_{es}$, thereby moving the first and second shells 30, 40 (and the overall system 20) from the retracted state RS (as shown in FIG. 5A) to the deployed state DS (as shown in FIG. 5B). When it is desired to move the first and second shells 30, 40 (and the overall system 20) from the deployed state DS back to the retracted state RS, the enclosed interior inflator(s) 93 may be used to deflate the enclosed interior(s) 90 from the expanded state $90_{es}$ to the contracted state $90_{cs}$ so as to move the first and second shells 30, 40 back into the deployed state DS.

As illustrated in FIG. 6A, the mechanism 50 may optionally include one or more actuators 52 associated with each enclosed interior 90. Each actuator 52 may have a first actuator end 56 connected (e.g., pivotably, rotationally, etc.) to the support structure 22 (e.g., at the interlocated portion 26) and a second actuator end 57 connected (e.g., pivotably, rotationally, etc.) to the inner first or second shell surface 34, 44 of the first or second shell 30, 40. When each enclosed interior 90 is inflated or increased in volume by the enclosed interior inflator 93 from the contracted state $90_{cs}$ to the expanded state $90_{es}$, the actuator 52 may act to push the first/second shell 30, 40 outward as the enclosed interior 90 inflates and/or increases in size, and when each enclosed interior 90 is deflated or reduced in volume by the enclosed interior inflator 93 from the expanded state $90_{es}$ to the contracted state $90_{cs}$, the actuator 52 may act to move the first/second shell 30, 40 inward as the enclosed interior 90 deflates and/or shrinks in size. Additionally or alternatively, and as shown in FIG. 6B, the mechanism 50 may optionally include an elastic member 65 associated with each enclosed interior 90. The elastic member 65 may have a first elastic member end 66 attached to the support structure 22 and a second elastic member end 67 attached to an inner first/second shell surface 34, 44 of the first/second shell 30, 40. When the enclosed interior 90 is inflated or expanded in volume from the contracted state $90_{cs}$ to the expanded state $90_{es}$, the elastic member 65 may be stretched and placed in tension. Then, when the enclosed interior 90 is deflated or reduced in volume from the expanded state $90_{es}$ to the contracted state $90_{cs}$, the tension in the clastic member 65 may act to move the first/second shell 30, 40 inward as the enclosed interior 90 deflates and/or shrinks in size. Optionally, one or both of an actuator 52 and an elastic member 65 may be utilized with each enclosed interior 90.

In the third configuration C3, as shown in FIGS. 7A-B, the mechanism 50 may include a lower membrane 70, an enclosed interior 90 which is defined and enclosed by the first shell 30, the support structure 22 and the lower membrane 70, and an actuator 52 operably connected with the first shell 30 and the support structure 22 for opening and closing the first shell 30. The lower membrane 70 has a first lower membrane end 71 attached to the lower support end 24, and a second lower membrane end 72 attached to the lower first shell end 32. If an optional second shell 40 is utilized along with the first shell 30, then the mechanism 50 may further include a second actuator 52 which is operably connected with the second shell 40 and the support structure 22 for opening and closing the second shell 40.

When both a first shell 30 and a second shell 40 are utilized in the third configuration C3, a second lower membrane 70 may be provided (having a first lower membrane end 71 attached to the lower support end 24 and a second lower membrane end 72 attached to the lower second shell end 42). Here, the mechanism 50 may include a respective enclosed interior 90 for each of the two shells 30, 40 (for a total of two enclosed interiors 90), or a single enclosed interior 90 may be provided for both shells 30, 40 together.

Regardless of whether one or two enclosed interiors 90 are provided in the third configuration C3, the actuator(s) 52 may be used to expand the volume(s) of the enclosed interior(s) 90 from a contracted state $90_{cs}$ to an expanded state $90_{es}$, thereby moving the first and second shells 30, 40 (and the overall system 20) from the retracted state RS (as shown in FIG. 7A) to the deployed state DS (as shown in FIG. 7B). When it is desired to move the first and second shells 30, 40 (and the overall system 20) from the deployed state DS back to the retracted state RS, the actuator(s) 52 may be used to contract the volume of the enclosed interior (s) 90 from the expanded state $90_{es}$ to the contracted state $90_{cs}$ so as to move the first and second shells 30, 40 back into the deployed state DS.

In the first configuration C1 while in the retracted state RS (see FIG. 2A), each balloon 60 may have a respective first balloon volume 64, and in the deployed state DS (see FIG. 2B) each balloon 60 may be expanded by the balloon inflator(s) 68 from the respective first balloon volume 64 to a respective second balloon volume 66 that is greater than the respective first balloon volume 64. Similarly, in the second configuration C2 while in the retracted state RS (see FIG. 5A), each of the enclosed interiors 90 may have a respective first enclosed interior volume 91, and in the deployed state DS (see FIG. 5) each of the enclosed interiors 90 may be expanded by the enclosed interior inflator(s) 93 from the respective first enclosed interior volume 91 to a respective second enclosed interior volume 92 that is greater than the respective first enclosed interior volume 91. In the third configuration C3 while in retracted state RS (see FIG. 7A), each of the first and second shells 30, 40 may be disposed at a respective first distance $d_1$ from the support structure 22, and while in the deployed state DS (see FIG. 7B) each of the first and second shells 30, 40 may be moved by the one or more actuators 52 to a respective second distance $d_2$ away from the support structure 22 that is greater than the respective first distance $d_1$.

In the first configuration C1 while in the deployed state DS, a running surface 94 may be provided by the outer balloon surface(s) 62 of the balloon(s) 60. (Note that as used herein, a "running surface" means one or more surfaces of the system 20 for facilitating one or more of landing the vehicle 10 on the body of water 18, taxiing of the vehicle 10 on the body of water 18 and take-off of the vehicle 10 from the body of water 18, when the system 20 is suitably attached to or integrated with the vehicle 10, such as at the wing tips 16 of a seaplane 11.) In the second and third configurations C2, C3 while in the deployed state DS, a running surface 94 may be provided by the outer lower membrane surface(s) 76 of the lower membrane(s) 70.

In the second arrangement A2, the mechanism 50 may be presented in either a primary configuration Cp, a secondary configuration Cs, a tertiary configuration Ct or a quaternary configuration Cq.

In the primary configuration Cp, as shown in FIGS. 8A-B, the mechanism 50 may include an actuator 52 operably connected with the first shell 30 and the support structure 22. The primary configuration Cp may further include an optional spray skirt 96 having a first spray skirt end 97 attached to the interlocated portion 26 and a second spray skirt end 98 attached to the upper first shell end 31. When the system 20 includes an optional second shell 40 along with the first shell 30, the mechanism 50 may include a second actuator 52 operably connected with the second shell 40 and the support structure 22, and a second spray skirt 96 may be provided which has a first spray skirt end 97 attached to the interlocated portion 26 and a second spray skirt end 98 attached to the upper second shell end 41. In the retracted state RS, each of the first and second shells 30, 40 may be disposed at a respective first distance $d_1$ from the support structure 22, and in the deployed state DS each of the first and second shells 30, 40 may be moved by the one or more actuators 52 to a respective second distance $d_2$ away from the support structure 22 that is greater than the respective first distance $d_1$.

In the secondary configuration Cs, as shown in FIGS. 9A-10B, the mechanism 50 may include an upper membrane 80, an enclosed interior 90 defined and enclosed by the first shell 30, the support structure 22 and the upper membrane 80, and an enclosed interior inflator 93 in inflatable communication with the enclosed interior 90. The upper membrane 80 has a first upper membrane end 82 attached to the interlocated portion 26, and a second upper membrane end 84 attached to the upper first shell end 31. Like the upper membrane 80, the lower membrane 70 may be made of a flexible and stretchable material.

In this secondary configuration Cs while in the retracted state RS, the enclosed interior 90 may have a first enclosed interior volume 91, and in the deployed state DS the enclosed interior 90 may be expanded by the enclosed interior inflator 93 from the first enclosed interior volume 91 to a second enclosed interior volume 92 that is greater than the first enclosed interior volume 91. When the system 20 includes an optional second shell 40 along with the first shell 30, a second upper membrane 80 may be provided having a first upper membrane end 82 attached to the interlocated portion 26 and a second upper membrane end 84 attached the upper second shell end 41.

When both a first shell 30 and a second shell 40 are utilized in the secondary configuration Cs, the mechanism 50 may include a respective enclosed interior 90 for each of the two shells 30, 40 (for a total of two enclosed interiors 90), or a single enclosed interior 90 may be provided for both shells 30, 40 together. Likewise, a single enclosed interior inflator 93 may be provided which is in inflatable communication with both of the enclosed interiors 90 via suitable conduits 69; alternatively, the mechanism 50 may include two enclosed interior inflators 93, with each enclosed interior inflator 93 being in inflatable communication with a respective one of the enclosed interiors 90 via suitable conduits 69.

Regardless of whether one or two enclosed interior inflators 93 are used in the secondary configuration Cs, each enclosed interior inflator 93 may be configured for inflating and deflating its associated enclosed interior(s) 90. Thus, the enclosed interior inflator(s) 93 may be used to inflate the enclosed interior(s) 90 so as to expand the volume(s) of the enclosed interior(s) 90, thereby moving the first and second shells 30, 40 (and the overall system 20) from the retracted state RS (as shown in FIG. 9A) to the deployed state DS (as shown in FIGS. 9B and 10A-B). When it is desired to move the first and second shells 30, 40 (and the overall system 20) from the deployed state DS back to the retracted state RS, the enclosed interior inflator(s) 93 may be used to deflate the enclosed interior(s) 90 so as to move the first and second shells 30, 40 back into the deployed state DS.

As illustrated in FIG. 10A, the mechanism 50 may optionally include one or more actuators 52 associated with each enclosed interior 90. Each actuator 52 may have a first actuator end 56 connected (e.g., pivotably, rotationally, etc.) to the support structure 22 (e.g., at the interlocated portion 26) and a second actuator end 57 connected (e.g., pivotably, rotationally, etc.) to the inner first or second shell surface 34, 44 of the first or second shell 30, 40. When each enclosed interior 90 is inflated or increased in volume by the enclosed interior inflator 93 from the contracted state $90_{cs}$ to the expanded state $90_{es}$, the actuator 52 may act to push the first/second shell 30, 40 outward as the enclosed interior 90 inflates and/or increases in size, and when each enclosed interior 90 is deflated or reduced in volume by the enclosed interior inflator 93 from the expanded state $90_{es}$ to the contracted state $90_{cs}$, the actuator 52 may act to move the first/second shell 30, 40 inward as the enclosed interior 90 deflates and/or shrinks in size. Additionally or alternatively, and as shown in FIG. 10B, the mechanism 50 may optionally include an elastic member 65 associated with each enclosed interior 90. The elastic member 65 may have a first clastic member end 66 attached to the support structure 22 and a second elastic member end 67 attached to an inner first/second shell surface 34, 44 of the first/second shell 30, 40. When the enclosed interior 90 is inflated or expanded in volume from the contracted state $90_{cs}$ to the expanded state $90_{es}$, the elastic member 65 may be stretched and placed in tension. Then, when the enclosed interior 90 is deflated or reduced in volume from the expanded state $90_{es}$ to the contracted state $90_{cs}$, the tension in the elastic member 65 may act to move the first/second shell 30, 40 inward as the enclosed interior 90 deflates and/or shrinks in size. Optionally, one or both of an actuator 52 and an elastic member 65 may be utilized with each enclosed interior 90.

In the tertiary configuration Ct, as shown in FIGS. 11A-B, the mechanism 50 may include an upper membrane 80, an enclosed interior 90 which is defined and enclosed by the first shell 30, the support structure 22 and the upper membrane 80, and an actuator 52 operably connected with the first shell 30 and the support structure 22 for opening and closing the first shell 30. The upper membrane 80 has a first upper membrane end 82 attached to the interlocated portion 26, and a second upper membrane end 84 attached to the upper first shell end 31. If an optional second shell 40 is utilized along with the first shell 40, then the mechanism 50 may further include a second actuator 52 which is operably connected with the second shell 40 and the support structure 22 for opening and closing the second shell 40, and a second upper membrane 80 which has a first upper membrane end 82 attached to the interlocated portion 26, and a second upper membrane end 84 attached the upper second shell end 41.

In this tertiary configuration Ct while in the retracted state RS, the enclosed interior 90 may have a first enclosed interior volume 91, and in the deployed state DS the enclosed interior 90 may be expanded by the actuator 52 from the first enclosed interior volume 91 to a second enclosed interior volume 92 that is greater than the first enclosed interior volume 91.

In the quaternary configuration Cq, as shown in FIGS. 12A-13B, the mechanism 50 may include a balloon 60 attached to the interlocated portion 26 and disposed in the retracted state RS between the first shell 30 and the interlocated portion 26, and a balloon inflator 68 in inflatable communication with the balloon 60. If an optional second shell 40 is utilized along with the first shell 30, then the mechanism 50 may further include a second balloon 60 attached to the interlocated portion 26 and disposed between the second shell 40 and the interlocated portion 26. As a further alternative, if an optional second shell 40 is utilized, a single balloon 60 may be provided for both shells 30, 40 together, rather than providing a separate balloon 60 for each of the shells 30, 40.

In the quaternary configuration Cq, the mechanism 50 may optionally include one or more actuators 52 for assisting the one or more balloons 60 with opening and closing the first shell 30 and the optional second shell 40. Each actuator 52 may have a respective first actuator end 56 operably connected with the support structure 22 and a respective second actuator end 57 operably connected with the first or second shell 30, 40.

When both a first shell 30 and a second shell 40 are utilized in the quaternary configuration Cq, the mechanism 50 may include a single balloon inflator 68 which is in inflatable communication with both of the balloons 60 via suitable conduits 69; alternatively, the mechanism 50 may include two balloon inflators 68, with one balloon inflator 68 being in inflatable communication with the first balloon 60 and the other balloon inflator 68 being in inflatable communication with the second balloon 60.

Regardless of whether one or two balloon inflators 68 are used in the quaternary configuration Cq, each balloon inflator 68 may be configured so as to be capable of at least inflating its associated balloon(s) 60, and, optionally, also deflating its associated balloon(s) 60 as well. Thus, the balloon inflator(s) 68 may be used to inflate the balloon(s) 60 so as to expand the volume(s) of the balloon(s) 60 from the deflated state $60_{ds}$ to the inflated state $60_{is}$, thereby causing the outer balloon surfaces 62 of the balloons 60 to make contact with and push upon the inner first and second shell surfaces 34, 44 of the first and second shells 30, 40, which in turn moves the first and second shells 30, 40 (and the overall system 20) from the retracted state RS (as shown in FIG. 12A) to the deployed state DS (as shown in FIG. 12B). When it is desired to move the first and second shells 30, 40 (and the overall system 20) from the deployed state DS back to the retracted state RS, the balloon inflator(s) 68 may be used to deflate the balloon(s) 60, thus allowing or causing the first and second shells 30, 40 to collapse back into the retracted state RS. Optionally, and as mentioned above, one or more actuators 52 may also be used to assist the deflating balloon(s) 60 in moving the first and second shells 30, 40 back into the retracted state RS.

As illustrated in FIG. 13A, the mechanism 50 may optionally include a tether 74 associated with each balloon 60. The tether 74 may have a first tether end 75 attached to an outer balloon surface 62 of the balloon 60 and a second tether end 76 attached to an inner first/second shell surface 34, 44 of the first/second shell 30, 40. The tether 74 may be made of a flexible and substantially non-stretchable material (e.g., like a rope), or it may be made of a flexible and stretchable material (e.g., like a bungee), or it may be made of a substantially rigid material (e.g., like a rod). When the balloon 60 is deflated from the inflated state $\mathbf{60}_{is}$ to the deflated state $\mathbf{60}_{ds}$, the tether 74 may act to move the first/second shell 30, 40 inward as the balloon 60 deflates and shrinks in size. Additionally or alternatively, and as shown in FIG. 13B, the mechanism 50 may optionally include an elastic member 65 associated with each balloon 60. The elastic member 65 may have a first clastic member end 66 attached to the support structure 22 and a second elastic member end 67 attached to an inner first or second shell surface 34, 44 of the first or second shell 30, 40. When the balloon 60 is inflated from the deflated state $\mathbf{60}_{ds}$ to the inflated state $\mathbf{60}_{is}$, the elastic member 65 may be stretched and placed in tension. Then, when the balloon 60 is deflated from the inflated state $\mathbf{60}_{is}$ to the deflated state $\mathbf{60}_{ds}$, the tension in the elastic member 65 may act to move the first/second shell 30, 40 inward as the balloon 60 deflates and shrinks in size. Optionally, one or both of a tether 74 and an elastic member 65 may be utilized instead of an actuator 52, or in addition to an actuator 52.

In either of the primary, secondary, tertiary and quaternary configurations Cp, Cs, Ct, Cq and while in the deployed state DS, a running surface 94 may be provided by the outer first shell surface 33 of the first shell 30, as well as by the outer second shell surface 43 of the optional second shell 40.

In the third arrangement A3, the mechanism 50 is presented in only one configuration, as shown in FIGS. 14A-15B. Here, the mechanism 50 may include: (i) an upper membrane 80 having a first upper membrane end 82 attached to the interlocated portion 26 and a second upper membrane end 84 attached to the upper first shell end 31; (ii) a lower membrane 70 having a first lower membrane end 71 attached to the lower support end 24 and a second lower membrane end 72 attached to the lower first shell end 32; (iii) an enclosed interior 90 defined and enclosed by the first shell 30, the support structure 22, the upper membrane 80 and the lower membrane 70; and (iv) an enclosed interior inflator 93 in inflatable communication with the enclosed interior 90.

In this third arrangement A3 while in the retracted state RS, the enclosed interior 90 may have a first enclosed interior volume 91, and in the deployed state DS, the enclosed interior 90 may be expanded by the enclosed interior inflator 93 from the first enclosed interior volume 91 to a second enclosed interior volume 92 that is greater than the first enclosed interior volume 91.

When the third arrangement A3 includes an optional second shell 40 along with the first shell 30, an additional upper membrane 80 and an additional lower membrane 70 may be provided. The additional upper membrane 80 has a first upper membrane end 82 attached to the interlocated portion 26 and a second upper membrane end 84 attached the upper second shell end 41. The additional lower membrane 70 has a first lower membrane end 71 attached to the interlocated portion 26 and a second lower membrane end 72 attached the lower second shell end 42.

When both a first shell 30 and a second shell 40 are utilized in the third arrangement A3, the mechanism 50 may include a respective enclosed interior 90 for each of the two shells 30, 40 (for a total of two enclosed interiors 90), or a single enclosed interior 90 may be provided for both shells 30, 40 together. Likewise, a single enclosed interior inflator 93 may be provided which is in inflatable communication with both of the enclosed interiors 90 via suitable conduits 69; alternatively, the mechanism 50 may include two enclosed interior inflators 93, with each enclosed interior inflator 93 being in inflatable communication with a respective one of the enclosed interiors 90 via suitable conduits 69.

Regardless of whether one or two enclosed interior inflators 93 are used in the third arrangement A3, each enclosed interior inflator 93 may be configured for inflating and deflating its associated enclosed interior(s) 90. Thus, the enclosed interior inflator(s) 93 may be used to inflate the enclosed interior(s) 90 so as to expand the volume(s) of the enclosed interior(s) 90, thereby moving the first and second shells 30, 40 (and the overall system 20) from the retracted state RS (as shown in FIG. 14A) to the deployed state DS (as shown in FIG. 14B). When it is desired to move the first and second shells 30, 40 (and the overall system 20) from the deployed state DS back to the retracted state RS, the enclosed interior inflator(s) 93 may be used to deflate the enclosed interior(s) 90 so as to move the first and second shells 30, 40 back into the deployed state DS.

In the third arrangement A3 while in the deployed state DS, a running surface 94 may be provided by one or both of the outer lower membrane surface(s) 76 of the lower membrane(s) 70 and the outer first/second shell surface(s) 33, 43 of the first/second shell(s) 30, 40.

In the fourth arrangement A4, the mechanism 50 may be presented in either a main configuration Cm, an auxiliary configuration Cx, an alternative configuration Ca or a supplemental configuration Cz. As noted above, in this fourth arrangement A4 the first shell 30 is divided into upper and lower first shells 37, 38, and the optional second shell 40, if present, is divided into upper and lower second shells 47, 48. Here, the upper first shell 37 includes the upper first shell end 31 and an upper first shell termination $\mathbf{37}_T$, and the lower first shell 38 includes the lower first shell end 32 and a lower first shell termination $\mathbf{38}_T$. Similarly, the upper second shell 47 includes the upper second shell end 41 and an upper second shell termination $\mathbf{47}_T$, and the lower second shell 38 includes the lower second shell end 42 and a lower second shell termination $\mathbf{48}_T$.

In the main configuration Cm, as shown in FIGS. 16A-B, the mechanism 50 may include an upper actuator 58 which is operably connected with the upper first shell 37 and the support structure 22, and a lower actuator 59 which is operably connected with the lower first shell 38 and the support structure 22. Optionally, the main configuration Cm may also include a spray skirt 96 having a first spray skirt end 97 attached to the upper first shell termination $\mathbf{37}_T$ and a second spray skirt end 98 attached to the lower first shell termination $\mathbf{38}_T$. When the system 20 includes an optional second shell 40 along with the first shell 30, the mechanism 50 may include another upper actuator 58 which is operably connected with the upper second shell 47 and the support structure 22, and another lower actuator 59 which is operably connected with the lower second shell 48 and the support structure 22, as well as an optional second spray skirt 96 having a first spray skirt end 97 attached to the upper second shell termination $\mathbf{47}_T$ and a second spray skirt end 98 attached to the lower second shell termination $\mathbf{48}_T$. In the retracted state RS, each of the first and second shells 30, 40 may be disposed at a respective first distance $d_1$ from the support structure 22, and in the deployed state DS each of the first and second shells 30, 40 may be moved by the one or more actuators 52 to a respective second distance $d_2$ away from the support structure 22 that is greater than the respective first distance $d_1$.

In the auxiliary configuration Cx, as shown in FIGS. 17A-18B and 22, the mechanism 50 may include a balloon 60 attached to the interlocated portion 26 and disposed in the retracted state RS between the first shell 30 (i.e., the upper and lower first shells 37, 38) and the interlocated portion 26, and a balloon inflator 68 in inflatable communication with the balloon 60. If an optional second shell 40 (i.e., the upper and lower second shells 47, 48) is utilized along with the first shell 30, then the mechanism 50 may further include a second balloon 60 attached to the interlocated portion 26 and disposed between the second shell 40 and the interlocated portion 26. As a further alternative, if an optional second shell 40 is utilized, a single balloon 60 may be provided for both shells 30, 40 together, rather than providing a separate balloon 60 for each of the shells 30, 40.

In the auxiliary configuration Cx, the mechanism 50 may optionally include upper and lower actuators 58, 59 for assisting the one or more balloons 60 with opening and closing the first shell 30 (i.e., the upper and lower first shells 37, 38) and the optional second shell 40 (i.e., the upper and lower second shells 47, 48). Each upper actuator 58 may have a respective first actuator end operably connected with the support structure 22 and a respective second actuator end operably connected with the upper first or second shell 37, 47. Similarly, each lower actuator 59 may have a respective first actuator end operably connected with the support structure 22 and a respective second actuator end operably connected with the lower first or second shell 38, 48.

When both a first shell 30 and a second shell 40 are utilized in the auxiliary configuration Cx, the mechanism 50 may include a single balloon inflator 68 which is in inflatable communication with both of the balloons 60 via suitable conduits 69; alternatively, the mechanism 50 may include two balloon inflators 68, with one balloon inflator 68 being in inflatable communication with the first balloon 60 and the other balloon inflator 68 being in inflatable communication with the second balloon 60.

Regardless of whether one or two balloon inflators 68 are used in the auxiliary configuration Cx, each balloon inflator 68 may be configured so as to be capable of at least inflating its associated balloon(s) 60, and, optionally, also deflating its associated balloon(s) 60 as well. Thus, the balloon inflator(s) 68 may be used to inflate the balloon(s) 60 so as to expand the volume(s) of the balloon(s) 60 from the deflated state $\mathbf{60}_{ds}$ to the inflated state $\mathbf{60}_{is}$, thereby causing the outer balloon surfaces 62 of the balloons 60 to make contact with and push upon the inner first and second shell surfaces 34, 44 of the first and second shells 30, 40, which in turn moves the first and second shells 30, 40 (and the overall system 20) from the retracted state RS (as shown in FIG. 17A) to the deployed state DS (as shown in FIG. 17B). When it is desired to move the first and second shells 30, 40 (and the overall system 20) from the deployed state DS back to the retracted state RS, the balloon inflator(s) 68 may be used to deflate the balloon(s) 60, thus allowing or causing the first and second shells 30, 40 to collapse back into the retracted state RS. Optionally, and as mentioned above, upper and lower actuators 58, 59 may also be used to assist the deflating balloon(s) 60 in moving the first and second shells 30, 40 (i.e., the upper and lower first shells 37, 38 and the upper and lower second shells 47, 48) back into the retracted state RS.

As illustrated in FIG. 18A, the mechanism 50 may optionally include a tether 74 associated with each balloon 60. The tether 74 may have a first tether end 75 attached to an outer balloon surface 62 of the balloon 60 and a second tether end 76 attached to an inner first/second shell surface 34, 44 of the first/second shell 30, 40. The tether 74 may be made of a flexible and substantially non-stretchable material (e.g., like a rope), or it may be made of a flexible and stretchable material (e.g., like a bungee), or it may be made of a substantially rigid material (e.g., like a rod). When the balloon 60 is deflated from the inflated state $\mathbf{60}_{is}$ to the deflated state $\mathbf{60}_{ds}$, the tether 74 may act to move the first/second shell 30, 40 inward as the balloon 60 deflates and shrinks in size. Additionally or alternatively, and as shown in FIG. 18B, the mechanism 50 may optionally include an clastic member 65 associated with each balloon 60. The clastic member 65 may have a first clastic member end 66 attached to the support structure 22 and a second clastic member end 67 attached to an inner first or second shell surface 34, 44 of the first or second shell 30, 40. When the balloon 60 is inflated from the deflated state $\mathbf{60}_{ds}$ to the inflated state $\mathbf{60}_{is}$, the clastic member 65 may be stretched and placed in tension. Then, when the balloon 60 is deflated from the inflated state $\mathbf{60}_{is}$ to the deflated state $\mathbf{60}_{ds}$, the tension in the clastic member 65 may act to move the first/second shell 30, 40 inward as the balloon 60 deflates and shrinks in size. Optionally, one or both of a tether 74 and an elastic member 65 may be utilized instead of an actuator 52, or in addition to the upper and lower actuators 58, 59.

In the alternative configuration Ca, as shown in FIGS. 19A-20B, the mechanism 50 may include (i) a middle membrane 86 having a first middle membrane end 87 attached to the upper first shell termination $\mathbf{37}_T$ and a second middle membrane end 88 attached the lower first shell termination $\mathbf{38}_T$, (ii) an enclosed interior 90 defined and enclosed by the upper first shell 37, the lower first shell 38, the support structure 22 and the middle membrane 86, and (iii) an enclosed interior inflator 93 in inflatable communication with the enclosed interior 90. Like the upper and lower membranes 70, 80, the middle membrane 86 may be made of a flexible and stretchable material.

In this alternative configuration Ca while in the retracted state RS, the enclosed interior 90 may have a first enclosed interior volume 91, and in the deployed state DS the enclosed interior 90 may be expanded by the enclosed interior inflator 93 from the first enclosed interior volume 91 to a second enclosed interior volume 92 that is greater than the first enclosed interior volume 91. When the system 20 includes an optional second shell 40 along with the first shell 30, a second middle membrane 86 may be provided having a first middle membrane end 87 attached to the upper second shell termination $\mathbf{47}_T$ and a second middle membrane end 88 attached the lower second shell termination $\mathbf{48}_T$.

When both a first shell 30 and a second shell 40 are utilized in the alternative configuration Ca, the mechanism 50 may include a respective enclosed interior 90 for each of the two shells 30, 40 (for a total of two enclosed interiors 90), or a single enclosed interior 90 may be provided for both shells 30, 40 together. Likewise, a single enclosed interior inflator 93 may be provided which is in inflatable communication with both of the enclosed interiors 90 via suitable conduits 69; alternatively, the mechanism 50 may include two enclosed interior inflators 93, with each enclosed interior inflator 93 being in inflatable communication with a respective one of the enclosed interiors 90 via suitable conduits 69.

Regardless of whether one or two enclosed interior inflators 93 are used in the alternative configuration Ca, each enclosed interior inflator 93 may be configured for inflating and deflating its associated enclosed interior(s) 90. Thus, the enclosed interior inflator(s) 93 may be used to inflate the enclosed interior(s) 90 so as to expand the volume(s) of the enclosed interior(s) 90, thereby moving the first and second shells 30, 40 (and the overall system 20) from the retracted state RS (as shown in FIG. 19A) to the deployed state DS (as shown in FIG. 19B). When it is desired to move the first and second shells 30, 40 (and the overall system 20) from the deployed state DS back to the retracted state RS, the enclosed interior inflator(s) 93 may be used to deflate the enclosed interior(s) 90 so as to move the first and second shells 30, 40 back into the deployed state DS.

As illustrated in FIG. 20A, the mechanism 50 may optionally include one or more actuators 52 associated with each enclosed interior 90. Each actuator 52 may have a first actuator end 56 connected (e.g., pivotably, rotationally, etc.) to the support structure 22 (e.g., at the interlocated portion 26) and a second actuator end 57 connected (e.g., pivotably, rotationally, etc.) to the inner first or second shell surface 34, 44 of the first or second shell 30, 40. When each enclosed interior 90 is inflated or increased in volume by the enclosed interior inflator 93 from the contracted state $90_{cs}$ to the expanded state $90_{es}$, the actuator 52 may act to push the first/second shell 30, 40 outward as the enclosed interior 90 inflates and/or increases in size, and when each enclosed interior 90 is deflated or reduced in volume by the enclosed interior inflator 93 from the expanded state $90_{es}$ to the contracted state $90_{cs}$, the actuator 52 may act to move the first/second shell 30, 40 inward as the enclosed interior 90 deflates and/or shrinks in size. Additionally or alternatively, and as shown in FIG. 20B, the mechanism 50 may optionally include an elastic member 65 associated with each enclosed interior 90. The elastic member 65 may have a first clastic member end 66 attached to the support structure 22 and a second elastic member end 67 attached to an inner first/second shell surface 34, 44 of the first/second shell 30, 40. When the enclosed interior 90 is inflated or expanded in volume from the contracted state $90_{cs}$ to the expanded state $90_{es}$, the clastic member 65 may be stretched and placed in tension. Then, when the enclosed interior 90 is deflated or reduced in volume from the expanded state $90_{es}$ to the contracted state $90_{cs}$, the tension in the elastic member 65 may act to move the first/second shell 30, 40 inward as the enclosed interior 90 deflates and/or shrinks in size. Optionally, one or both of an actuator 52 and an elastic member 65 may be utilized with each enclosed interior 90.

In the supplemental configuration Cz, as shown in FIGS. 21A-B, the mechanism 50 may include (i) a middle membrane 86, (ii) an enclosed interior 90 which is defined and enclosed by the first shell 30 (i.e., the upper first shell 37 and the lower first shell 38), the support structure 22 and the middle membrane 86, (iii) an upper actuator 58 operably connected with the upper first shell 37 and the support structure 22 for opening and closing the upper first shell 37, and (iv) a lower actuator 59 operably connected with the lower first shell 38 and the support structure 22 for opening and closing the lower first shell 38. The middle membrane 86 has a first middle membrane end 87 attached to the upper first shell termination $37_T$, and a second middle membrane end 88 attached to the lower first shell termination $38_T$. If an optional second shell 40 (i.e., an upper second shell 47 and a lower second shell 48) is utilized along with the first shell 40, then the mechanism 50 may further include a second upper actuator 58 which is operably connected with the upper second shell 47 and the support structure 22 for opening and closing the upper second shell 47, a second lower actuator 59 which is operably connected with the lower second shell 48 and the support structure 22 for opening and closing the lower second shell 48, and a second middle membrane 86 which has a first middle membrane end 87 attached to the upper second shell termination $47_T$, and a second middle membrane end 88 attached the lower second shell termination $48_T$.

In this supplemental configuration Cz while in the retracted state RS, the enclosed interior 90 may have a first enclosed interior volume 91, and in the deployed state DS the enclosed interior 90 may be expanded by the upper and lower actuators 58, 59 from the first enclosed interior volume 91 to a second enclosed interior volume 92 that is greater than the first enclosed interior volume 91.

In the fourth arrangement A4 while in the deployed state DS, a running surface 94 may be provided by the outer lower first/second shell surface(s) 39, 49 of the lower first/second shell(s) 38, 48 and optionally also by the outer middle membrane surface(s) 89 of the middle membrane(s) 86.

In each of the arrangements and configurations presented above, the first shell 30, the optional second shell 40 and each of the lower, upper and middle membranes 70, 80, 86 may be designed and shaped so as to minimize the aerodynamic and hydrodynamic drag presented by these elements, in both the retracted and deployed states RS, DS, as the vehicle 10 (to which the system 20 is attached) flies through the air and taxis across a body of water 18.

It may also be noted that with the system 20 suitably attached to a vehicle 10—such as with the upper support end 23 of the support structure 22 attached to a wing tip 16 of a seaplane 11—buoyancy may be provided for the vehicle 10 when the vehicle 10 is on the body of water 18 when the system 20 is in the deployed state DS. Depending on the arrangement and configuration of the system 20, this buoyancy in the deployed state DS may be provided by one or more of: (i) a balloon 60; (ii) an enclosed interior 90; and (iii) a substantially watertight interior space 99 within the system 20. This interior space 99 is defined and bounded by various elements within the system 20 that are adjacent to one another, and which together are configured to form a watertight void or envelope (e.g., an air gap) within the interior of the system 20. This watertight void or envelope of the interior space 99 may be in a minimized state $99_{ms}$ when the system 20 and mechanism 50 are in the retracted state RS, and in an enlarged state $99_{es}$ when the system 20 and mechanism 50 are in the deployed state DS. In the enlarged state $99_{es}$, the interior space 99 may provide buoyancy to a vehicle 10 when the system 20 is suitably attached to the vehicle 10 and the vehicle 10 is on the surface 100 of a body of water 18.

For instance, in the first arrangement A1 shown in FIG. 7B, the interior space 99 is defined and bounded on the sides and underneath by the lower membrane 70 and the support structure 22, and the interior space 99 is defined and bounded on a top side by the horizontal line 101. (Note that this horizontal line 101 may also represent a horizontal plane, just as the lower membrane 70 and support structure 22 may also be planar elements.) This horizontal line 101 is drawn from the second lower membrane end 72 to the support structure 22, and it represents an upper boundary of the interior space 99. As illustrated in FIG. 7B, the horizontal line 101 lies above the surface or waterline 100 of the body of water 18, with some portion of the inner space 99 being above the surface or waterline 100 and another portion being below the waterline 100. With the lower membrane 70 and support structure 22 being made of waterproof materials and with the connection between the lower membrane 70 and the support structure 22 also being waterproof, and with the inner space 99 being filled (in whole or in part) with air, such that the portion of the inner space 99 that is below the waterline 100 takes up a volume that weighs less than the same volume of water, the inner space 99 may effectively provide some amount of buoyancy to an attached seaplane 11 or other vehicle 10. Further, it should be noted that the interior space 99 may be defined on either or both of the inboard and outboard sides 27, 28 of the support structure 22.

With regard to FIG. 7B, it may be noted that the interior space 99 is a part of the enclosed interior 90. If the connection between the lower membrane 70 and the first shell 30 is waterproof—i.e., where the second lower membrane end 72 is connected to the lower first shell end 32—then at least some portion of the enclosed interior 90 that is above the horizontal line 101 may also provide buoyancy to an attached vehicle 10, if the weight of the vehicle 10 is such that the waterline 100 rises above the horizontal line 101. This possibility of some portion of the enclosed interior 90 that is above the horizontal line 101 providing buoyancy may also apply to various other arrangements and configurations as well.

In the second arrangement A2 shown in FIGS. 8B and 11B, the interior space 99 may be defined and bounded by the first shell 30 and the support structure 22, as well as by the horizontal line 101. In the third arrangement A3, no particular interior space 99 is defined (and none is needed in this arrangement to provide buoyancy). And in the fourth arrangement A4 shown in FIGS. 16B and 21B, the interior space 99 is defined and bounded by the lower first shell 38 and the support structure 22, as well as by the horizontal line 101.

In configurations where the interior space 99 may provide buoyancy, it may be noted that additional buoyancy may be provided by other elements if the weight of the attached vehicle 10 causes the system 20 to sink lower in the body of water 18, such that the waterline 100 rises above the horizontal line 101. For example, in the third configuration C3 (see FIG. 7B), the portion of the enclosed interior 90 that is above the interior space 99 (i.e., above the horizontal line 101) and which is bounded by the first shell 30 and the support structure 22 may provide additional buoyancy. In the primary configuration Cp (see FIG. 8B), the portion of the enclosed interior 90 that is above the interior space 99 (i.e., above the horizontal line 101) and which is bounded by the optional spray skirt 96 and the support structure 22 may provide additional buoyancy. In the tertiary configuration Ct (see FIG. 11B), the portion of the enclosed interior 90 that is above the interior space 99 (i.e., above the horizontal line 101) and which is bounded by the upper membrane 80 and the support structure 22 may provide additional buoyancy. In the main configuration Cm (see FIG. 16B), the portion of the enclosed interior 90 that is above the interior space 99 (i.e., above the horizontal line 101) and which is bounded by the optional spray skirt 96 and the support structure 22 may provide additional buoyancy. And in the supplemental configuration Cz (see FIG. 21B), the portion of the enclosed interior 90 that is above the interior space 99 (i.e., above the horizontal line 101) and which is bounded by the middle membrane 86 and the support structure 22 may provide additional buoyancy, as well as the portion of the enclosed interior 90 that is bounded by the upper first shell 37 and the support structure 22.

Thus, for the first arrangement A1, buoyancy may be provided in the deployed state DS by the balloon(s) 60 in the inflated state $\mathbf{60}_{is}$ in the first configuration C1, by the enclosed interior 90 in the expanded state $\mathbf{90}_{es}$ in the second configuration C2, and by the interior space 99 (defined by the first shell 30 and the support structure 22) in the enlarged state $\mathbf{99}_{es}$ in the third configuration C3. For the second arrangement A2, buoyancy may be provided in the deployed state DS by the interior space 99 in the enlarged state $\mathbf{99}_{es}$ in the primary configuration Cp, by the enclosed interior 90 in the expanded state $\mathbf{90}_{es}$ in the secondary configuration Cs, by the interior space 99 in the enlarged state $\mathbf{99}_{es}$ in the tertiary configuration Ct, and by the balloon 60 in the inflated state $\mathbf{60}_{is}$ in the quaternary configuration Cq. For the third arrangement A3, buoyancy may be provided in the deployed state DS by the enclosed interior 90 in the expanded state $\mathbf{90}_{es}$. And for the fourth arrangement A4, buoyancy may be provided in the deployed state DS by the interior space 99 in the enlarged state $\mathbf{99}_{es}$ in the main configuration Cm, by the balloon 60 in the inflated state $\mathbf{60}_{is}$ in the auxiliary configuration Cx, by the enclosed interior 90 in the expanded state $\mathbf{90}_{es}$ in the alternative configuration Ca, and by the interior space 99 in the enlarged state $\mathbf{99}_{es}$ in the supplemental configuration Cz.

As an alternative to the embodiments shown in FIGS. 2A-21B where the support structure 22 is oriented generally vertically, FIG. 22 shows an embodiment in which the support structure 22 is oriented generally horizontally. The system 20 shown here is generally the same as the system 20 shown in FIG. 17B, which is an embodiment of the fourth arrangement A4 in an auxiliary configuration Cx, but with the system 20 attached to a vehicle 10—more specifically, to the fuselage 12 of a seaplane 11—and with the system 20 including only one balloon 60 and having no spray skirt 96. In this figure, the balloon 60 is arranged such that when it is inflated by the balloon inflator 68 into an inflated state $\mathbf{60}_{is}$, the balloon 60 expands and pushes open the upper and lower first shells 37, 38 until the system 20 and mechanism 50 are in a deployed state DS. When it is desired to move the system 20 and mechanism 50 from the deployed state DS to a retracted state RS, the balloon inflator 68 may cause the balloon 60 to deflate, and the upper and lower actuators 58, 59 may assist in retracting the upper and lower first shells 37, 38 until the retracted state RS is achieved.

As one having skill in the relevant art will appreciate, the system 20 of the present disclosure may be presented or arranged in a variety of different configurations and embodiments.

According to one embodiment, a system 20 for providing buoyancy for a vehicle 10 on a body of water 18 includes: (a) a support structure 22 having an upper support end 23, a lower support end 24, and an interlocated portion 26 between the upper and lower support ends 23, 24; (b) a first shell 30 attached directly or indirectly to the support structure 22 and having an upper first shell end 31 and a lower first shell end 32; and (c) a mechanism 50 configured to move the first shell 30 between a retracted state RS and a deployed state DS. In the retracted state RS, the upper first shell end 31 is disposed proximate the interlocated portion 26 and the lower first shell end 32 is disposed proximate the lower support end 24, and in the deployed state DS, the first shell 30 is disposed in one of: (i) a first arrangement A1, wherein the upper first shell end 31 is pivotably attached to the interlocated portion 26 and the lower first shell end 32 is disposed away from the support structure 22; (ii) a second arrangement A2, wherein the lower first shell end 32 is pivotably attached to the lower support end 24 and the upper first shell end 31 is disposed away from the support structure 22; (iii) a third arrangement A3, wherein both the upper and lower first shell ends 31, 32 are disposed away from the support structure 22; and (iv) a fourth arrangement A4, wherein the upper and lower first shell ends 31, 32 are pivotably attached to the interlocated portion 26 and to the lower support end 24, respectively, with the first shell 30 comprising an upper first shell 37, which includes the upper first shell end 31 and an upper first shell termination $\mathbf{37}_T$ opposite the upper first shell end 31, and a lower first shell 38, which includes the lower first shell end 32 and a lower first shell termination $\mathbf{38}_T$ opposite the lower first shell end 32, wherein in the retracted state RS, the upper and lower first shell terminations $37_T$, $38_T$ are disposed proximate each other, and in the deployed state DS, the upper and lower first shell terminations $37_T$, $38_T$ are disposed away from each other.

The support structure 22 may have an inboard side 27 and an outboard side 28, wherein in the deployed state DS the first shell 30 may be disposed on either the inboard side 27 or the outboard side 28.

The support structure 22 may be configured for attachment to or integration with the vehicle 10.

The first shell 30 may have a generally C-shaped first cross-section 35 and a first vertex 36 between the upper and lower first shell ends 31, 32, wherein in the retracted state RS the first vertex 36 is disposed away from the support structure 22.

In the first arrangement A1, the mechanism 50 may include one of: (A) a first configuration C1, which may include (i) a balloon 60 attached to the interlocated portion 26 and disposed in the retracted state RS between the first shell 30 and the interlocated portion 26, and (ii) a balloon inflator 68 in inflatable communication with the balloon 60; (B) a second configuration C2, which may include (i) a lower membrane 70 having a first lower membrane end 71 attached to the lower support end 24 and a second lower membrane end 72 attached to the lower first shell end 32, (ii) an enclosed interior 90 enclosed by the first shell 30, the support structure 22 and the lower membrane 70, and (iii) an enclosed interior inflator 93 in inflatable communication with the enclosed interior 90; and (C) a third configuration C3, which may include (i) the enclosed interior 90 and (ii) an actuator 52 operably connected with the first shell 30 and the support structure 22.

In the first configuration C1, in the retracted state RS the balloon 60 may have a first balloon volume 64, and in the deployed state DS the balloon 60 may be expanded to a second balloon volume 66 by the balloon inflator 68. In the second configuration C2, in the retracted state RS the enclosed interior 90 may have a first enclosed interior volume 91, and in the deployed state DS the enclosed interior 90 may be expanded to a second enclosed interior volume 92 by the enclosed interior inflator 93. And in the third configuration C3, in the retracted state RS the first shell 30 may be disposed at a first distance $d_1$ from the support structure 22, and in the deployed state DS the first shell 30 may be moved by the actuator 52 to a second distance $d_2$ away from the support structure 22 that is greater than the first distance $d_1$.

In the deployed state DS, a running surface 94 may be provided for facilitating one or more of landing the vehicle 10 on the body of water 18, taxiing of the vehicle 10 on the body of water 18 and take-off of the vehicle 10 from the body of water 18 by: (i) an outer balloon surface 62 of the balloon 60 in the first configuration C1; and (ii) an outer lower membrane surface 76 of the lower membrane 70 in the second and third configurations C2, C3.

The first configuration C1 may further include an extender 95 operably connected with the balloon 60 and the support structure 22 and configured for (i) extending the balloon 60 from a retracted position RP, in which the balloon 60 is disposed proximate the support structure 22, and an extended position EP, in which the balloon 60 is disposed away from the support structure 22, and (ii) retracting the balloon 60 from the extended position EP to the retracted position RP.

In the second arrangement A2, the mechanism 50 may include one of: (a) a primary configuration Cp, which may include an actuator 52 operably connected with the first shell 30 and the support structure 22; (b) a secondary configuration Cs, which may include (i) an upper membrane 80 having a first upper membrane end 82 attached to the interlocated portion 26 and a second upper membrane end 84 attached the upper first shell end 31, (ii) an enclosed interior 90 enclosed by the first shell 30, the support structure 22 and the upper membrane 80, and (iii) an enclosed interior inflator 93 in inflatable communication with the enclosed interior 90; (c) a tertiary configuration Ct, which may include (i) the enclosed interior 90 and (ii) the actuator 52; and (d) a quaternary configuration Cq, which may include (i) a balloon 60 attached to the interlocated portion 26 and disposed in the retracted state RS between the first shell 30 and the interlocated portion 26, and (ii) a balloon inflator 68 in inflatable communication with the balloon 60.

In the primary configuration Cp, in the retracted state RS the first shell 30 may be disposed at a first distance $d_1$ from the support structure 22, and in the deployed state DS the first shell 30 may be moved by the actuator 52 to a second distance $d_2$ away from the support structure 22 that is greater than the first distance $d_1$.

In the secondary and tertiary configurations Cs, Ct, in the retracted state RS the enclosed interior 90 may have a first enclosed interior volume 91, and in the deployed state DS the enclosed interior 90 may be expanded to a second enclosed interior volume 92 by the enclosed interior inflator 93.

In the quaternary configuration Cq, in the retracted state RS the balloon 60 may have a first balloon volume 63, and in the deployed state DS the balloon 60 may be expanded to a second balloon volume 64 by the balloon inflator 68.

In the deployed state DS, a running surface 94 may be provided for facilitating one or more of landing the vehicle 10 on the body of water 18, taxiing of the vehicle 10 on the body of water 18 and take-off of the vehicle 10 from the body of water 18 by an outer first shell surface 33 of the first shell 30.

The primary and quaternary configurations Cp, Cq may further include a spray skirt 96 having a first spray skirt end 97 attached to the interlocated portion 26 and a second spray skirt end 98 attached to the upper first shell end 31.

In the third arrangement A3, the mechanism 50 may include: (i) an upper membrane 80 having a first upper membrane end 82 attached to the interlocated portion 26 and a second upper membrane end 84 attached to the upper first shell end 31; (ii) a lower membrane 70 having a first lower membrane end 71 attached to the lower support end 24 and a second lower membrane end 72 attached to the lower first shell end 32; (iii) an enclosed interior 90 enclosed by the first shell 30, the support structure 22, the upper membrane 80 and the lower membrane 70; and (iv) an enclosed interior inflator 93 in inflatable communication with the enclosed interior 90. In the retracted state RS, the enclosed interior 90 may have a first enclosed interior volume 91, and in the deployed state DS, the enclosed interior 90 may be expanded to a second enclosed interior volume 92 by the enclosed interior inflator 93.

In the deployed state DS, a running surface 94 may be provided for facilitating one or more of landing the vehicle 10 on the body of water 18, taxiing of the vehicle 10 on the body of water 18 and take-off of the vehicle 10 from the body of water 90 by one or both of an outer lower membrane surface 76 of the lower membrane 70 and an outer first shell surface 33 of the first shell 30.

In the fourth arrangement A4, the mechanism 50 may include one of: (a) a main configuration Cm, which may include an upper actuator 58 operably connected with the upper first shell 37 and the support structure 22 and a lower actuator 59 operably connected with the lower first shell 38 and the support structure 22; (b) an auxiliary configuration Cx, which may include (i) a balloon 60 attached to the interlocated portion 26 and disposed in the retracted state RS between the first shell 30 and the interlocated portion 26, and (ii) a balloon inflator 68 in inflatable communication with the balloon 60; (c) an alternative configuration Ca, which may include (i) a middle membrane 86 having a first middle membrane end 87 attached to the upper first shell termination $37_T$ and a second middle membrane end 88 attached the lower first shell termination $38_T$, (ii) an enclosed interior 90 enclosed by the upper first shell 37, the lower first shell 38, the support structure 22 and the middle membrane 86, and (iii) an enclosed interior inflator 93 in inflatable communication with the enclosed interior 90; and (d) a supplemental configuration Cz, which may include (i) the enclosed interior 90 and (ii) the upper and lower actuators 58, 59.

In the deployed state DS, a running surface 94 may be provided for facilitating one or more of landing the vehicle 10 on the body of water 18, taxiing of the vehicle 10 on the body of water 18 and take-off of the vehicle 10 from the body of water 18 by an outer lower first shell surface 39 of the lower first shell 38.

The main configuration Cm may further include a spray skirt 96 having a first spray skirt end 97 attached to the upper first shell termination $37_T$ and a second spray skirt end 98 attached to the lower first shell termination $38_T$.

The mechanism 50 may include one or more of: (a) an actuator 52 operably connected with the first shell 30 and the support structure 22; (b) a balloon 60 and a balloon inflator 68 in inflatable communication with the balloon 60, wherein the balloon 60 is attached to the interlocated portion 26 and is disposed in the retracted state RS between the first shell 30 and the interlocated portion 26; and (c) an enclosed interior 90 and an enclosed interior inflator 93 in inflatable communication with the enclosed interior 90, wherein the enclosed interior 90 is enclosed by the first shell 30, the support structure 22, and one or more of (i) a lower membrane 70 that has a first lower membrane end 71 attached to the lower support end 24 and a second lower membrane end 72 attached to the lower first shell end 32, (ii) an upper membrane 80 that has a first upper membrane end 81 attached to the interlocated portion 26 and a second upper membrane end 82 attached to the upper first shell end 31, and (iii) a middle membrane 86 having a first middle membrane end 87 attached to the upper first shell termination 37 and a second middle membrane end 88 attached to the lower first shell termination $38_T$.

The actuator 52 may be configured for selectably increasing and decreasing a distance between the first shell 30 and the support structure 22 between a first distance $d_1$ in the retracted state RS and a second distance $d_2$ in the deployed state DS, wherein the second distance $d_2$ is greater than the first distance $d_1$. The balloon 60 and the balloon inflator 68 may be configured for selectably increasing and decreasing a balloon volume of the balloon 60 between a first balloon volume 63 in the retracted state RS and a second balloon volume 64 in the deployed state DS, wherein the second balloon volume 64 is greater than the first balloon volume 63. The enclosed interior 90 and the enclosed interior inflator 93 may be configured for selectably increasing and decreasing an enclosed interior volume of the enclosed interior 90 between a first enclosed interior volume 91 in the retracted state RS and a second enclosed interior volume 92 in the deployed state DS.

The mechanism 50 may further include one or more of: (a) a tether 74 having a first tether end 75 attached to an outer balloon surface 62 of the balloon 60 and a second tether end 76 attached to an inner first shell surface 34 of the first shell 30; (b) an elastic member 65 having a first elastic member end 66 attached to the support structure 22 and a second elastic member end 67 attached to at least one of the upper membrane 80, the lower membrane 70, the middle membrane 86 and an inner first shell surface 34 of the first shell 30; and (c) a strap 77 having a first strap end 78 and a second strap end 79 attached to a retractor 84 that is configured for selectably paying out and retracting the strap 77, wherein the strap 77 is disposed (i) along a lower membrane outer perimeter $70_{op}$ of the lower membrane 70 with the first strap end 78 attached to the lower first shell end 32 and the retractor 84 disposed at the lower support end 24, (ii) along an upper membrane outer perimeter $80_{op}$ of the upper membrane 80 with the first strap end 78 attached to the upper first shell end 31 and the retractor 84 disposed at the interlocated portion 26, or (iii) along a middle membrane outer perimeter $86_{op}$ of the middle membrane 86 with the first strap end 78 attached to the upper first shell termination $37_T$ and the retractor 84 disposed at the lower first shell termination $38_T$ or at the lower support end 24 or with the first strap end 78 attached to the lower first shell termination $38_T$ and the retractor 84 disposed at the upper first shell termination $37_T$ or at the interlocated portion 26.

In the deployed state DS, the buoyancy may be provided for the vehicle 10 on the body of water 18 by one or more of: (i) the balloon 60; (ii) the enclosed interior 90; and (iii) a substantially watertight interior space 99 defined by the lower membrane 70 and the support structure 22 in the first arrangement A1, by the first shell 30 and the support structure 22 in the second arrangement A2, and by the lower first shell 38 and the support structure 22 in the fourth arrangement A4.

The system 20 may further include a second shell 40 attached directly or indirectly to the support structure 22 and having an upper second shell end 41 and a lower second shell end 42, wherein the support structure 22 may have an inboard side 27 and an outboard side 28, and wherein one of the first and second shells 30, 40 may be disposed on the inboard side 27 and the other of the first and second shells 30, 40 may be disposed on the outboard side 28.

According to another embodiment, a system 20 for providing buoyancy for a vehicle 10 on a body of water 18 includes: (a) a support structure 22 having an upper support end 23, a lower support end 24, a interlocated portion 26 between the upper and lower support ends 23, 24, an inboard side 27 and an outboard side 28, wherein the support structure 22 is configured for attachment to or integration with the vehicle 10; (b) a first shell 30 attached directly or indirectly to the support structure 22 on one of the inboard and outboard sides 27, 28 and having an upper first shell end 31 and a lower first shell end 32; (c) a second shell 40 attached directly or indirectly to the support structure 22 on the other of the inboard and outboard sides 27, 28 and having an upper second shell end 41 and a lower second shell end 42; and (d) a mechanism 50 configured to move the first and second shells 30, 40 between a retracted state RS and a deployed state DS. In the retracted state RS, the upper first and second shell ends 31, 41 are disposed proximate the interlocated portion 26 and the lower first and second shell ends 32, 42 are disposed proximate the lower support end 24, and in the deployed state DS, the first and second shells 30, 40 are disposed in one of: (i) a first arrangement A1, wherein the upper first and second shell ends 31, 41 are pivotably attached to the interlocated portion 26 and the lower first and second shell ends 32, 42 are disposed away from the support structure 22; (ii) a second arrangement A2, wherein the lower first and second shell ends 32, 42 are pivotably attached to the lower support end 24 and the upper first and second shell ends 31, 41 are disposed away from the support structure 22; (iii) a third arrangement A3, wherein the upper and lower first shell ends 31, 32 and the upper and lower second shell ends 41, 42 are disposed away from the support structure 22; and (iv) a fourth arrangement A4, wherein the upper first and second shell ends 31, 41 are pivotably attached to the interlocated portion 26 and the lower first and second shell ends 32, 42 are pivotably attached to the lower support end 24, with the first shell 30 comprising an upper first shell 37, which includes the upper first shell end 31 and an upper first shell termination 37$_T$ opposite the upper first shell end 31, and a lower first shell 38, which includes the lower first shell end 32 and a lower first shell termination 38$_T$ opposite the lower first shell end 32, and with the second shell 40 comprising an upper second shell 47, which includes the upper second shell end 41 and an upper second shell termination 47 opposite the upper second shell end 41, and a lower second shell 48, which includes the lower second shell end 42 and a lower second shell termination 48$_T$ opposite the lower second shell end 42, wherein in the retracted state RS, the upper and lower first shell terminations 37$_T$, 38$_T$ are disposed proximate each other and the upper and lower second shell terminations 47$_T$, 48$_T$ are disposed proximate each other, and in the deployed state DS, the upper and lower first shell terminations 37$_T$, 38$_T$ are disposed away from each other and the upper and lower second shell terminations 47$_T$, 48$_T$ are disposed away from each other.

According to yet another embodiment, a system 20 for providing buoyancy for an aircraft 11 on a body of water 18 includes: (a) a support structure 22 having an upper support end 23, a lower support end 24, and a interlocated portion 26 between the upper and lower support ends 23, 24, wherein the upper support end 23 of the support structure 22 is configured for attachment to or integration with a wing tip 16 of the aircraft 11; (b) a first shell 30 attached directly or indirectly to the support structure 22 and having an upper first shell end 31 and a lower first shell end 32; and (c) a mechanism 50 configured to move the first shell 30 between a retracted state RS and a deployed state DS. In in the retracted state RS, the upper first shell end 31 is disposed proximate the interlocated portion 26 and the lower first shell end 32 is disposed proximate the lower support end 24, and in in the deployed state DS, the first shell 30 is disposed in one of: (i) a first arrangement A1, wherein the upper first shell end 31 is pivotably attached to the interlocated portion 26 and the lower first shell end 32 is disposed away from the support structure 22; (ii) a second arrangement A2, wherein the lower first shell end 32 is pivotably attached to the lower support end 24 and the upper first shell end 31 is disposed away from the support structure 22; (iii) a third arrangement A3, wherein both the upper and lower first shell ends 31, 32 are disposed away from the support structure 22; and (iv) a fourth arrangement A4, wherein the upper and lower first shell ends 31, 32 are pivotably attached to the interlocated portion 26 and to the lower support end 24, respectively, with the first shell 30 comprising an upper first shell 37, which includes the upper first shell end 31 and an upper first shell termination 37$_T$ opposite the upper first shell end 31, and a lower first shell 38, which includes the lower first shell end 32 and a lower first shell termination 38$_T$ opposite the lower first shell end 32, wherein in the retracted state RS, the upper and lower first shell terminations 37$_T$, 38$_T$ are disposed proximate each other, and in the deployed state DS, the upper and lower first shell terminations 37$_T$, 38$_T$ are disposed away from each other.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A system to provide buoyancy for a vehicle on a body of water, comprising:

a support structure having an upper support end, a lower support end, and an interlocated portion between the upper and lower support ends;

a first shell attached directly or indirectly to the support structure and having an upper first shell end and a lower first shell end; and a mechanism configured to move the first shell between a retracted state and a deployed state;

wherein in the retracted state the upper first shell end is disposed proximate the interlocated portion and the lower first shell end is disposed proximate the lower support end; and wherein in the deployed state the first shell is disposed in an arrangement, wherein the lower first shell end is pivotably attached to the lower support end and the upper first shell end is disposed away from the support structure, wherein in the arrangement, the mechanism includes an actuator operably connected with the first shell and the support structure, and wherein the arrangement includes a spray skirt having a first spray skirt end attached to the interlocated portion and a second spray skirt end attached to the upper first shell end.

2. The system of claim 1, wherein in the retracted state the first shell is disposed at a first distance from the support structure, and in the deployed state the first shell is moved by the actuator to a second distance away from the support structure that is greater than the first distance.

3. The system of claim 1, wherein in the deployed state a running surface is provided to facilitate one or more of landing the vehicle on the body of water, taxiing of the vehicle on the body of water and take-off of the vehicle from the body of water by an outer first shell surface of the first shell.

4. The system of claim 1, wherein the actuator is configured to selectably increase and decrease a distance between the first shell and the support structure between a first distance in the retracted state and a second distance in the deployed state, wherein the second distance is greater than the first distance.

5. The system of claim 4, wherein, in the deployed state, the buoyancy is provided for the vehicle on the body of water by the first shell and the support structure.

6. The system of claim 1, further comprising a second shell attached directly or indirectly to the support structure and having an upper second shell end and a lower second shell end, wherein the support structure has an inboard side and an outboard side, and wherein one of the first and second shells is disposed on the inboard side and the other of the first and second shells is disposed on the outboard side.

7. A buoyancy assembly for a vehicle comprising:

a support structure having an elongated body defining a first end and a second end opposite the first end, the support structure to attach to an aircraft;

a first shell having an upper first shell end and a lower first shell end, the upper first shell end coupled to the support structure between the first end and the second end, the lower first shell end coupled to the support structure adjacent the second end, the first shell having a first deflectable portion between the upper first shell end and the lower first shell end, the first deflectable portion to move relative to the support structure;

a second shell having an upper second shell end and a lower second shell end, the upper second shell end coupled to the support structure between the first end and the second end, the lower second shell end coupled to the support structure adjacent the second end, the second shell having a second deflectable portion between the upper second shell end and the lower second shell end, the second deflectable portion to move relative to the support structure;

a first actuator coupled to the support structure and the first shell, the first actuator movable between a first retracted position and a first extended position, in the first retracted position, the first actuator is to cause the first deflectable portion of the first shell to move toward the support structure, in the first extended position, the first actuator is to cause the first deflectable portion of the first shell to move away from the support structure; and a second actuator coupled to the support structure and the second shell, the second actuator movable between a second retracted position and a second extended position, in the second retracted position, the second actuator is to cause the second deflectable portion of the second shell to move toward the support structure, in the second extended position, the second actuator is to cause the second deflectable portion of the second shell to move away from the support structure.

8. The buoyancy assembly of claim 7, further including an inflator to provide air to the first shell and the second shell.

9. The buoyancy assembly of claim 7, wherein the first actuator has a first actuator rod and a second actuator rod, the first actuator rod coupled to the support structure and the second actuator rod coupled to the first deflectable portion of the first shell, wherein the second actuator has a third actuator rod and a fourth actuator rod, the third actuator rod coupled to the support structure and the fourth actuator rod coupled to the second deflectable portion of the second shell.

10. The buoyancy assembly of claim 7, wherein the first actuator is in a first cavity of the first shell and the second actuator is in a second cavity of the second shell.

11. The buoyancy assembly of claim 7, further including a first spray skirt coupled between the upper first shell end and the support structure and a second spray skirt coupled between the upper second shell end and the support structure.

12. The buoyancy assembly of claim 11, wherein the first spray skirt includes a first spray skirt end attached to the upper first shell end and a second spray skirt end attached to the support structure, and wherein the second spray skirt includes a third spray skirt end attached to the upper second shell end and a fourth spray skirt end attached to the support structure.

13. The buoyancy assembly of claim 7, wherein in the first retracted position, the first actuator causes the first deflectable portion of the first shell to move to a first distance from the support structure, and in the first extended position, the first actuator causes the first deflectable portion of the first shell to move to a second distance from the support structure that is greater than the first distance.

14. The buoyancy assembly of claim 13, wherein in the second retracted position, the second actuator causes the second deflectable portion of the second shell to move to a third distance from the support structure, and in the second extended position, the second actuator causes the second deflectable portion of the second shell to move to a fourth distance from the support structure that is greater than the third distance.

15. A buoyancy assembly for an aircraft, the buoyancy assembly comprising:

a support structure having a first support structure end to couple to the aircraft and a second support structure end opposite the first support structure end to depend from the aircraft;

a shell having an upper shell end and a lower shell end, the lower shell end pivotally coupled to the second support structure end; and a spray skirt having a first spray skirt end and a second spray skirt end, the first spray skirt end pivotally coupled to the support structure between the first support structure end and the second support structure end, the second spray skirt end coupled to the upper shell end, wherein the shell is deformable between a retracted state and an deployed state, wherein in the retracted state, the upper shell end is adjacent the support structure, and wherein in the deployed state, the upper shell end is spaced away from the support structure.

16. The buoyancy assembly of claim 15, further including an actuator to move the shell between the retracted state and the deployed state.

17. The buoyancy assembly of claim 16, wherein in the retracted state, the actuator causes a deflectable portion of the shell to move to a first distance from the support structure, and in the deployed state, the actuator causes the deflectable portion of the shell to move to a second distance from the support structure that is greater than the first distance.

18. The buoyancy assembly of claim 16, wherein the actuator is coupled between an interior surface of the shell and an exterior surface of the support structure.

19. The buoyancy assembly of claim 15, wherein the spray skirt collapses between the upper shell end and the support structure when the shell is in the retracted state.

* * * * *